(12) United States Patent
Ziemer et al.

(10) Patent No.: US 10,759,265 B2
(45) Date of Patent: Sep. 1, 2020

(54) PLANETARY AUTOMATIC TRANSMISSION

(71) Applicant: ZF Friedrichshafen AG, Friedrichshafen (DE)

(72) Inventors: Peter Ziemer, Tettnang (DE); Kai Bornträger, Langenargen (DE); Christoph Margraf, Markdorf (DE); Stefan Brom, Canton, MI (US); Andreas Beisswenger, Friedrichshafen (DE); Michael Trübenbach, Friedrichshafen (DE); Johannes Glückler, Eriskrich (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/467,251

(22) PCT Filed: Nov. 16, 2017

(86) PCT No.: PCT/EP2017/079466
§ 371 (c)(1),
(2) Date: Jun. 6, 2019

(87) PCT Pub. No.: WO2018/104020
PCT Pub. Date: Jun. 14, 2018

(65) Prior Publication Data
US 2020/0079206 A1    Mar. 12, 2020

(30) Foreign Application Priority Data
Dec. 7, 2016    (DE) ................ 10 2016 224 388

(51) Int. Cl.
*B60K 6/48*    (2007.10)
*B60K 6/365*    (2007.10)
*F16H 3/66*    (2006.01)

(52) U.S. Cl.
CPC ............... *B60K 6/365* (2013.01); *B60K 6/48* (2013.01); *B60K 2006/4816* (2013.01);
(Continued)

(58) Field of Classification Search
CPC .. B60K 6/48; B60K 6/365; B60K 2006/4816; F16H 3/663; F16H 2200/0026;
(Continued)

(56) References Cited

U.S. PATENT DOCUMENTS 6,960,149 B2    11/2005    Ziemer
7,276,011 B2 *  10/2007    Tabata ................... F16H 3/663
                                                                475/271

(Continued)

FOREIGN PATENT DOCUMENTS

DE          101 15 995 A1        10/2002
DE    10 2011 057 113 A1        11/2012
(Continued)

OTHER PUBLICATIONS

German Search Report Corresponding to 10 2016 224 388.8 dated May 9, 2017.
(Continued)

*Primary Examiner* — Leslie A Nicholson, III
(74) *Attorney, Agent, or Firm* — Davis & Bujold PLLC; Michael J. Bujold

(57) ABSTRACT

A transmission having five planetary gearsets and seven shift elements for achieving various ratios between drive and output shafts. A forward gearset has three shafts. Two intermediate gearsets have four shafts. Two main gearsets have at least four shafts. Depending on the shift states of the second and third shift elements, the forward gearset can generate two rotational speeds at the output side, which transfer from a forward gearset shaft to an intermediate gearset shaft. Depending on the shift states of the first to fifth (Continued)

shift elements, the intermediate gearset can generate eight rotational speeds at the output side, which pass from another intermediate gearset shaft to a main gearset shaft. Depending on the shift states of the seven shift elements, the main gearset can generate up to fourteen forward and two reverse gears at the output side, which are transferred by another main gearset shaft to the output shaft.

30 Claims, 22 Drawing Sheets

(52) U.S. Cl.
CPC ...... *F16H 3/663* (2013.01); *F16H 2200/0026* (2013.01); *F16H 2200/0078* (2013.01); *F16H 2200/2015* (2013.01); *F16H 2200/2023* (2013.01); *F16H 2200/2048* (2013.01); *F16H 2200/2097* (2013.01)

(58) Field of Classification Search
CPC ..... F16H 2200/0078; F16H 2200/2015; F16H 2200/2023; F16H 2200/2048; F16H 2200/2097
USPC ........................................................ 475/276
See application file for complete search history.

(56) References Cited

U.S. PATENT DOCUMENTS

| | | | |
|---|---|---|---|
| 8,597,152 B2 | 12/2013 | Seo et al. | |
| 9,175,748 B2 | 11/2015 | Goleski et al. | |
| 9,759,291 B2 | 9/2017 | Beck et al. | |
| 9,822,856 B2 | 11/2017 | Hoffman | |
| 10,274,054 B2 * | 4/2019 | Kim .......................... | F16H 3/66 |

FOREIGN PATENT DOCUMENTS

| | | |
|---|---|---|
| DE | 10 2014 214 212 A1 | 1/2015 |
| DE | 10 2015 201 650 A1 | 8/2016 |
| EP | 0 832 377 B1 | 4/1999 |
| JP | 2005-172123 A | 6/2005 |
| JP | 2014-224547 A | 12/2014 |
| WO | 02/079669 A1 | 10/2002 |
| WO | 2011/026833 A1 | 3/2011 |

OTHER PUBLICATIONS

International Search Report Corresponding to PCT/EP2017/079466 dated Nov. 4, 2018.
Written Opinion Corresponding to PCT/EP2017/079466 dated Nov. 4, 2018.

* cited by examiner

| Gear | A | B | C | D | E | L | H | Ratio | Efficiency | Gear increment | |
|---|---|---|---|---|---|---|---|---|---|---|---|
| R1 |   |   | o | o |   | o |   | -11.64 | 0.956 | 2.60 | R1/R2 |
| R2 |   | o |   | o |   | o |   | -4.48 | 0.967 | -0.73 | R1/1 |
| N  |   | o |   |   |   | o |   | - | - |  -0.73 | R2/2 |
| (N.1) |   |   | (o) |   |   | (o) |   | - | - |   |   |
| 1 | o |   | o |   |   | o |   | 15.87 | 0.952 | 2.60 |   |
| 2 | o |   |   |   |   |   |   | 6.11 | 0.963 | 1.50 |   |
| 3 | o |   |   |   | o |   |   | 4.07 | 0.970 | 1.45 |   |
| 4 |   | o |   |   | o |   |   | 2.80 | 0.987 | 1.38 |   |
| 5 |   | o |   |   | o |   |   | 2.02 | 0.980 | 1.35 |   |
| 6 |   |   |   |   |   | o | o | 1.50 | 0.989 | 1.28 |   |
| (6.1) |   |   |   |   |   | (o) | (o) | 1.50 |   |   |   |
| (6.2) |   | (o) |   |   |   | (o) | (o) | 1.50 |   |   |   |
| (6.3) |   |   |   | (o) | (o) |   | (o) | 1.50 |   |   |   |
| 7 |   | o |   |   |   |   | o | 1.17 | 0.992 | 1.17 | 1.31 |
| 8 |   | o |   |   |   |   | o | 1.00 | 1.0 | 1.12 | 1.17 |
| 9 | o |   |   |   |   |   | o | 0.89 | 0.993 | 1.08 |   |
| 10 | o |   |   |   |   |   | o | 0.83 | 0.993 | 1.09 | 1.17 |
| 11 | o |   |   |   |   |   | o | 0.76 | 0.993 | 1.05 | 1.12 |
| 12 |   |   | o | o |   |   | o | 0.72 | 0.994 | 1.07 |   |
| 13 |   |   | o | o |   |   | o | 0.68 | 0.991 | 1.10 |   |
| 14 |   | o |   | o |   |   | o | 0.62 | 0.989 | Spread 2-14: 10 | Spread 1-14: 25.8 |

Fig. 4A

| Gear | A | B | C | D | E | L | H | Ratio | Efficiency | Gear increment |
|---|---|---|---|---|---|---|---|---|---|---|
| RC |  |  | o | o |  | o |  | -11.64 | 0.956 | 2.60 RC/R |
| R |  | o |  | o |  | o |  | -4.48 | 0.967 | -0.73 RC/C |
| N |  | o |  |  |  | o |  | - | - | -0.73 R1 |
| (N) |  |  | (o) |  |  | (o) |  | - | - |  |
| C | o | o | o |  |  | o |  | 15.87 | 0.952 | 2.60 |
| 1 | o |  |  |  | o | o |  | 6.11 | 0.963 | 1.50 |
| 2 | o |  |  |  | o | o |  | 4.07 | 0.970 | 1.45 |
| 3 |  | o |  |  | o | o |  | 2.80 | 0.967 | 1.38 |
| 4 |  |  | o |  |  | o |  | 2.02 | 0.980 | 1.35 |
| 5 |  |  |  |  |  | o | o | 1.50 | 0.989 | 1.28 |
| (5) |  | (o) |  |  | (o) | (o) | (o) | 1.50 |  |  |
| (5) |  |  |  | (o) |  | (o) | (o) | 1.50 |  |  |
| (5) |  |  |  |  |  | (o) | (o) | 1.50 |  |  |
| 6 |  | o |  |  | o |  | o | 1.17 | 0.992 | 1.17 |
| 7 |  |  |  |  | o |  | o | 1.00 | 1.0 | 1.12 |
| 8 | o |  |  |  | o |  | o | 0.89 | 0.993 | 1.08 |
| 9 | o | o |  |  |  |  | o | 0.83 | 0.993 | 1.15 |
| 10 | o |  |  | o |  |  | o | 0.72 | 0.994 | 1.17 |
| 11 |  | o |  | o |  |  | o | 0.62 | 0.989 |  |
|  |  |  |  |  |  |  |  |  | Spread 1-11 | 10 |
|  |  |  |  |  |  |  |  |  | Spread 0-11 | 25.8 |

Fig. 4B

| Gear | A | B | C | D | E | L | H | Ratio | Efficiency | Gear increment |
|---|---|---|---|---|---|---|---|---|---|---|
| RC |   |   | o | o |   | o |   | -11.64 | 0.956 | 2.60 RC/R |
| R |   | o |   | o |   | o |   | -4.48 | 0.967 | -0.73 RC/C |
| N |   | o | o |   |   | o |   | - | - |   |
| (N) |   |   |   |   |   | (o) |   | - | - | -0.73 R/1 |
| C | o |   | o |   |   | o |   | 15.87 | 0.952 |   |
| 1 | o | o |   |   |   | o |   | 6.11 | 0.963 | 2.60 |
| 2 | o |   |   |   | o | o |   | 4.07 | 0.970 | 1.50 |
| 3 |   |   | o |   | o | o |   | 2.80 | 0.987 | 1.45 |
| 4 |   | o | o |   | o | o |   | 2.02 | 0.980 | 1.38 |
| 5 |   |   |   |   | (o) | o | o | 1.50 | 0.989 | 1.35 |
| (5) |   | (o) |   |   |   | (o) | (o) | 1.50 |   | 1.28 |
| (5) |   |   |   | (o) |   | (o) | (o) | 1.50 |   |   |
| (5) |   |   |   |   |   | (o) | (o) | 1.50 |   |   |
| 6 |   | o |   |   | o |   | o | 1.17 | 0.992 | 1.17 |
| 7 | o | o |   |   | o |   | o | 1.00 | 1.0 | 1.21 |
| 8 | o |   | o |   |   |   | o | 0.83 | 0.993 | 1.15 |
| 9 |   | o |   | o |   |   | o | 0.72 | 0.994 | 1.17 |
| 10 |   | o |   | o |   |   | o | 0.62 | 0.989 |   |
|   |   |   |   |   |   |   |   |   |   | Spread 1-10: 10 |
|   |   |   |   |   |   |   |   |   |   | Spread 0-10: 25.8 |

Fig. 4C

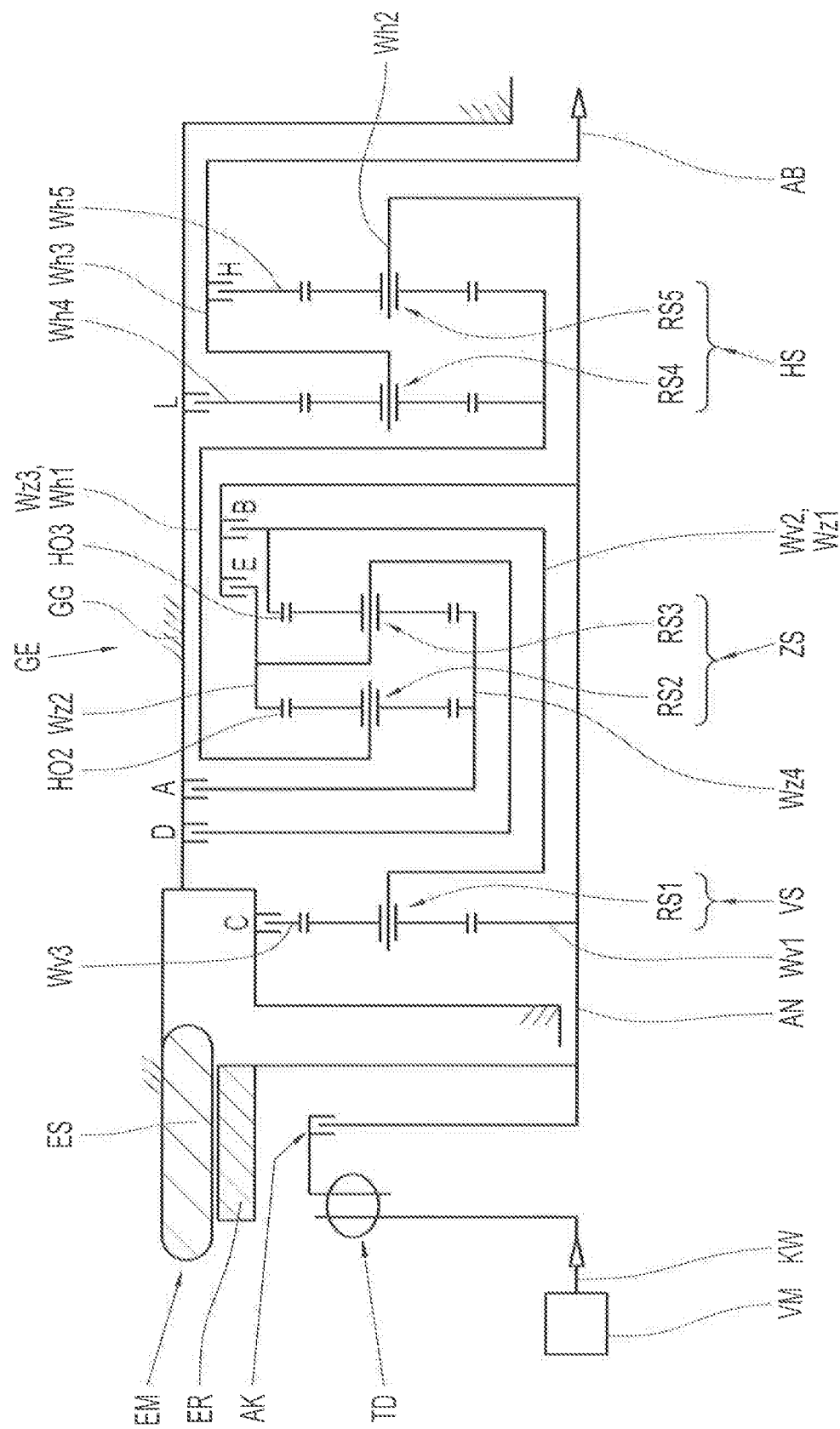

Speed diagram for Fig. 13 for clutch B closed

Speed diagram for Fig. 13 for clutch L closed

Fig. 18

| Gear | A | B | C | D | E | L | H | Ratio | Efficiency | Gear increment |
|------|---|---|---|---|---|---|---|-------|------------|----------------|
| R1 | o |   |   |   |   |   |   | -5.69 | 0.947 | 1.62  R1/R2 |
| R2 |   | o |   | o |   |   |   | -3.50 | 0.954 | -0.84  R1/1 |
| N  |   | o |   | o |   | o |   |   -   |   -   | -0.84  R2/2 |
| 1  | o |   |   |   |   | o |   | 6.79  | 0.969 | 1.63 |
| 2  | o | o |   |   |   | o |   | 4.18  | 0.976 | 1.48 |
| 3  | o |   |   |   | o | o |   | 2.83  | 0.982 | 1.38 |
| 4  |   | o |   |   | o | o |   | 2.04  | 0.988 | 1.22 |
| 5  |   |   |   |   | o | o |   | 1.67  | 0.979 | 1.21 |
| 6  |   |   | (o) |  | o | o | o | 1.38  | 0.994 | 1.20 |
| 7  |   |   | o |   |   | o | o | 1.15  | 0.988 | 1.15 |
| 8  |   |   |   |   |   | o | o | 1.00  | 1.0   | 1.16 |
| 9  |   | o |   |   | o |   | o | 0.86  | 0.993 | 1.12 |
| 10 | o |   |   |   |   |   | o | 0.77  | 0.989 | 1.08 |
| 11 | o |   | o |   |   |   | o | 0.71  | 0.987 | 1.22 |
| 12 | o |   |   | o |   |   | o | 0.63  | 0.987 | 1.02 |
| 13 |   |   | o | o |   |   | o | 0.56  | 0.980 | 1.22 |
| 14 |   | o |   | o |   |   | o | 0.52  | 0.977 | 1.07 |

Spread 2–14: 8.0
Spread 1–14: 13.1

PLANETARY AUTOMATIC TRANSMISSION

This application is a National Stage completion of PCT/EP2017/079466 filed Nov. 16, 2017, which claims priority from German patent application serial no. 10 2016 224 388.8 filed Dec. 7, 2016.

FIELD OF THE INVENTION

This invention relates to an automatic transmission in planetary design having seven shift elements for achieving several gear ratios between the drive shaft and the output shaft of the automatic transmission.

BACKGROUND OF THE INVENTION

Automatically shiftable vehicle transmissions in planetary design have been described many times in the prior art and are subject to continual development and improvement. These transmissions are to have a sufficient number of gears and a ratio well-suited for motor vehicles having a wide overall difference between gear ratios, favorable increment spacings and a driveaway ratio sufficiently large for the application. On the other hand, these transmissions are to require the lowest possible construction costs, in particular a small number of shift elements. Usually in sequential shift mode, so-called group shifting is also to be avoided, that is, when achieving the next higher or next lower gear, only one previously closed shift element is opened and one previously opened shift element is closed.

From U.S. Pat. No. 9,175,748 B2, for example, an automatic transmission having a drive shaft, an output shaft, four individual simple planetary gearsets and seven shift elements is known, in which a total of eleven forward gears can be achieved without group-shifting by selectively closing three of these seven shift elements and a reverse gear can also be achieved. Viewed in axial direction, the four planetary gearsets are arranged in series in a housing of the automatic transmission. Each of these four planetary gearsets includes a sun gear, a ring gear and a planetary carrier having planetary gears rotatably mounted on this planetary carrier, which mesh with the sun gear and the ring gear. The first and second planetary gearset form a front-mounted gearset as a so-called 2-carrier 4-shaft transmission, which can be connected to the drive shaft, whereas the third and fourth planetary gearset form the main gearset as a so-called 2-carrier 5-shaft transmission, which is permanently connected to the output shaft. In this case, the front-mounted gearset is permanently connected to the main gearset via exactly one connection path, which in turn is not directly connected to any of the seven shift elements. The front-mounted gearset is permanently directly connected to the first, second, third, fourth and fifth shift elements, whereas the main gearset is permanently directly connected to the sixth and seventh shift elements. It is essential that the sixth shift element is arranged in the flow of power between the ring gear of the third planetary gearset and the transmission housing, wherein the ring gear of the third planetary gearset itself is not formed as a coupling shaft between the third and fourth planetary gearsets, and that the seventh shift element is arranged in the flow of power between the ring gear of the fourth planetary gearset and the planetary carrier of the third planetary gearset, wherein the ring gear of the fourth planetary gearset in turn is also not formed as a coupling shaft between the third and fourth planetary gearsets. Thus, the sixth shift element is permanently directly connected to the third planetary gearset without being directly connected to the fourth planetary gearset, whereas the seventh shift element is permanently directly connected to both the third and the fourth planetary gearsets, such that both planetary gearsets of the main gearset transfer torque in only one of the forward gears, whereas in all other forward gears and in reverse gear only one of the two planetary gearsets of the main gearset transfers torque and the other of the two planetary gearsets of the main gearset bears no load.

SUMMARY OF THE INVENTION

This invention therefore addresses the problem of providing an alternative multi-speed automatic transmission in planetary design having seven shift elements.

According to the invention, this problem is solved by an automatic transmission having the features of the independent claim(s). Further advantageous configurations and developments of the invention are described in the dependent claims.

Accordingly, an automatic transmission is proposed in particular for a motor vehicle, which comprises a transmission housing, a rotary drive shaft, a rotary output shaft, five planetary gearsets and seven shift elements for achieving different gear ratios between the drive shaft and the output shaft. Each of the planetary gearsets may be configured as a minus planetary gearset or a plus planetary gearset. Each planetary gearset has a first element designed as a sun gear. Each planetary gearset designed as a minus planetary gearset has a second element designed as a planetary carrier and a third element designed as a ring gear, whereas each planetary gearset designed as a plus planetary gearset has a second element designed as a ring gear and a third element designed as a planetary gear carrier.

The first planetary gearset forms a shiftable front-mounted gearset comprising three front-mounted gearset shafts. The second and third planetary gearsets form a shiftable intermediate gearset comprising four intermediate gearset shafts. The fourth and fifth planetary gearsets form a shiftable main gearset comprising at least four main gearset shafts.

The second front-mounted gearset shaft forms the output shaft of the front-mounted gearset and is permanently connected to the first intermediate gearset shaft such that the output speed generated by the front-mounted gearset is transmitted from the second front-mounted gearset shaft to the intermediate gearset depending on the shift states of the second and third shift elements. When the second shift element is closed, the output shaft of the front-mounted gearset rotates at the rotational speed of the drive shaft.

The second intermediate gearset shaft can be retained at the transmission housing by closing the fourth shift element and can be connected to the drive shaft by closing the fifth shift element. The fourth intermediate gearset shaft can be retained at the transmission housing by closing the first shift element. The third intermediate gearset shaft forms the output shaft of the intermediate gearset and is permanently connected to the first main gearset shaft, such that the intermediate gearset can generate eight different speeds at the output side depending on the shift states of the first, second, third, fourth and fifth shift elements, which speeds are transmitted to the main gearset via the third intermediate gearset shaft.

The second main gearset shaft is either permanently connected to the drive shaft or can be connected to the drive shaft by closing the seventh shift element. The fourth main gearset shaft can be retained at the transmission housing by closing the sixth shift element. The third main gearset shaft forms the output shaft of the main gearset and is permanently connected to the output shaft, such that, depending on the shift states of the seven shift elements, at the output side the main gearset can generate up to fourteen different speeds as forward gears and up to two different speeds as reverse gears, which speeds are transmitted to the output shaft via the third main gearset shaft.

In a first aspect of the invention, the first front-mounted gearset shaft is permanently connected to the drive shaft, whereas the third front-mounted gearset shaft can be retained at the transmission housing by closing the third shift element.

In a second aspect of the invention, the first front-mounted gearset shaft can be connected to the drive shaft by closing the third shift element, whereas the third front-mounted gearset shaft is permanently retained at the transmission housing.

The term "element of a planetary gearset" is defined as a sun gear, a planetary carrier or a ring gear of this planetary gearset.

In connection with the coupling of a shift element to a planetary gear, the phrase "permanently connected" is defined as the input or output element of the individual shift element being directly connected to one of the elements of the individual planetary gearset via a rotationally engaged or torsionally elastic connection, such that there is always a fixed speed relationship between this planetary gearset element and the input and output element of this shift element.

In connection with the coupling of a shift element to a shaft, the phrase "permanently connected" is defined as the input or output element of the individual shift element being directly connected to the individual shaft via a rotationally engaged or torsionally elastic connection, such that there is always a fixed speed relationship between this shaft and the input and output element of this shift element.

In connection with the coupling of a planetary gearset to another planetary gearset, the phrase "permanently connected" is defined as one of the elements of the individual planetary gearset being directly connected to one of the elements of the other planetary gearset via a rotationally engaged or torsionally elastic connection, such that there is always a fixed speed relationship between these two planetary gearset elements. This permanent connection covers an integral design and a known component design such as a coupling planetary gear carrier-planetary gear carrier or a coupling ring gear-ring gear in which both ring gears have the same tooth geometry.

In connection with the coupling of a planetary gearset element or a shift element to the housing, the phrase "permanently connected" is defined as the individual planetary gearset element or the output element of the individual shift element being directly connected to the housing via a rotationally engaged or torsionally elastic connection, such that the individual planetary gearset element or the output element of the individual shift element is always stopped.

Thus, the automatic transmission according to the invention has independent kinematics in comparison to the prior art, wherein up to fourteen, but at least ten forward gears having gear ratios sensible in practice and gear spacings sensible in practice can be achieved based on the seven shift elements. In addition, up to two reverse gears can be achieved. In the case of the automatic transmission according to the invention, three of the seven shift elements are closed for every gear, wherein only one of the previously closed shift elements is opened and one previously open shift element is closed when the next higher or lower gear is achieved, such that during sequential upshifting and downshifting by one gear, the so-called group shifting can be avoided.

If the kinematics of the coupling of the five planetary gearsets to each other, to the various shift elements, to the drive shaft and to the output shaft are maintained according to the invention, the structural design of the automatic transmission can be varied within wide limits. Preferably for high efficiency, all planetary gearsets are each designed as a minus planetary gearset, the planet gears of which mesh with sun gear and ring gear of this planetary gearset. As mentioned above, one or more of the planetary gearsets may also each be designed as (a) plus planetary gearset(s) permitting alternative spatial arrangements of individual shift elements within the transmission housing. As is well known, a positive planetary gearset includes a planetary carrier having inner and outer planetary gears rotatably mounted thereon, wherein each of the inner planetary gears meshes with an outer planetary gear and with the sun gear of the plus planetary gear, whereas each of the outer planetary gears meshes with an inner planetary gear and with the ring gear of the positive planetary gear.

To ensure the same kinematics of the claimed gearset system, it is sufficient, as already mentioned, for the first element of every minus planetary gearset and the first element of every plus planetary gearset to be designed as sun gears, for the second element of every minus planetary gearset to be designed as a planetary carrier, whereas the second element of every plus planetary gearset is formed as a ring gear, and for the third element of every negative planetary gearset to be designed as a ring gear, whereas the third element of every plus planetary gearset is designed as a planetary carrier.

In a first embodiment of the main gearset, it is proposed that the main gearset has exactly four main gearset shafts, and that the second main gearset shaft can be connected to the drive shaft by closing the seventh shift element.

In this case provisions can be made, for example, for the first element of the fourth planetary gearset and the first element of the fifth planetary gearset to be permanently interconnected and form the first main gearset shaft, the second element of the fifth planetary gearset to form the second main gearset shaft, the second element of the fourth planetary gearset and the third element of the fifth planetary gearset to be permanently interconnected and form the third main gearset shaft, and the third element of the fourth planetary gearset form the fourth main gearset shaft. This type of main gearset in the design of a Simpson planetary gearset is characterized by high efficiency and cost-effective manufacture.

In a first alternative, for example, it may be provided that the first element of the fifth planetary gearset forms the first main gearset shaft, that third element of the fourth planetary gearset and the second element of the fifth planetary gearset are permanently interconnected or formed as a joint element and form the second main gearset shaft, that the second element of the fourth planetary gearset and the third element of the fifth planetary gearset are permanently interconnected or formed as a joint element and form the third main gearset shaft, and that the first element of the fourth planetary gearset forms the fourth main gearset shaft. This main gearset type can be implemented in an advantageous manner as a compact Ravigneaux planetary gearset, in which kinematically the fourth planetary gearset is a plus planetary gearset and the fifth planetary gearset kinematically is a minus planetary gearset.

In a second alternative, for instance, it may be provided that the first element of the fourth planetary gearset forms the first main gearset shaft, that the third element of the fifth planetary gearset forms the second main gearset shaft, that the second element of the fourth planetary gearset and the second element of the fifth planetary gearset are permanently interconnected or formed as a joint component and form the third main gearset shaft, and that the third element of the fourth planetary gearset and the first element of the fifth planetary gearset are permanently interconnected [and] form the fourth main gearset shaft. This main gearset type is particularly suitable for radial interlacing reducing design length, in which interlacing, viewed in the axial direction, the fifth planetary gearset is arranged radially above the fourth planetary gearset.

In a third alternative, it may be provided, for instance, that the first element of the fifth planetary gearset forms the first main gearset shaft, that the third element of the fourth planetary gearset and the second element of the fifth planetary gearset are permanently interconnected and form the second main gearset shaft, that the second element of the fourth planetary gearset and the third element of the fifth planetary gearset are permanently interconnected and form the third main gearset shaft, and that the first element of the fourth planetary gearset forms the fourth main gearset shaft.

In a fourth alternative, it may be provided, for instance, that the third element of the fifth planetary gearset forms the first main gearset shaft, that the third element of the fourth planetary gearset and the second element of the fifth planetary gearset are permanently interconnected and form the second main gearset shaft, that the second element of the fourth planetary gearset forms the third main gearset shaft, and that the first element of the fourth planetary gearset and the first element of the fifth planetary gearset are permanently interconnected and form the fourth main gearset shaft.

In a second embodiment of the main gearset, it is proposed that the main gearset has an additional fifth main gearset shaft, that the second main gearset shaft is permanently connected to the drive shaft and that the seventh shift element is arranged in the flow of power between the third and fifth main gearset shaft.

In this case it may be provided, for instance, that the first element of the fourth planetary gearset and the first element of the fifth planetary gearset are permanently interconnected and form the first main gearset shaft permanently connected to the drive shaft, that the second element of the fifth planetary gearset forms the second main gearset shaft, that the second element of the fourth planetary gearset forms the third main gearset shaft, and that the third element of the fourth planetary gearset forms the fourth main gearset shaft.

In a first embodiment of the intermediate gearset it is proposed that the third element of the third planetary gearset forms the first intermediate gearset shaft, that the third element of the second planetary gearset and the second element of the third planetary gearset are permanently interconnected and form the second intermediate gearset shaft, that the second element of second planetary gearset forms the third intermediate gearset shaft, and that the first element of the second planetary gearset and the first element of the third planetary gearset are permanently interconnected or formed as a joint element and form the fourth intermediate gearset shaft. This type of intermediate gearset in the design of a Simpson planetary gearset is characterized by high efficiency and cost-effective manufacture.

In a second embodiment of the intermediate gearset it is proposed that the first element of the third planetary gearset forms the first intermediate gearset shaft, that the third element of the second planetary gearset and the second element of the third planetary gearset are permanently interconnected or formed as a joint element and form the second intermediate gearset shaft, that the second element of the second planetary gearset and the third element of the third planetary gearset are permanently interconnected or formed as a joint element and form the third intermediate gearset shaft, and that the first element of the second planetary gearset forms the fourth intermediate gearset shaft. This intermediate gearset type can be implemented in an advantageous manner as a compact Ravigneaux planetary gearset, in which kinematically the second planetary gearset is a plus planetary gearset and the third planetary gearset kinematically is a minus planetary gear.

In a third embodiment of the intermediate gearset it is proposed that the first element of the second planetary gearset forms the fourth intermediate gearset shaft, that the third element of the second planetary gearset and the first element of the third planetary gearset are permanently interconnected and form the first intermediate gearset shaft, that the third element of the third planetary gearset forms the third intermediate gearset shaft, and that the second element of the second planetary gearset and the second element of the third planetary gearset are permanently interconnected or formed as a joint element and form the second intermediate gearset shaft. This intermediate gearset type is particularly suitable for radial interlacing reducing design length, in which interlacing, viewed in the axial direction, the third planetary gearset is arranged radially above the second planetary gearset.

In a fourth embodiment of the intermediate gearset it is proposed that the first element of the third planetary gearset forms the first intermediate gearset shaft, that third element of the second planetary gearset and the second element of the third planetary gearset are permanently interconnected and form the second intermediate gearset shaft, that the second element of the second planetary gearset and the third element of the third planetary gearset are permanently interconnected and form the third intermediate gearset shaft, and that the first element of the second planetary gearset forms the fourth intermediate gearset shaft.

In a first embodiment of the front-mounted gearset, it is proposed that the first element of the front-mounted gearset forms the first front-mounted gearset shaft, that the second element of the front-mounted gearset forms the second front-mounted gearset shaft, and that the third element of the front-mounted gearset forms the third front-mounted gearset shaft.

In a second embodiment of the front-mounted gearset, it is proposed that the third element of the front-mounted gearset forms the first front-mounted gearset shaft, that the second element of the front-mounted gearset forms the second front-mounted gearset shaft, and that the first element of the front-mounted gearset forms the third front-mounted gearset shaft.

The second shift element provided for blocking the first front-mounted gearset can be arranged between the first and second elements of the first planetary gearset in the flow of power, for instance. In an alternative, which is favorable in terms of the supporting torque, which the second shift element can transmit in the closed state, it is proposed to arrange the second shift element in the flow of power between the first and third elements of the first planetary gearset.

It is a particular advantage of the invention that all proposed types of main gearsets can be combined with all proposed intermediate gearset types and with all proposed front-mounted gearset types.

Preferably, three of its shift elements are closed in every gear of the automatic transmission according to the invention, wherein only one of the previously closed shift elements is opened and only one previously open shift element is closed when the next higher or lower gear is achieved, such that during sequential shifting by one gear, so-called group shifting can be avoided.

To implement fourteen forward gears and two reverse gears using seven shift elements, the following shift logic or gear logic may be provided: In first forward gear, the first, third and sixth shift elements transmit torque, i.e. are closed. In second forward gear, the first, second and sixth shift elements transmit torque, i.e. are closed. In third forward gear, the first, fifth and sixth shift elements transmit torque, i.e. are closed. In fourth forward gear, the second, fifth and sixth shift elements transmit torque, i.e. are closed. In fifth forward gear, the third, fifth and sixth shift elements transmit torque, i.e. are closed. In the sixth forward gear, the third, sixth and seventh shift elements, alternatively the fifth, sixth and seventh shift elements or alternatively the second, sixth and seventh shift elements or alternatively the fourth, sixth and seventh shift elements transmit torque, i.e. are closed. In seventh forward gear, the third, fifth and seventh shift elements transmit torque, i.e. are closed. In eighth forward gear, the second, fifth and seventh shift elements transmit torque, i.e. are closed. In ninth forward gear, the first, fifth and seventh shift elements transmit torque, i.e. are closed. In tenth forward gear, the first, second and seventh shift elements transmit torque, i.e. are closed. In eleventh forward gear, the first, third and seventh shift elements transmit torque, i.e. are closed. In twelfth forward gear, the first, fourth and seventh shift elements transmit torque, i.e. are closed. In thirteenth forward gear, the third, fourth and seventh shift elements transmit torque, i.e. are closed. In fourteenth forward gear, the second, fourth and seventh shift elements transmit torque, i.e. are closed. In first reverse gear, the third, fourth and sixth shift elements transmit torque, i.e. are closed. In second reverse gear, the second, fourth and sixth shift elements transmit torque, i.e. are closed.

This exemplary shift logic permits a maximum number of gears and a maximum difference between gear ratios, which provides a good basis, in particular for a modular transmission system having variants of different numbers of gears. Advantageously, it is possible to design the first forward gear as creeper forward gear having a very high driveaway transmission ratio and the second reverse gear as creeper reverse gear having a very high driveaway transmission ratio and to permit the control to attain these two creeper gears only in certain types of vehicles such as a commercial vehicle, a pickup or an off-road vehicle. Alternatively, these creeper gears may only be situationally attainable in the transmission, for instance in conjunction with a special driver command in an off-road vehicle.

Therefore, the shift logic proposed for a 14-speed automatic transmission results in an attractive variant regarding the difference between gear ratios and gear spacing when the original first forward gear is separated as creeper forward gear or eliminated, the original eleventh forward gear is eliminated, the original thirteenth forward gear is eliminated and the original second reverse gear is separated as creeper reverse gear or eliminated. Such a modified shift logic results in an automatic transmission having eleven achievable forward gears and one reverse gear without group shifting, with the option of an additional creeper forward gear and the option of an additional creeper reverse gear. Due to the very fine gear spacing provided, the omission of individual overdrive forward gears of the proposed automatic transmission will not have a negative impact in practice.

Another option, based on the shift logic proposed for a 14-speed automatic transmission, is the additional omission of the original ninth forward gear, such that such a modified shift logic results in an automatic transmission having at least ten shiftable forward gears and one reverse gear without group shifting, without curtailing the difference between gear ratios when the option of the additional creeper forward gear and the additional creeper reverse gear is to be maintained.

With regard to the spatial arrangement of the five planetary gearsets in the housing of the automatic transmission, in one embodiment arranging all five planetary gearsets coaxially next to each other is proposed in the defined order "first, second, third, fourth, fifth planetary gear" meaning all shift elements can be provided with the pressure required for hydraulic actuation keeping leakage low. For an application having coaxially extending drive and output shafts, the first planetary gearset being the one of the planetary gearset group facing the drive of the automatic transmission is expedient.

Of course, other spatial arrangements of the five planetary gearsets and the seven shift elements in the housing of the automatic transmission are feasible.

Accordingly, in another embodiment of the spatial arrangement of the five planetary gearsets in the housing of the automatic transmission, arranging the front-mounted gearset, the intermediate gearset and the main gearset coaxially next to each other in the defined order "first planetary gearset, intermediate gear, fourth planetary gearset, fifth planetary gearset" is proposed and so forming the intermediate gearset as a radially interlaced gearset, wherein the second planetary gearset is arranged radially within the third planetary gearset, viewed in the axial direction. Due to such an arrangement, the design length of the automatic transmission can be significantly shortened; however this requires a larger diameter space around the intermediate gearset.

In yet another embodiment of the spatial arrangement of the five planetary gearsets in the housing of the automatic transmission, arranging the front-mounted gearset, the intermediate gearset and the main gearset coaxially to each other in the defined order "front-mounted gearset, intermediate gearset and main gearset" is proposed, and thus forming both the intermediate gearset and the main gearset each as radially interlaced gearsets, wherein in the intermediate gearset, the second planetary gearset is arranged radially within the third planetary gearset viewed in the axial direction, whereas in the main gearset, the fourth planetary gearset is arranged radially within the fifth planetary gearset viewed in the axial direction. The advantage of such an arrangement is (measured by the number of planetary gearsets and shift elements) the extremely small length of the automatic transmission, it does, however, require a sufficiently large installation space in terms of diameter.

In a further embodiment of the spatial arrangement of the five planetary gearsets in the housing of the automatic transmission, arranging all five planetary gearsets coaxially next to each other in the defined order "fifth, fourth, first, third, second planetary gearset" is proposed, whereby the output of the automatic transmission can be arranged in a central area of the transmission housing axially between the fourth and first planetary gearset, viewed spatially, without having to do without the minimum-leak supply of pressure media to the clutches. Such an arrangement is particularly favorable when the drive and the output of the automatic transmission are arranged in parallel to the axes, as is customary, for instance in motor vehicles having an engine installed transverse to the direction of travel. The fifth planetary gearset being the planetary gearset of the planetary gearset group facing the drive of the automatic transmission is expedient. However, the second planetary gearset being the one of the planetary gearset group facing the drive of the automatic transmission may also be provided for.

All proposed embodiments of an automatic transmission according to the invention, in particular for passenger cars and light commercial vehicles, have ratios having a very large overall difference between gear ratios in terms of drivability favorable gear spacings useful in practice, which has a positive effect on the desired low fuel consumption. In addition, the automatic transmission according to the invention is characterized by a small number of shift elements compared to the number of gears and comparatively low construction cost as well as a high degree of efficiency.

Advantageously, in the automatic transmission according to the invention, a driveaway of the motor vehicle can be implemented both using a driveaway element outside the transmission and using a friction shift element inside the transmission. A driveaway element outside the transmission can be configured in a manner known per se, for instance as a hydrodynamic torque converter (preferably having a converter lockup clutch), as a so-called dry driveaway clutch, as a so-called wet driveaway clutch, as a magnetic powder clutch or as a centrifugal clutch. As an alternative to the arrangement of such a driveaway element in the direction of the flow of power between the drive motor and the automatic transmission, the driveaway element outside the transmission can also be arranged downstream of the automatic transmission in the direction of the flow of force, in which case the drive shaft of the automatic transmission is permanently connected to the crankshaft of the drive motor either in a torsionally fixed or a torsionally flexible manner. The sixth shift element, which transfers torque at least in the first five forward gears and in both possible reverse gears, designed as a brake is particularly suitable as a shift element inside the transmission.

In addition, the automatic transmission according to the invention is designed such that adaptivity to different drive train configurations is made possible both in the direction of the flow of power and spacewise. Thus, based on the same transmission scheme, depending on the stationary gear ratio of the individual planetary gearsets, different gear increments can result making an application-specific or vehicle-specific variation possible. Furthermore, drive and output of the automatic transmission can be arranged either coaxially or axially parallel to each other without special design measures being required. A rear or front differential and/or a center differential can be arranged on the drive side or on the output side of the automatic transmission. Providing additional freewheel units at any suitable point of the automatic transmission is also possible, for instance between a shaft and the housing or to optionally connect two shafts. In addition, a non-wearing brake such as a hydraulic or an electric retarder may be arranged on each shaft, preferably on the drive shaft or on the output shaft, which is of particular importance for use in commercial vehicles. A power take-off may also be provided, preferably on the drive shaft or the output shaft, to drive additional units on each shaft.

Another advantage of the automatic transmission according to the invention is that on each of its rotary shafts an electric machine can also be installed as a generator and/or as an additional drive machine. In general, such an electric machine can be coupled directly to the drive shaft or directly to the output shaft of the automatic transmission in a structurally very simple way. However, based on the proposed gearset concept, such an electric machine can also be coupled directly to the connecting shaft, which permanently connects the intermediate gearset to the main gear, in a structurally very simple way, such that the rotary rotor of this electric machine is permanently connected to the third intermediate gearset shaft and the first main gearset shaft.

The shift elements used can be designed as load-shifting clutches or brakes. In particular, non-positive clutches or brakes—such as multi-disk clutches, band brakes and/or cone clutches—can be used. Positive brakes and/or clutches—such as synchronizers or dog clutches—can however also be used as shift elements.

BRIEF DESCRIPTION OF THE DRAWINGS

Below, the invention will be explained in more detail by way of example with reference to the drawings. Identical or comparable components are given the same reference numerals. In the drawings:

FIG. 4A shows a first exemplary shift diagram for the automatic transmission shown in FIG. 1;

FIG. 4B shows a second exemplary shift diagram for the automatic transmission shown in FIG. 1;

FIG. 4C shows a third exemplary shift diagram for the automatic transmission shown in FIG. 1;

FIG. 5A shows a schematic representation of a first application example of a hybrid powertrain including an automatic transmission derived from FIG. 1;

FIG. 18 shows an exemplary shift diagram for the automatic transmission shown in FIG. 16.

DETAILED DESCRIPTION OF THE PREFERRED EMBODIMENTS

Figure 1:
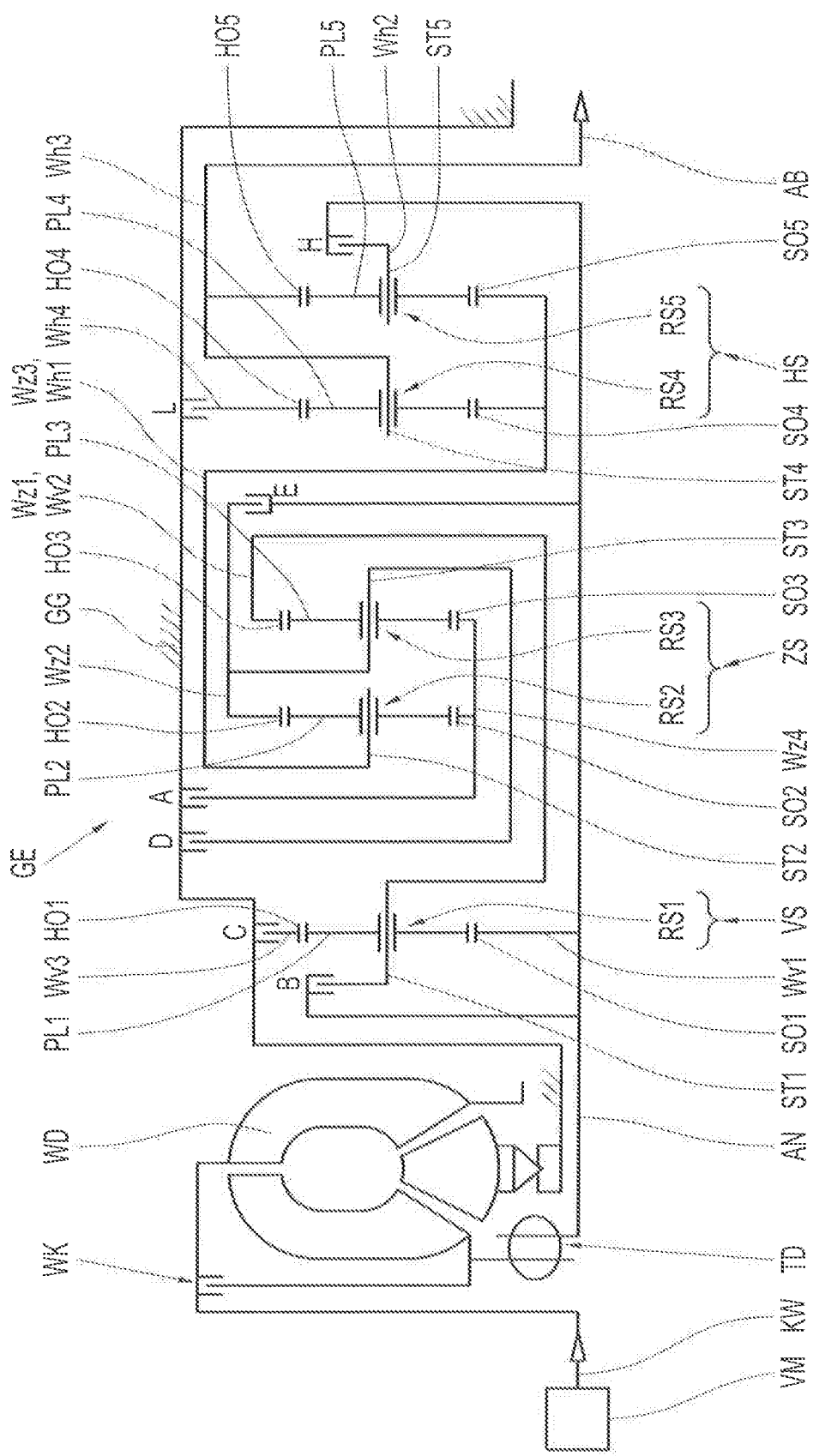
FIG. 1 shows a schematic representation of a first exemplary embodiment of an automatic transmission according to the invention.

FIG. 1 shows the gearset diagram of a first exemplary embodiment of an automatic transmission according to the invention. The transmission GE designed as an automatic transmission comprises a rotary drive shaft AN, a rotary output shaft AB, five planetary gearsets RS1, RS2, RS3, RS4 and RS5 and seven shift elements A, B, C, D, E, L and H, which are all arranged in a transmission housing GG of the transmission GE. The five planetary gearsets RS1 to RS5 are spatially arranged, by way of example axially sequentially, in this case by way of example in the order "RS1-RS2-RS3-RS4-RS5", wherein the first planetary gearset RS1 faces the drive of the transmission GE.

The transmission GE can be driven by an internal combustion engine VM, the rotary crankshaft KW of which is operatively connected to the drive shaft AN of the transmission via a driveaway element configured as a torque converter WD by way of example. As usual in modern torque converters, a converter lockup clutch WK is provided in parallel to the hydraulic circuit of the torque converter WD in the flow of power. For vibration decoupling, the torque converter WD comprises a mechanical torsional damper TD, which is arranged between the crankshaft KW and the drive shaft AN and in this case is, by way of example, directly and permanently connected to the drive shaft AN in the flow of power. Depending on the application, a person skilled in the art will adapt the structure of the torque converter WD to the given requirements and optionally also provide another driveaway element such as, for instance, a driveaway clutch.

The first planetary gearset RS1 forms a front-mounted gearset VS designed in the manner of a 1-carrier 3-shaft planetary transmission comprising three rotary front-mounted gearset shafts Wv1, Wv2 and Wv3. Here, the first front-mounted gearset shaft Wv1 is permanently connected to the drive shaft AN as an input shaft of the front-mounted gearset VS, whereas the second front-mounted gearset shaft Wv2 is connected to the drive shaft AN via the second shift element designed as a clutch B, such that when the second shift element B is closed, the front-mounted gearset VS is locked, a state in which all three front-mounted gearset shafts Wv1, Wv2, Wv3 rotate at the same speed—specifically at speed of the drive shaft AN. The third front-mounted gearset shaft Wv3 can be retained at the transmission housing GG via the third shift element C designed as a brake. The second front-mounted gearset shaft Wv2 is permanently connected to an intermediate gearset ZS as the output shaft of the front-mounted gearset VS; the structure of the intermediate gearset ZS will be explained later.

The first planetary gearset RS1 is formed by way of example as a minus planetary gearset, comprising a first element designed as a sun gear SO1, a second element designed as a planetary carrier ST1, and a third element designed as a ring gear HO1. Corresponding to the design of the first planetary gearset RS1 as a minus planetary gearset, planetary gears PL1 are rotatably mounted on the planetary carrier ST1, which mesh with the sun gear SO1 and the ring gear HO1. The sun gear SO1 forms the first front-mounted gearset shaft Wv1, the planetary carrier ST2 forms the second front-mounted gearset shaft Wv2 and the ring gear HO1 forms the third front-mounted gearset shaft Wv3.

The second and the third planetary gearsets RS2, RS3 form a shiftable intermediate gearset ZS designed in the manner of a 2-carrier 4-shaft planetary gearset comprising four rotary intermediate gearset shafts Wz1, Wz2, Wz3 and Wz4. The first intermediate gearset shaft Wz1 is permanently connected to the second front-mounted gearset shaft Wv2 as an input shaft of the intermediate gearset ZS and can be connected to the drive shaft AN via the second shift element B. The second intermediate gearset shaft Wz2 forms a first coupling shaft of the intermediate gearset ZS, can be retained on the transmission housing GG via the fourth shift element D designed as a brake and can be connected to the drive shaft AN via the fifth shift element E designed as a clutch. The third front-mounted gearset shaft Wz3 is permanently connected to a main gearset HS as the output shaft of the intermediate gearset ZS, the structure of the main gearset HS will be explained below. The fourth intermediate gearset shaft Wz4 forms a second coupling shaft of the intermediate gearset ZS and can be retained at the transmission housing GG via the first shift element A formed as a brake.

The second planetary gearset RS2 is formed by way of example as a minus planetary gearset comprising a first element designed as a sun gear SO2, a second element designed as a planetary carrier ST2, and a third element designed as a ring gear HO2. Corresponding to the design of the second planetary gearset RS2 as a minus planetary gearset, planetary gears PL2 are rotatably mounted on the planetary carrier ST2, which mesh with the sun gear SO2 and the ring gear HO2. The third planetary gearset RS3 is also formed by way of example as a minus planetary gearset comprising a first element designed as a sun gear SO3, a second element designed as a planetary carrier ST3, and a third element designed as a ring gear HO3. Corresponding to the design of the third planetary gearset RS3 as a minus planetary gearset, planetary gears PL3 are rotatably mounted on the planetary carrier ST3, which mesh with the sun gear SO3 and the ring gear HO3. The ring gear HO2 of the second planetary gearset RS2 and the planetary carrier ST3 of the third planetary gearset RS3 are permanently interconnected as the first coupling shaft of the intermediate gearset ZS, whereas the second coupling shaft of the intermediate gearset ZS, the sun gear SO2 of the second planetary gearset RS2 and the sun gear SO3 of the third planetary gearset RS3 are permanently interconnected.

The ring gear HO3 of the third planetary gearset RS3 forms the first intermediate gearset shaft Wz1. The ring gear HO2 of the second planetary gearset RS2 and the planetary carrier ST3 of the third planetary gearset RS3 jointly form the second intermediate gearset shaft Wz2. The planetary carrier ST2 of the second planetary gearset forms the third intermediate gearset shaft Wz3. The sun gears SO2, SO3 of the second and third planetary gearsets RS2, RS3 jointly form the fourth intermediate gearset shaft Wz4.

The fourth and fifth planetary gearsets RS4, RS5 form a shiftable main gearset HS designed in the manner of a 2-carrier 4-shaft planetary gearset comprising four rotary intermediate gearset shafts Wh1, Wh2, Wh3 and Wh4. On the one hand, the first main gearset shaft Wh1 forms a first coupling shaft of the main gearset HS and, on the other hand, as the input shaft of the main gearset HS, it is permanently connected to the third intermediate gearset shaft Wz3. The second main gearset shaft Wh2 can be connected to the drive shaft via the seventh shift element H designed as a clutch. On the one hand, the third main gearset shaft Wh3 forms a second coupling shaft of the main gearset HS and, on the other hand, as the output shaft of the main gearset HS it is permanently connected to the output shaft AB. The fourth main gearset shaft Wh4 can be retained at the transmission housing via the sixth shift element L designed as a brake.

The fourth planetary gearset RS4 is formed by way of example as a minus planetary gearset, comprising a first element designed as a sun gear SO4, a second element designed as a planetary carrier ST4, and a third element designed as a ring gear HO4. Corresponding to the design of the fourth planetary gearset RS4 as a minus planetary gearset, planetary gears PL4 are rotatably mounted on the planetary carrier ST4, which mesh with the sun gear SO4 and the ring gear HO4. The fifth planetary gearset RS5 is also formed by way of example as a minus planetary gearset comprising a first element designed as a sun gear SO5, a second element designed as a planetary carrier ST5, and a third element designed as a ring gear HO5. Corresponding to the design of the fifth planetary gearset RS5 as a minus planetary gearset, planetary gears PL5 are rotatably mounted on the planetary carrier ST5, which mesh with the sun gear SO5 and the ring gear HO5. The sun gears SO4, SO5 of the fourth and fifth planetary gearsets RS4, RS5 as the first coupling shaft of the main gearset HS are permanently interconnected, whereas the second coupling shaft of the main gearset HS of the planetary carrier ST4 of the fourth planetary gearset RS4 and the ring gear HO5 of the fifth planetary gearset RS5 are permanently interconnected.

The sun gears SO4, SO5 of the fourth and fifth planetary gearsets RS4, RS5 jointly form the first main gearset shaft Wh1. The planetary carrier ST5 of the fifth planetary gearset RS5 forms the second main gearset shaft Wh2. The planetary carrier ST4 of the fourth planetary gearset RS4 and the planetary carrier HO5 of the fifth planetary gearset RS5 jointly form the third main gearset shaft Wh3. The ring gear HO4 of the fourth planetary gearset RS4 forms the fourth main gearset shaft Wh4.

The gears in the transmission GE are attained via its seven shift elements A, B, C, D, E, L and H, all of which are formed as friction shift elements having disks as friction elements as shown in FIG. 1 by way of example. The spatial arrangement in the transmission housing GG is described in more detail below. As shown in FIG. 1, the front-mounted gearset VS, the intermediate gearset ZS and the main gearset HS are arranged coaxially and sequentially in this order, wherein the front-mounted gearset VS faces the internal combustion engine VM provided for driving the transmission GE.

The clutch B is arranged on the transmission input, i.e. on that side of the front-mounted gearset VS facing away from the intermediate gearset ZS. In this case, the clutch B has an external disk support permanently connected to the drive shaft AN, which in addition to the disk set of the clutch B also holds the servo device required for actuating this disk set making for a structurally simple and minimum-leak supply of pressure and lubricant for the hydraulic control and cooling of the rotating clutch B from the drive shaft AN.

As a minimum, the disk set of the brake C is arranged in the axial direction in an area radially above the front-mounted gearset VS. In this case, the brake C has an internal disk support, which in terms of manufacturing technology and costs can be advantageously built in conjunction with the ring gear HO1 of the first planetary gearset RS1 as a joint—for instance, integral—component. In the usual manner, the exterior disk support of brake C may be integrated in the transmission housing GG. The very good accessibility by design for the hydraulic (or alternatively mechanical or alternatively electrical) control of the brake C is also advantageous.

The two brakes D and A are arranged by way of example on a large diameter axially next to each other in the area of the outer wall of the transmission housing GG, viewed in the axial direction, in an area axially between the front-mounted gearset VS and intermediate gearset ZS, wherein the brake D is arranged closer to the front-mounted gearset VS than the brake A. As usual, the exterior disk support of the two brakes D, A may be integrated in the transmission housing GG. The very good accessibility by design for the hydraulic (or alternatively mechanical or alternatively electrical) control of these two brakes D, A is also advantageous.

In an alternative arrangement to save transmission length, for instance, provision may be made to arrange the brake D in an area radially above the brake C, viewed in the axial direction,—that is also radially above the front-mounted gearset VS— whereas the brake A is arranged in an area radially above the intermediate gearset ZS.

Viewed in the axial direction, the clutch E is arranged axially between the intermediate gearset ZS and the main gearset HS. In this case, the clutch E has an internal disk support permanently connected to the drive shaft AN, which in addition to the disk set of the clutch E also holds the servo device required for actuating this disk set, which by design makes for a simple and minimum-leak supply of pressure and lubricant for the hydraulic control and cooling of the rotating clutch E from the drive shaft AN.

To reduce transmission length, the brake L is arranged on a large diameter in the area of the outer wall of the transmission housing GG radially above the fourth planetary gearset RS4. In this case, the brake L has an internal disk support, which in terms of manufacturing technology and costs can be advantageously built in conjunction with the ring gear HO4 of the fourth planetary gearset RS4 as a joint—for instance, integral—component. In the known manner, the exterior disk support of the brake L may be integrated in the transmission housing GG. The constructive very good accessibility for the hydraulic (or alternatively mechanical or alternatively electrical) control of the brake L is also advantageous.

The clutch H is arranged on the output of the transmission, i.e. on that side of the main gearset HS facing away from the intermediate gearset ZS. In this case, the clutch H has an external disk support permanently connected to the drive shaft AN, which in addition to the disk set of the clutch H also holds the servo device required for actuating this disk set, which makes for a structurally simple and minimum-leak supply of pressure and lubricant for the hydraulic control and cooling of the rotating clutch H from the drive shaft AN.

While maintaining the given transmission kinematics, the spatial arrangement of the shift elements B, C, D, A, E, L, H within the transmission housing GG is variable within a wide range and is limited only by the dimensions and the outer shape of the transmission housing GG. Accordingly, the component arrangement shown in FIG. 1 shall be expressly understood to show just one of many possible component arrangement variants. In the same way, the embodiment of the shift elements shown in FIG. 1 as multi-plate clutches or disk brakes shall expressly be understood as merely exemplary. In alternative embodiments, for instance, form-locking shiftable claw or cone clutches, frictionally shifting band brakes or positively shiftable claw or cone brakes can be used.

Figure 2:
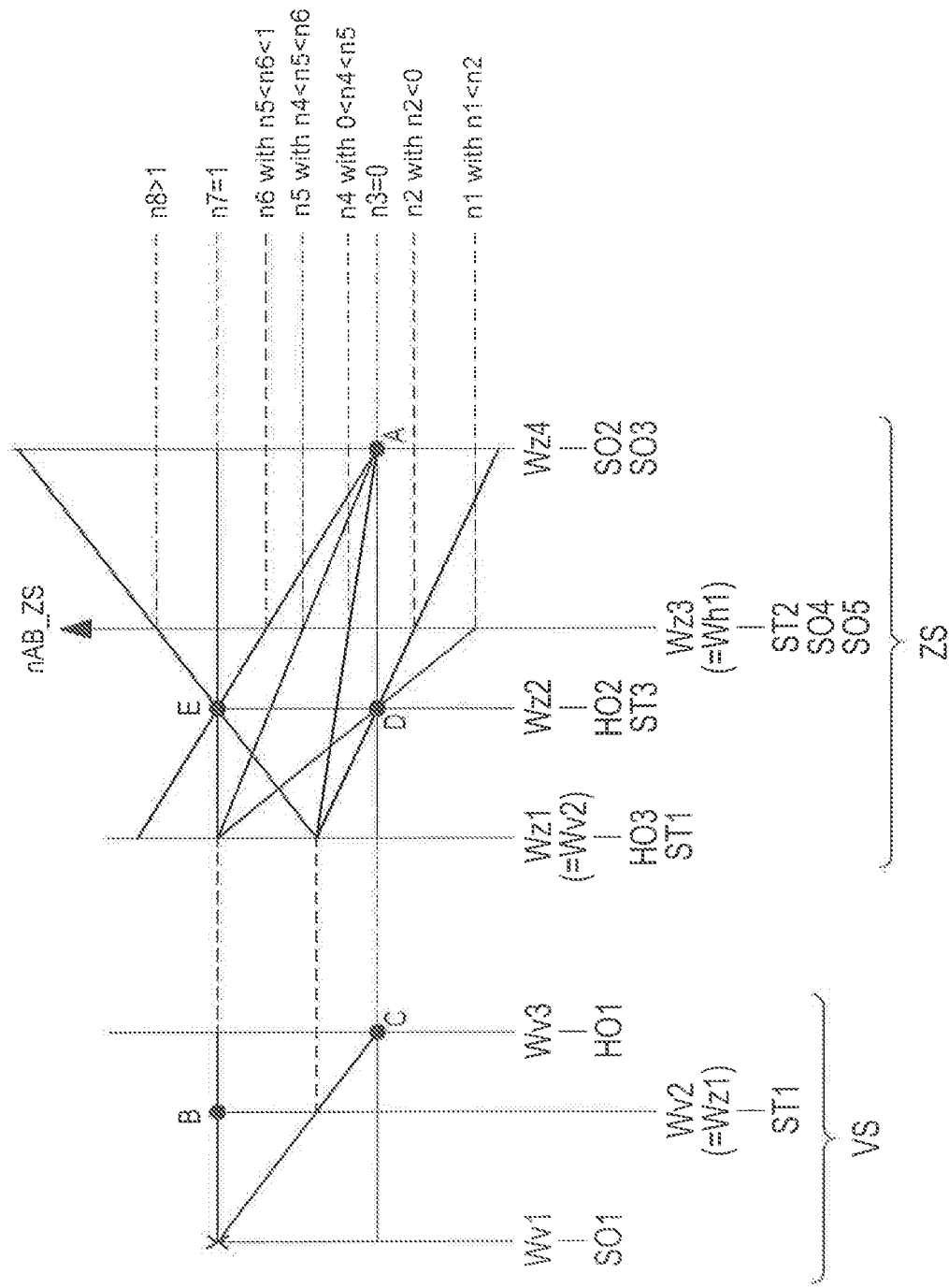
FIG. 2 shows a speed diagram for the description of the generation of the eight speeds at the output of the intermediate gearset of the automatic transmission shown in FIG. 1.
Figure 3:
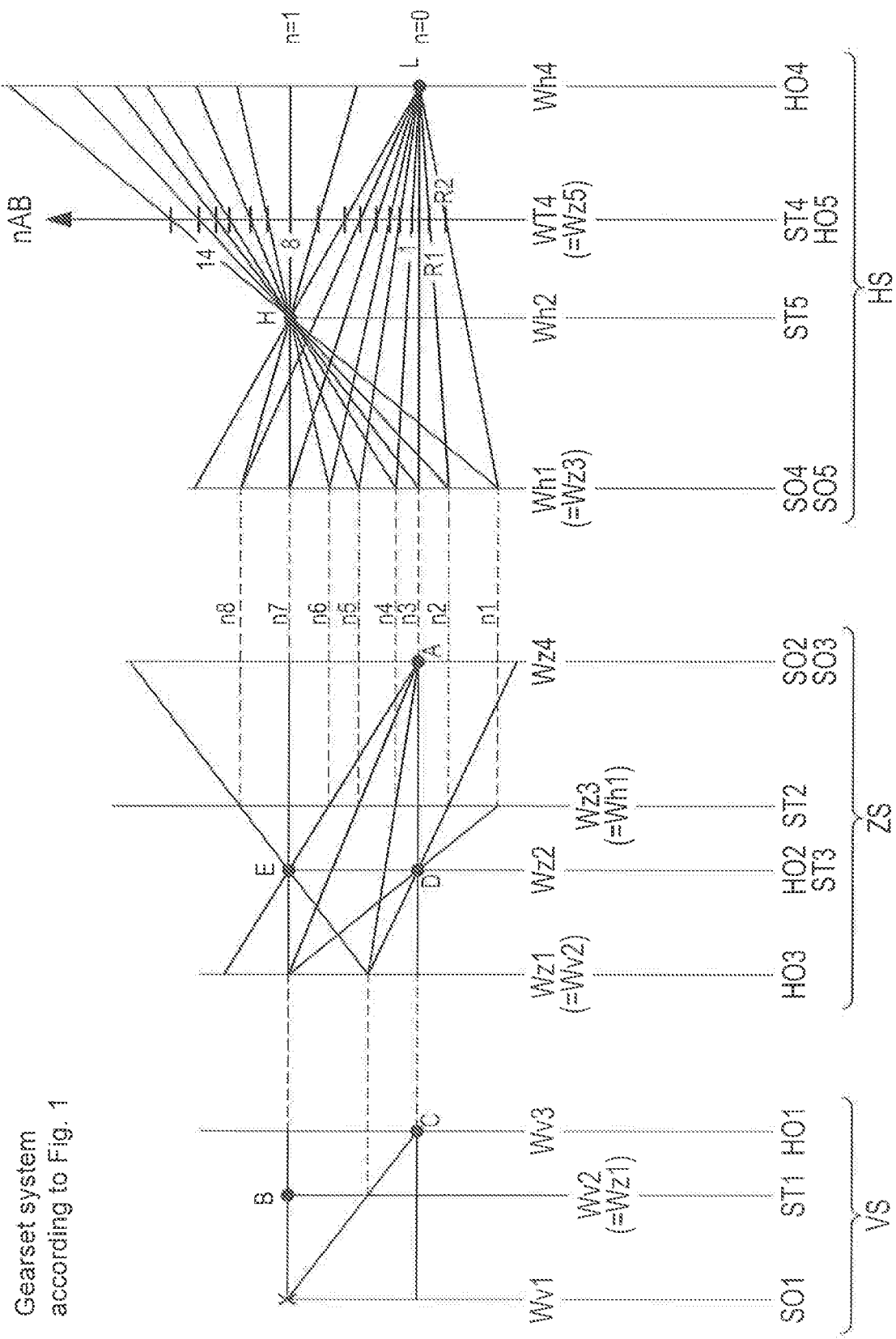
FIG. 3 shows a complete speed diagram of the automatic transmission shown in FIG. 1.

To illustrate the kinematics of the transmission GE according to the invention shown in FIG. 1, FIG. 3 shows a complete speed diagram of this transmission GE, whereas FIG. 2 shows an extract of this speed diagram. The illustrations in FIGS. 2 and 3 are largely self-explanatory.

Depending on the shift states of the second and third shift elements B, C, the front-mounted gearset VS of the transmission GE according to the invention shown in FIG. 1 can generate two different rotational speeds on the output side (in this case on the planetary carrier ST1), which are then transmitted to the first intermediate gearset shaft Wz1 (in this case the ring gear HO3). If the second shift element B is closed and thus the front-mounted gearset VS is locked, the second front-mounted gearset shaft Wv2 and thus also the first intermediate gearset shaft Wz1 rotate at the rotational speed of the drive shaft AN. If the third shift element C is closed, the second front-mounted gearset shaft Wv2 and thus also the first intermediate gearset shaft Wz1 rotate at a rotational speed smaller than that of the drive shaft AN.

The shift elements B and C may not be closed at the same time.

Depending on the shift states of the first, second, third, fourth and fifth shift elements A, B, C, D, E, the intermediate gearset ZS can generate eight different rotational output speeds on the output side (in this case on the planetary gearset carrier ST2), which are then transmitted to the main gearset HS—specifically to first main gearset shaft Wh1 (here the coupling shaft sun gear SO4/sun gear SO5)—and are designated n1 to n8 in FIG. 2 and FIG. 3.

Depending on the shift states of the sixth and seventh shift elements L, H, the main gearset HS can generate fourteen different positive and two different negative output speeds at the output side (here at the coupling shaft planetary carrier ST4/ring gear HO5), which are then transmitted to the output shaft AB of the transmission GE, from these eight output speeds n1, n2, n3, n4, n5, n6, n7, n8 of the intermediate gearset ZS. In FIG. 3, by way of example, the forward gears 1, 8 and 14 of these fourteen different forward gears, are denoted by numbers, whereas the two different reverse gears are denoted by R1 and R2.

As mentioned in connection with the speed diagram shown in FIG. 2, in the transmission GE according to FIG. 1 the total of seven shift elements A, B, C, D, E, L, H, can be used for a selective shifting of up to fourteen forward gears and two reverse gears, which will be explained in more detail below with reference to FIGS. 4A, 4B and 4C.

For instance, FIG. 4A shows a first exemplary shift diagram for the automatic transmission shown in FIG. 1. In each gear, three shift elements are closed, which is marked by "o" in the columns of FIG. 4A, which are assigned to the individual shift elements A, B, C, D, E, L, H.

Alternative optional gears are shown in parentheses, their shift element combinations are thus marked "(o)".

In order to implement fourteen forward gears and two reverse gears using the seven shift elements A, B, C, D, E, L, H, the following shift logic is proposed:

In first forward gear "1", the first, third and sixth shift elements A, C, L are closed or at least transmit torque.

In second forward gear "2", the first, second and sixth shift elements A, B, L are closed or at least transmit torque.

In third forward gear "3", the first, fifth and sixth shift elements A, E, L are closed or at least transmit torque.

In fourth forward gear "4", the second, fifth and sixth shift elements B, E, L are closed or at least transmit torque.

In fifth forward gear "5", the third, fifth and sixth shift elements C, E, L are closed or at least transmit torque.

In sixth forward gear "6", the third, sixth and seventh shift elements C, E, L are closed or at least transmit torque.

In seventh forward gear "7", the third, fifth and seventh shift elements C, E, H are closed or at least transmit torque.

In eighth forward gear "8", the second, fifth and seventh shift elements B, E, H are closed or at least transmit torque.

In ninth forward gear "9", the first, fifth and seventh shift elements A, E, H are closed or at least transmit torque.

In tenth forward gear "10", the first, second and seventh shift elements A, B, H are closed or at least transmit torque.

In eleventh forward gear "11", the first, second and seventh shift elements A, C, H are closed or at least transmit torque.

In twelfth forward gear "12", the first, second and seventh shift elements A, D, H are closed or at least transmit torque.

In thirteenth forward gear "13", the third, fourth and seventh shift elements C, D, H are closed or at least transmit torque.

In fourteenth forward gear "14", the first, second and seventh shift elements B, D, H are closed or at least transmit torque.

In first reverse gear "R1", the third, fourth and sixth shift elements C, D, L are closed or at least transmit torque.

In second reverse gear "R2", the second, fourth and sixth shift elements B, D, L are closed or at least transmit torque.

This shift logic permits both individual planetary gearsets RS4, RS5 of the main gearset HS to transmit torque only in sixth forward gear, whereas in all other gears always only one of the two individual planetary gearsets RS4, RS5 of the main gearset HS transmits torque, which positively affects the efficiency of the transmission GE.

According to this shift logic, so-called group shifting is avoided in sequential shifting mode—i.e. when shifting up or down by one gear—as two gear stages adjacent in the shift logic always conjointly use two shift elements.

In a first alternative "6.1" to the shift element combination for the sixth forward gear, the fifth, sixth and seventh shift elements E, L, H are closed or at least transmit torque. In this shift logic, group-shifting is also avoided when upshifting from fifth to sixth, and from sixth to seventh forward gear, and group-shifting is also avoided when shifting back from seventh to sixth and from sixth to fifth forward gear.

In a second alternative "6.2" to the shift element combination for the sixth forward gear, the second, sixth and seventh shift elements B, L, H are closed or at least transmit torque, and in a third alternative "6.3" the fourth, sixth and seventh shift elements D, L, H are closed or at least transmit torque, wherein in both cases group-shifting occurs during the sequential shifting by one gear in or out of the sixth forward gear, which requires special consideration in the context of shifting sequence control.

FIG. 4A, in addition to the shift logic, also specifies useful ratios of the individual gears and their computational efficiency, and the gear increments and the difference between gear ratios each resulting from these ratios. It is therefore readily apparent that the first forward gear "1" and the first reverse gear "R1" have a very high nominal ratio, such that the first forward gear "1" and the first reverse gear "R1" are so-called creeper gears, which in the transmission need only be achieved in special conditions and normal driveaway can be performed in second forward gear "2" or second reverse gear "R2". Accordingly, the shift logic shown in FIG. 4a also suggests that in the neutral position "N" the second and sixth shift elements B, L are preferably closed, such that only one further shift element must be closed for normal driveaway, namely for driving away in the second forward gear "2" the first shift element A and for driving away in the second reverse gear "R2" the fourth shift element D. When, however, the driveaway is to be performed in the creep gear "1" or "R1", the shift element combination marked "(N1)" is suitable, according to which the third and sixth shift elements C, L are closed. Of course, an alternative provision can also be made that in neutral position only one single shift element—in that case preferably the sixth shift element L—is closed or even none at all.

Overall, at least eleven forward gears and at least one reverse gear can be achieved at ratios useful in practice. As indicated in the column "gear increment" in FIG. 4A, due to the small gear increments, depending on the application it may make sense in the upper gear range to skip individual gears of the fourteen forward gears, for instance the forward gears "8", "10" and/or "12".

FIG. 4B shows a second exemplary shift pattern for the automatic transmission according to FIG. 1, based on the shift logic according to FIG. 4A. The driveaway gears having the highest nominal gear ratio designated in FIG. 4A as forward gear one and reverse gear one are now explicitly identified as creep gears "C" and "RC" in FIG. 4B, which are to be actuated only in special situations, for instance only in "off-road driving" or only in connection with heavy trailer loads or only in connection with special vehicle types. It is also readily apparent in FIG. 4B that the forward gears eleven and thirteen shown in FIG. 4A have been omitted, without noticeable curtailing of drivability in practice: In addition to the creep gears "C" and "RC", eleven forward gears and one reverse gear can still be achieved.

FIG. 4C shows a third exemplary shift pattern for the automatic transmission according to FIG. 1, based on the shift logic according to FIG. 4B. It can easily be seen that in this case the ninth forward gear provided in FIG. 4B has been omitted, such that in addition to the creep gears "C" and "RC", ten forward gears having in practice a very good gear spacing and difference between gear ratios and one reverse gear can still be achieved.

Of course, the transmission schemes previously illustrated in FIG. 1 can also be implemented based on a different spatial arrangement of the five planetary gearsets RS1, RS2, RS3, RS4, RS5 without changing the respective kinematics of the transmissions. This can be useful, in particular, if drive shaft AN and output shaft AB are not arranged coaxially in the transmission, as for instance in a so-called front-transverse placement in the vehicle.

Based on the finding that it is possible in principle to replace a so-called minus planetary gearset by a kinematically equivalent plus planetary gearset, provided that the coupling of sun gear, planetary carrier and ring gear of this planetary gearset to the other planetary gearsets and the shift elements and optionally to the housing is spatially feasible, a person skilled in the art will, if necessary, replace one or more of the minus planetary gearsets four planetary gearsets shown in the figures by one plus planetary gearset or several plus planetary gearsets. As is well known, each of the planetary gears in a minus planetary gearset meshes with both the sun gear and the ring gear, whereas each of the inner planet gears in a plus planetary gearset meshes with one of its outer planetary gears and the sun gear and each of its outer planetary gears meshes with one of its inner planetary gears and the ring gear.

To maintain the kinematics of the gearset system in this case, the first element of every minus planetary gearset has to be designed as a sun gear, the second element of every minus planetary gearset has to be designed as planetary carrier and the third element of every minus planetary gearset has to be designed as a ring gear, whereas the first element of every plus planetary has to be designed as a sun gear, the second element of every plus planetary gearset has to be designed as a ring gear and the third element of every plus planetary gearset has to be designed as a planetary carrier. All variants generated in this way can be operated based on the shift diagrams shown in FIGS. 4A, 4B and 4C.

Figure 5B:
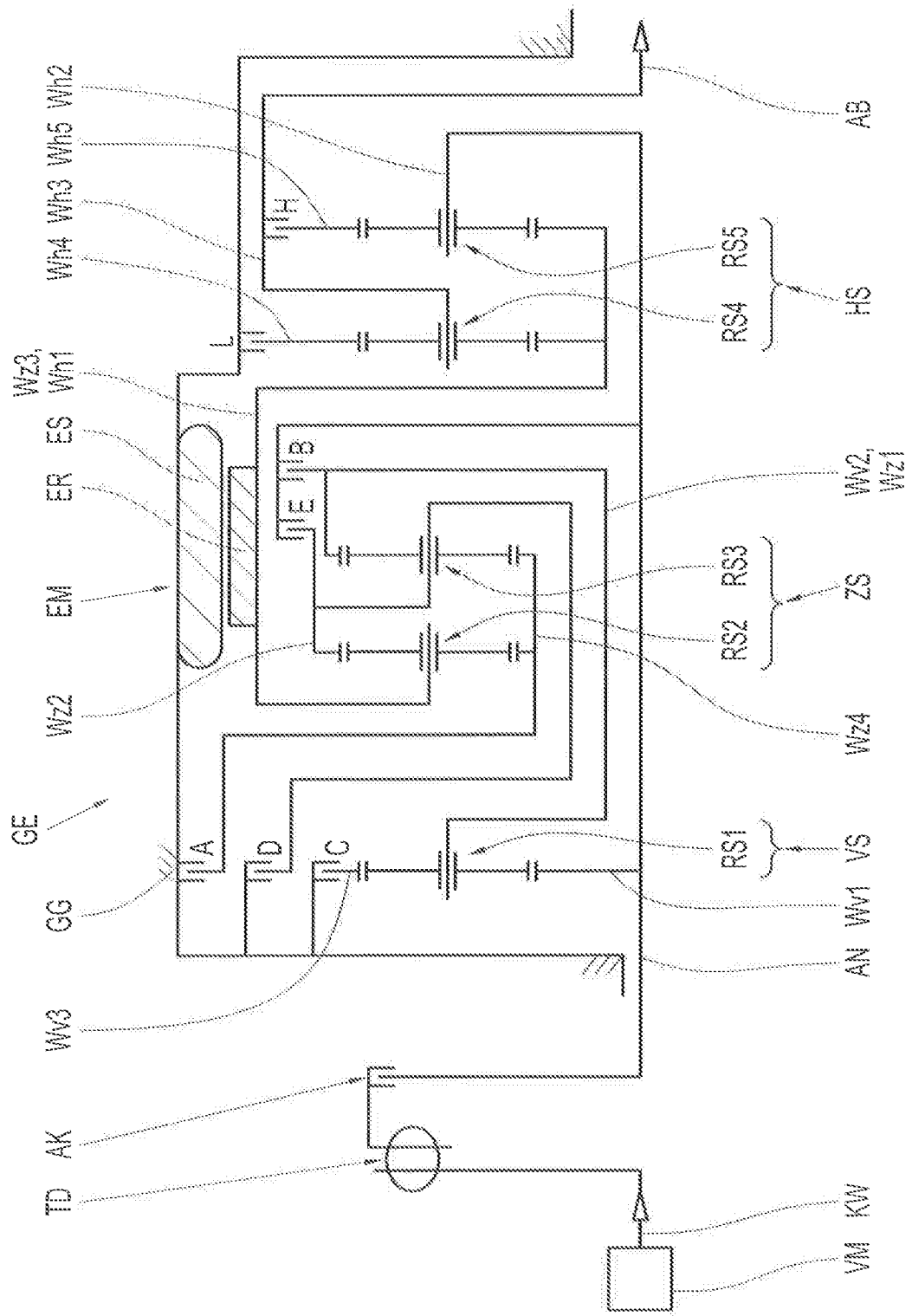
FIG. 5B shows a schematic representation of a second application example of a hybrid powertrain including an automatic transmission shown in FIG. 5A.

The transmission concept according to the invention is also particularly suitable for installation in a hybrid drive train, which is explained with reference to FIGS. 5A and 5B in more detail below. FIG. 5A shows a schematic representation of a first application example of a hybrid powertrain having an automatic transmission derived from FIG. 1, whereas FIG. 5B shows a schematic representation of a second application example of a hybrid powertrain having the automatic transmission shown in FIG. 5A.

It is readily apparent from FIG. 5A that the kinematics of the transmission GE differ from the transmission shown in FIG. 1 only in the design of the main gearset HS. In contrast to FIG. 1, in which the main gearset is designed as a 2-web 4-shaft planetary transmission, in FIG. 5A the fourth and fifth planetary gearsets RS4, RS5 form a shiftable main gearset HS, which is designed in the manner of a 2-web 5-shaft planetary gearset, now comprising five rotary main gearset shafts Wh1, Wh2, Wh3, Wh4 and Wh5. On the one hand, the first main gearset shaft Wh1 forms the only coupling shaft of the main gearset HS and, on the other hand, as the input shaft of the main gearset HS it is permanently connected to the third intermediate gearset shaft Wz3 of the intermediate gearset ZS. The second main gearset shaft Wh2 is now permanently connected to the drive shaft. The third main gearset shaft Wh3 as the output shaft of the main gearset HS is permanently connected to the output shaft AB. The fourth main gearset shaft Wh4 can be retained at the transmission housing via the sixth shift element L designed as a brake. The fifth main gearset shaft Wh5 can be connected to the third main gearset shaft Wh3 via the seventh shift element H designed as a clutch.

The fourth planetary gearset RS4 is formed by way of example as a minus planetary gearset, comprising a first element designed as a sun gear SO4, a second element designed as a planetary carrier ST4, and a third element designed as a ring gear HO4. The fifth planetary gearset RS5 is also formed by way of example as a minus planetary gearset comprising a first element designed as a sun gear SO5, a second element designed as a planetary carrier ST5, and a third element designed as a ring gear HO5. As the only coupling shaft of the main gearset HS, the sun gears SO4, SO5 of the fourth and fifth planetary gearsets RS4, RS5 are permanently interconnected. The sun gears SO4, SO5 of the fourth and fifth planetary gearsets RS4, RS5 jointly form the first main gearset shaft Wh1, whereas the planetary carrier ST5 of the fifth planetary gearset RS5 forms the second main gearset shaft Wh2, the planetary carrier ST4 of the fourth planetary gearset RS4 forms the third main gearset shaft Wh3, the ring gear HO4 of the fourth planetary gearset RS4 forms the fourth main gearset shaft Wh4 and the ring gear HO5 of the fifth planetary gearset RS5 forms the fifth main gearset shaft Wh5.

This configuration, comparable to FIG. 1, permits the two planetary gearsets RS4, RS5 of the main gearset HS to only then simultaneously transmit torque when the sixth and seventh shift elements L, H simultaneously transmit torque or are simultaneously closed, whereas in all other cases always only one of the two individual planetary gearsets RS4, RS5 of the main gearset HS transmits torque, which positively influences the efficiency of the transmission GE.

All designs and considerations for the front-mounted gearset VS, the intermediate gearset ZS and the other five shift elements A, B, C, D and E, which have been explained in the description of FIG. 1, apply mutatis mutandis to the transmission GE shown in FIG. 5A. In contrast to FIG. 1, the second and fifth shift elements B, E now form a coupling assembly B/E that can in a production-oriented manner be advantageously preassembled having a joint disk support, which is exemplified here for both clutches B and E as an external disk support and which holds both the disk set of the clutch B and the disk set of the clutch E axially arranged next to the disk set of the clutch B, preferably also (for reasons of simplicity not shown in FIG. 5A) the servo devices provided for actuating these two disk sets. In this way, both clutches B and E can advantageously be supplied with the pressure media required for hydraulic actuation and with the lubricant required for a dynamic pressure compensation of the rotating pressure chambers of their servo devices and for cooling from the drive shaft with minimum leakage and in a structurally simple manner.

In FIG. 5A, the coupling assembly B/E is spatially mainly arranged in an area axially between the intermediate gearset ZS and the main gearset HS, wherein the disk set of the clutch B is arranged closer to the main gearset HS than the disk set of the clutch E.

In an alternative arrangement, provision can also be made for the two axially adjacent disk sets of the clutch assembly B/E being spatially arranged in an area radially above the intermediate gearset ZS such that the internal disk support of the fifth shift element E together with the ring gear HO2 of the second planetary gearset RS2 can form a joint, in particular integral component, and such that the internal disk support of the second shift element B together with the ring gear HO3 of the third planetary gearset RS3 can form a joint, in particular integral, component.

In another alternative, provision can also be made for the second and fifth shift elements B, E holding a coupling assembly that can in a production-oriented manner be advantageously preassembled having a joint disk support, which is designed as an external disk support for the second shift element B and as an internal disk support for the fifth shift element E, the disk set and the servo device of the second shift element B provided for the actuation thereof and the disk set and servo device of the fifth shift element E provided for the actuation thereof. Preferably, viewed in the axial direction, the disk set of the fifth shift element E is arranged radially above the disk set of the second shift element, such that this coupling assembly can be arranged axially between the intermediate gearset ZS and main gearset HS reducing the design length. This arrangement also advantageously enables the second and fifth shift elements B, E to be supplied with pressure media and lubricant in a simple manner with minimum leakage from the drive shaft AN.

The transmission GE shown in FIG. 5A can be operated based on the same shift diagrams as the transmission illustrated in FIG. 1, i.e., as a minimum based on the shift diagrams shown in FIGS. 4A, 4B and 4C.

With regard to the application of the transmission GE in a hybrid drive train, FIG. 5A shows a variant in which, in addition to the internal combustion engine drive, an electric drive is provided by an electric machine EM, the rotor ER of which is permanently connected directly to the drive input shaft AN of the transmission GE. A stator ES of the electric machine EM is retained at the transmission housing. This electric machine EM is in turn controlled and regulated by a control unit not shown in detail and, in driving the transmission GE, the electric machine EM draws energy from an accumulator also not shown here. In so-called recovery mode, the transmission GE can supply energy to this accumulator via the electric machine EM then driven by the transmission GE.

The transmission GE can furthermore be driven by an internal combustion engine VM whose crankshaft KW can preferably be connected to the drive shaft AN of the transmission GE via a clutch AK. Preferably, this clutch AK is designed as a driveaway clutch—i.e. as a driveaway element of the transmission GE outside the transmission. Alternatively, the clutch AK can be designed as a standard clutch, in which case a shift element inside the transmission has to be designed as a driveaway element for driving away. For vibration decoupling, a mechanical torsional damper TD is provided in the flow of power between the crankshaft KW and the clutch AK.

Viewed spatially, the electric machine EM is arranged in the exemplary embodiment shown in FIG. 5A on the side of the transmission GE facing the combustion engine VM, thus reducing design length in an area radially above the torsion damper TD and in particular radially above the clutch AK.

The particular advantage of the configuration of the additional electric drive proposed in FIG. 5A is that the additional electric machine EM can be combined in an extremely simple manner with an already present basic transmission, in such a way that for hybridization no fundamental internal gear changes have to be made to the present basic transmission. Thus, depending on the dimensioning of its drive power, the electric machine can easily be accommodated in the installation space of a torque converter, which in most known automatic transmissions it is arranged as a driveaway element outside the transmission in the area of a so-called converter housing, which forms part of the transmission housing facing the internal combustion engine. If required—i.e. for higher electrical drive power—this converter housing can be extended in a structurally simple manner. The configuration proposed here therefore enables the manufacturer of the transmission to individually offer, in addition to the hybrid transmission, the basic transmission without an electric machine in the manner of a modular kit.

FIG. 5B shows a schematic representation of a second application example of a hybrid powertrain including the automatic transmission shown in FIG. 5A. Again, the transmission GE designed as an automatic transmission has, in addition to the input shaft AN and the output shaft AB, five planetary gearsets RS1, RS2, RS3, RS4, RS5 and seven shift elements A, B, C, D, E, L, H, all arranged in the transmission housing GG. It can easily be seen that the transmission GE shown in FIG. 5B is kinematically identical to the transmission GE shown in FIG. 5A, but supplemented by an additional electric drive, which now acts on an internal transmission shaft.

While the drive shaft AN of the transmission GE is now driven exclusively by the engine VM with the interposition of the mechanical torsion damper TD and the driveaway clutch AK, the connection path that connects the intermediate gearset ZS permanently to the main gearset HS can now be driven by the electric machine EM.

Accordingly, in FIG. 5B the rotor ER of the electric machine EM is permanently connected to the third intermediate gearset shaft Wz3, which in turn is permanently connected to the first main gearset shaft Wh1. Viewed spatially or in the axial direction, the electric machine EM is therefore arranged as a minimum predominantly in an area radially above the intermediate gearset ZS.

This kinematic coupling of the electric machine EM permits a so-called electrodynamic gearshift in a particularly advantageous manner, in which the electric machine EM performs the load shifting, that is, the supporting moment occurring in the course of the shifting at the third intermediate gearset shaft Wz3 and at the first main gearset shaft Wh1.

As a further design detail, FIG. 5B provides, deviating from FIG. 5A, for the first, third and fourth shift elements A, C, D, all three of which are designed as brakes, are arranged in the same axial plane viewed spatially, that is to say radially one above the other in the axial direction—, wherein the first shift element A is arranged radially above the fourth shift element D, whereas the fourth shift element D is arranged radially above the third shift element C. This exemplary arrangement is characterized by its short design length.

Figure 6:
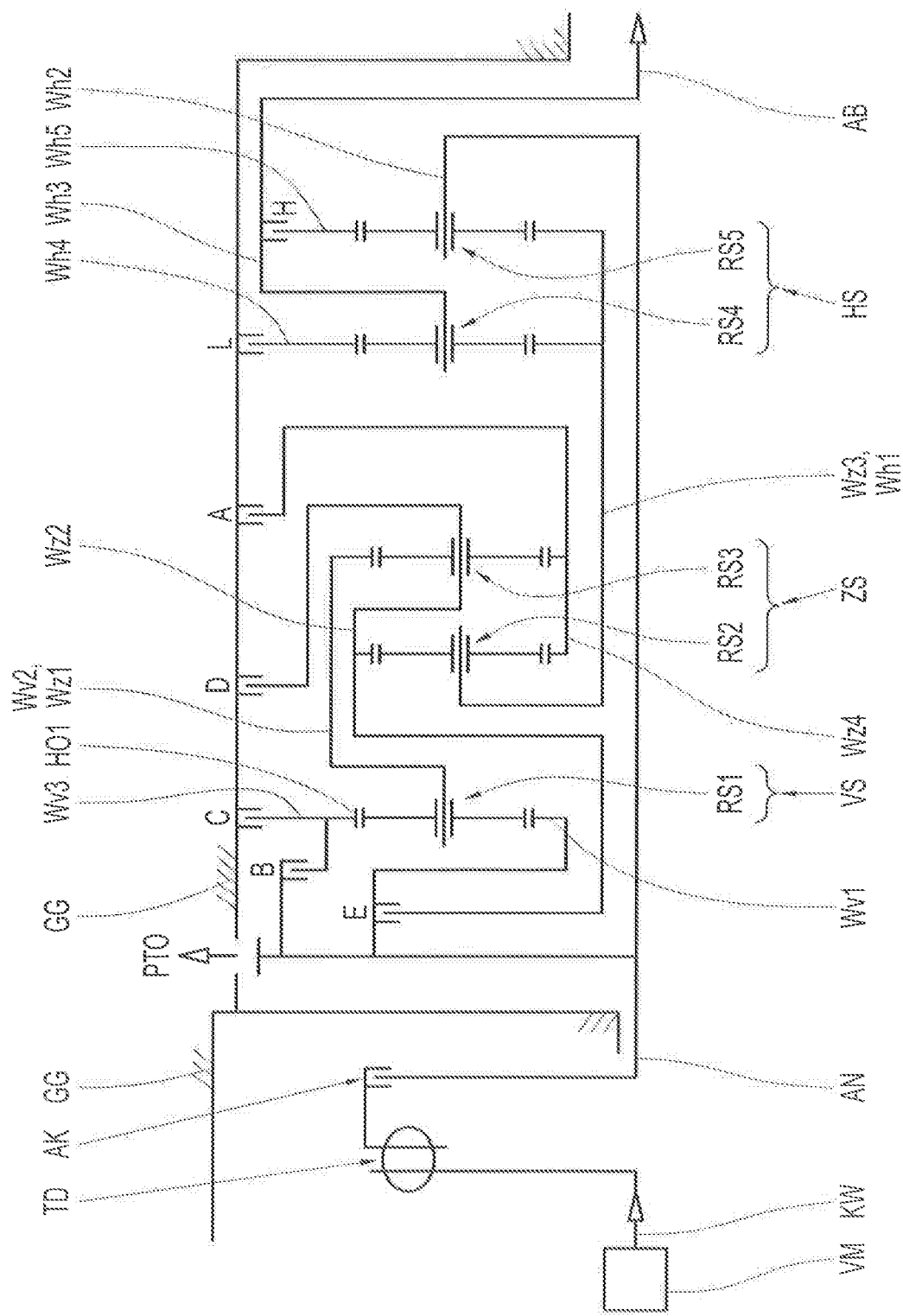
FIG. 6 shows a schematic representation of a second exemplary embodiment of an automatic transmission according to the invention.

FIG. 6 shows a schematic representation of a second exemplary embodiment of an automatic transmission according to the invention derived from the gearset diagram shown in FIGS. 5A and 5B. With regard to its kinematics, the transmission GE illustrated in FIG. 6 differs from the transmission GE shown in FIGS. 5A and 5B only in the connection of the second shift element B, although the second shift element B designed as a clutch remains unchanged for situational blocking of the front-mounted gearset VS. While in FIG. 5A or FIG. 5B the second shift element B is arranged in the flow of power between the drive shaft AN and the shaft formed by the second front-mounted gearset shaft Wv2 and the first intermediate shaft Wz1, which permanently connects the front-mounted gearset VS to the intermediate gearset ZS, FIG. 6 provides that the second shift element B is arranged in the flow of power between the drive input shaft AN and the third front-mounted gearset shaft Wv3 of the front-mounted gearset VS in such a way that the shaft formed by the second front-mounted gearset shaft Wv2 and the first intermediate gear shaft Wz1, which continuously connects the front-mounted gearset VS to the intermediate gearset ZS, is not directly connected to any of the shift elements of the transmission GE.

Henceforth, the ring gear HO1 of the first planetary gearset RS1 forming the third front-mounted gearset shaft Wv3 of front-mounted gearsets VS is not only permanently connected to the third shift element C designed as a brake, but also permanently connected to the second shift element B designed as a clutch. Accordingly, the ring gear HO1, the internal disk support of the brake C, which is connected to the ring gear HO1, and the disk support of the clutch B, which is connected to the ring gear HO1—preferably the internal disk support of the clutch B—can be formed as a joint integral component. The disk support of the clutch B connected to the drive shaft AN—preferably the external disk support of the clutch B—advantageously takes the disk set and the servo device of the clutch B provided for the actuation thereof, such that the clutch B can advantageously be supplied with the pressure media required for hydraulic actuation and with the lubricant required for a dynamic pressure compensation of the rotating pressure chambers of their servo devices and for cooling from the drive shaft AN with minimum leakage and in a structurally simple manner. Correspondingly, FIG. 6 provides that as a minimum the disk set of the brake C, viewed in the axial direction, is disposed radially above the first planetary gearset RS1, whereas the clutch B is arranged axially next to the first planetary gearset RS1 on the side facing away from the intermediate gearset ZS.

While the spatial arrangement of the sixth and seventh shift elements L, H in FIG. 6 are taken over from FIG. 5A or 5B unmodified, FIG. 6 shows an example of the spatial arrangement of the first, fourth and fifth shift elements A, D, E deviating from FIG. 5A or 5B. Thus, the first shift element A designed as a brake and permanently connected to the fourth intermediate gearset shaft Wz4 of the intermediate gearset ZS is viewed spatially arranged near the third planetary gearset RS3, at least partially in an area axially between intermediate gearset ZS and main gearset HS, alternatively at least partially—viewed in the axial direction—in an area radially above the third planetary gearset RS3. The fourth shift element D designed as a brake and permanently connected to the second intermediate gearset shaft Wz2 of the intermediate gearset ZS is, viewed spatially, arranged near the second planetary gearset RS2, viewed axially at least partially in an area radially above the second planetary gearset RS2, alternatively at least partially—viewed in the axial direction—in an area radially above the third planetary gearset RS3. The fifth shift element E formed as a clutch and arranged in the flow of power between the drive shaft AN and the second intermediate gearset shaft Wz2 of the intermediate gearset ZS is spatially arranged on the side of the first planetary gearset RS1 facing away from the intermediate gearset ZS, such that the fifth shift element E in conjunction with the second shift element B may advantageously be designed as a preassembled coupling assembly in the manner of a double clutch, preferably comprising a joint disk support for receiving the disk sets and servo devices of both clutches B, E, wherein the disk set of the clutch B viewed in the axial direction, for instance, is arranged radially above the disk set of the clutch E, reducing installation length. This arrangement advantageously enables the two shift elements B, E to be supplied with pressure media and lubricant in a simple manner with minimum leakage from the drive shaft AN.

In principle, the spatial arrangement of the shift elements can be adapted to the respective applications in a wide range. Thus in an alternative embodiment of the transmission GE, the shift elements A, D and E, for instance, can also be easily arranged as proposed in FIG. 5A/5B.

The main gearset shown in FIG. 6 HS including the associated connection of the sixth and seventh shift elements L, H can also be easily replaced by the main gearset HS shown in FIG. 1 with its associated connection of the sixth and seventh shift elements L, H.

As another exemplary design detail, FIG. 6 shows an additional power take-off PTO, via which the drive shaft AN is or can be connected to a unit located outside the transmission GE. The principle of such speed tapping is well known in particular from agricultural machinery and commercial vehicles. In the present exemplary embodiment, the power take-off PTO is, viewed spatially, axially arranged between the driveaway clutch AK and the clutch assembly B/E.

Although in the exemplary embodiment shown in FIG. 6 no additional electric drive is provided, if required—comparable to FIG. 5A—an additional electric machine can be used to electrically drive the drive shaft, or—comparable to FIG. 5B—an additional electric machine for electrically driving the connection shaft formed by the third intermediate gearset shaft Wz3 and the first main gearset shaft Wh1, which permanently connects the intermediate gearset ZS to the main gearset HS.

Figure 7:
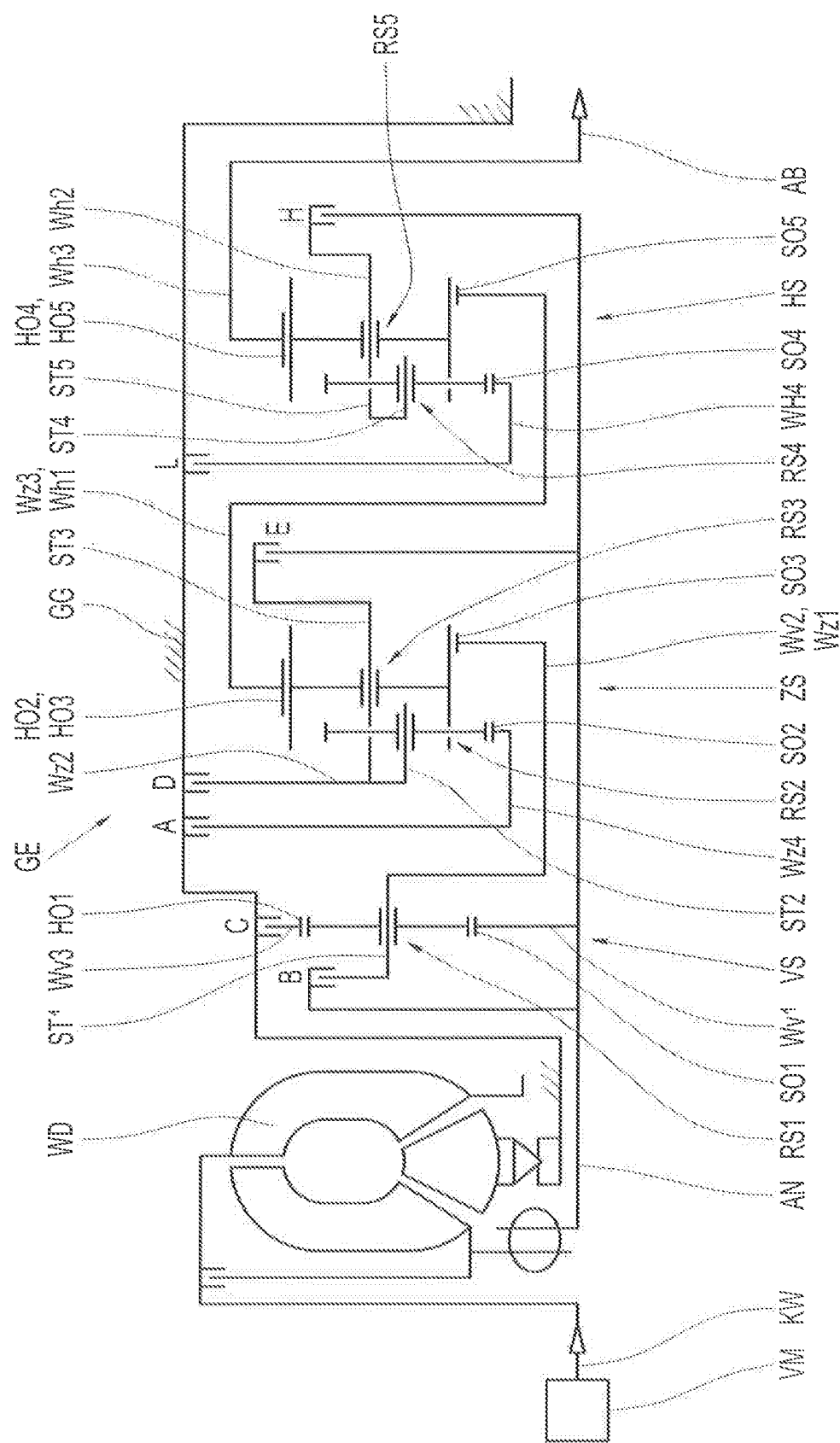
FIG. 7 shows a schematic representation of a third exemplary embodiment of an automatic transmission according to the invention.

FIG. 7 shows a schematic representation of a third exemplary embodiment of an automatic transmission according to the invention. Again, the transmission GE designed as an automatic transmission has, in addition to the input shaft AN and the output shaft AB, one front-mounted gearset VS, one intermediate gearset ZS, one main gearset HS and seven shift elements A, B, C, D, E, L, H, all arranged in the transmission housing GG. The gearsets are, viewed spatially, by way of example arranged axially sequentially, in this case by way of example in the order "VS-ZS-HS", wherein the front-mounted gearset VS faces the drive of the transmission GE by way of example. For driving the transmission GE, an internal combustion engine VM is provided by way of example, the crankshaft KW of which is connected to the drive shaft AN of the transmission GE via a torque converter WD.

The front-mounted gearset VS is formed by the first planetary gearset RS1, in the form of a 1-web 3-shaft planetary gearset, comprising the first, second and third front-mounted gearset shafts Wv1, Wv2, Wv3. By design in this case the first planetary gearset RS1 is exemplified as a simple minus planetary gearset having three elements, comprising a sun gear SO1 as a first element forming the first front-mounted gearset shaft Wv1, a planetary carrier ST1 as a second element forming the second front-mounted gearset shaft Wv2, and a ring gear HO1 as the third element forming the third front-mounted gearset shaft Wv3.

The intermediate gearset ZS is formed by the second and third planetary gearsets RS2, RS3, in the form of a 2-web 4-shaft planetary gearset, comprising the first, second, third and fourth intermediate gearset shafts Wz1, Wz2, Wz3, Wz4. By design, the second and third planetary gearset RS2, RS3 jointly form a Ravigneaux planetary gearset, in which the second planetary gearset RS2 is formed as a plus planetary gearset having three elements, whereas the third planetary gearset RS3 is designed as a minus planetary gearset having three elements. The second planetary gearset RS2 includes a sun gear SO2 as a first element forming the fourth intermediate gear shaft Wz4, a ring gear HO2 as a second element, and a planetary carrier ST2 as a third element. The third planetary gearset RS3 includes a sun gear SO3 as a first element forming the first intermediate gear shaft Wz1, a planetary carrier ST3 as a second element, and a ring gear HO3 as a third element. The third element of the second planetary gearset RS2 (in this case the planetary carrier ST2) and the second element of the third planetary gearset RS3 (in this case the planetary carrier ST3) are permanently interconnected in the manner of a first coupling shaft of the intermediate gearset ZS and jointly form the second intermediate gearset shaft Wz2. The second element of the second planetary gearset RS2 (in this case the ring gear HO2) and the third element of the third planetary gearset RS3 (in this case the ring gear HO3) are permanently interconnected in the manner of a second coupling shaft of the intermediate gearset ZS and jointly form the third intermediate gearset shaft Wz3. Advantageously, the ring gear HO2 and the ring gear HO3 are designed as an integral component.

The main gearset HS is formed by the fourth and fifth planetary gearsets RS4, RS5 in the form of a 2-web 4-shaft planetary gearset comprising the first, second, third and fourth intermediate gearset shafts Wh1, Wh2, Wh3, Wh4. By design, the fourth and fifth planetary gearsets RS2, RS5 jointly form a Ravigneaux planetary gearset in which the fourth planetary gearset RS2 is formed as a plus planetary gearset having three elements, whereas the fifth planetary gearset RS5 is designed as a minus planetary gearset having three elements. The fourth planetary gearset RS4 includes a sun gear SO4 as a first element forming the fourth intermediate gear shaft Wh4, a ring gear HO4 as a second element, and a planetary carrier ST4 as a third element. The fifth planetary gearset RS5 includes a sun gear SO5 as a first element forming the first main gear shaft Wh1, a planetary carrier ST5 as a second element, and a ring gear HO5 as a third element.

The third element of the fourth planetary gearset RS4 (in this case the planetary carrier ST4) and the second element of the fifth planetary gearset RS5 (in this case the planetary carrier ST5) are permanently interconnected in the manner of a first coupling shaft of the main gearset HS and jointly form the second main gearset shaft Wh2. The second element of the fourth planetary gearset RS4 (in this case the ring gear HO4) and the third element of the fifth planetary gearset RS5 (in this case the ring gear HO5) are permanently interconnected in the manner of a second coupling shaft of the main gearset HS and jointly form the third main gearset shaft Wh3. Advantageously, the ring gear HO4 and the ring gear HO5 are designed as an integral component.

With regard to the kinematic connection of the front-mounted gearset VS, the following is provided in the exemplary embodiment shown in FIG. 7:

The sun gear SO1 of the first planetary gearset RS1 (as the first front-mounted gearset shaft Wv1 of the front-mounted gearset VS) is permanently connected to the drive shaft AN of the transmission GE.

The planetary carrier ST1 of the first planetary gearset RS1 (as the second front-mounted gearset shaft Wv2 of the front-mounted gearset VS) is permanently connected to the first intermediate gearset shaft Wz1 of the intermediate gearset ZS.

The ring gear HO1 of the first planetary gearset RS1 (as the third front-mounted gearset shaft Wv3 of the front-mounted gearset VS) can be retained at the transmission housing GG via the third shift element C designed as a brake.

For blocking the front-mounted gearset VS, the second shift element B designed as a clutch is arranged in the flow of power by way of example between the first and the second front-mounted gearset shafts Wv1. Wv2. In the closed state, clutch B thus interconnects the sun gear SO1 and the planetary carrier ST1 of the first planetary gearset RS1, in such a way that all three elements SO1, ST1, HO1 of the first planetary gearset RS1 then rotate at the same speed—i.e. at the rotational speed of the drive shaft AN.

Because of the connection of the clutch B to the second front-mounted gearset shaft Wv2 and the first intermediate gearset shaft Wz1 of the intermediate gearset ZS is connected to the drive shaft AN, when the second switching element B is closed.

With regard to the kinematic connection of the intermediate gearset ZS the following is provided in the exemplary embodiment shown in FIG. 7:

The sun gear SO3 of the third planetary gearset RS3 (as the first intermediate gearset shaft Wz1 of the intermediate gearset ZS) is permanently connected to the second front-mounted gearset shaft Wv2 of the intermediate gearset VS (in this case permanently connected to the ring gear ST1 of the first planetary gearset RS1).

The coupled planetary carrier ST2/ST3 of the second and third planetary gearsets RS2, RS3 (as the second intermediate gearset shaft Wz2 of the intermediate gearset ZS) can on the one hand be retained at the transmission housing GG via the fourth shift element D designed as a brake and on the other hand can be connected to the drive shaft AN of the transmission GE via the fifth shift element E designed as a clutch.

The coupled ring gear HO2/HO3 of the second and third planetary gearsets RS2, RS3 (as the third intermediate gearset shaft Wz3 of the intermediate gearset ZS) is permanently connected to the first main gearset shaft Wh1 of the main gearset HS.

The sun gear SO2 of the second planetary gearset RS2 (as the fourth intermediate gearset shaft Wz4 of the intermediate gearset ZS) can be retained at the transmission housing GG via the first shift element A designed as a brake.

With regard to the kinematic connection of the main gearset HS the following is provided in the exemplary embodiment shown in FIG. 7:

The sun gear SO5 of the fifth planetary gearset RS5 (as the first main gearset shaft Wh1 of the main gearset HS) is permanently connected to the third intermediate gearset shaft Wz3 of the intermediate gearset ZS (in this case permanently connected to the coupled ring gear HO2/HO3 of the second and third planetary gearsets RS2, RS3).

The coupled planetary carrier ST4/ST5 of the fourth and fifth planetary gearsets RS4, RS5 (as the second main gearset shaft Wh2 of the main gearset HS) can be permanently connected to the drive shaft AN of the transmission GE via the seventh shift element H designed as a clutch.

The coupled ring gear HO4/HO5 of the fourth and fifth planetary gearsets RS4, RS5 (as the third main gearset shaft Wh3 of the main gearset HS) is permanently connected to the output shaft AB of the transmission GE.

The sun gear SO4 of the fourth planetary gearset RS4 (as the fourth intermediate gearset shaft Wh4 of the main gearset HS) can be retained at the transmission housing GG via the sixth shift element L designed as a brake.

In the exemplary embodiment shown in FIG. 7, the compact and inexpensive design of the intermediate gearset ZS and the main gearset HS has to be emphasized.

While maintaining the given transmission kinematics, the spatial arrangement of the shift elements B, C, A, D, E, L, H within the transmission housing GG is variable within a wide range and is limited only by the dimensions and the outer shape of the transmission housing GG. Accordingly, the component arrangement shown in FIG. 7 shall be expressly understood to show just one of many possible component arrangement variants. In the same way, the embodiment of the shift elements shown in FIG. 7 as multi-plate clutches or disk brakes shall be understood as merely exemplary. In alternative embodiments, for instance, form-locking shiftable claw or cone clutches, frictionally shifting band brakes or positively shiftable claw or cone brakes can be used. With regard to advantages and alternatives to the component arrangement, reference is made in addition to the statements made above in the context of the first and the second exemplary embodiments of a transmission according to the invention, which can also be applied mutatis mutandis to the third exemplary embodiment shown in FIG. 7 for a transmission according to the invention.

The transmission GE shown in FIG. 7 can also easily be used in a hybrid drive train, i.e. combined without any difficulty with an additional electric motor drive, for instance, based on the drive concept shown in FIG. 5A or in FIG. 5B. Furthermore, the transmission GE shown in FIG. 7 can also be combined without any difficulty with an additional power take-off, as shown for instance in FIG. 6.

Figure 8:
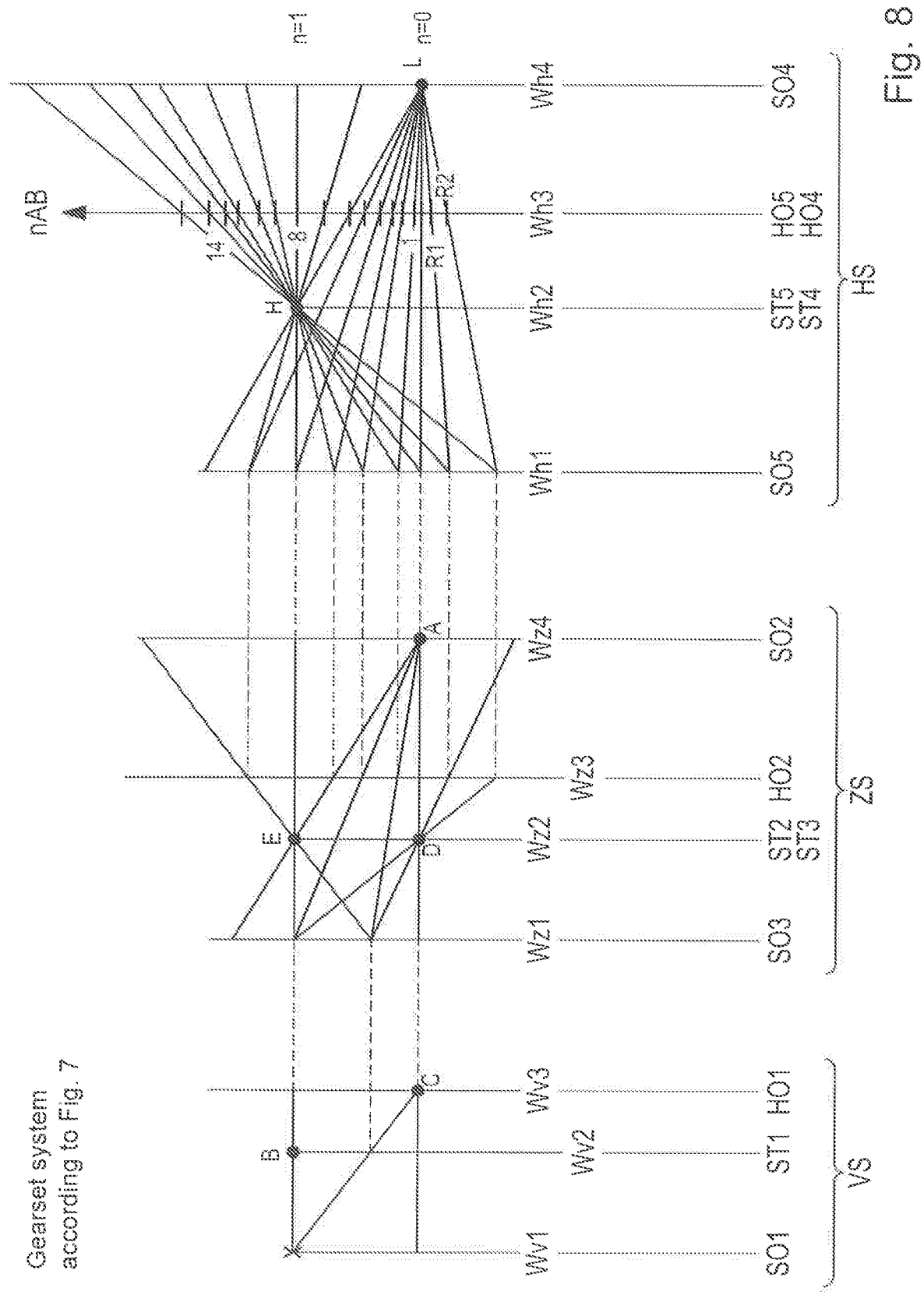
FIG. 8 shows a speed diagram of the automatic transmission shown in FIG. 7.

To illustrate the kinematics of the transmission GE according to the invention shown in FIG. 7, FIG. 8 shows a complete speed diagram of this transmission GE. The illustration is largely self-explanatory.

Depending on the shift states of the second and third shift elements B, C, the front-mounted gearset VS of the transmission GE according to the invention shown in FIG. 7 can generate two different rotational speeds on the output side (in this case at the planetary carrier ST1), which are then transmitted to the first intermediate gearset shaft Wz1 (in this case the sun gear SO3). If the second shift element B is closed and thus the front-mounted gearset VS is locked, the second front-mounted gearset shaft Wv2 and thus also the first intermediate gearset shaft Wz1 rotate at the rotational speed of the drive shaft AN. If the third shift element C is closed, the second front-mounted gearset shaft Wv2 and thus also the first intermediate gearset shaft Wz1 rotate at a rotational speed lower than that of the drive shaft AN. The shift elements B and C may not be closed at the same time.

Depending on the shift states of the first, second, third, fourth and fifth shift elements A, B, C, D, E, the intermediate gearset ZS can generate eight different output rotational speeds on the output side (in this case at the coupled ring gear HO2/HO3), which are then transmitted to the main gearset HS—specifically to the first main gearset shaft Wh1 (here the sun gear SO5).

Depending on the shift states of the sixth and seventh shift elements L, H, the main gearset HS can generate fourteen different positive and two different negative output speeds at the output side (here at the coupled ring gear HO4/HO5), which are then transmitted to the output shaft AB of the transmission GE, from these eight output speeds of the intermediate gearset ZS. In FIG. 8, by way of example, the forward gears 1, 8 and 14 of these fourteen different forward gears, are denoted by numbers, whereas the two different reverse gears are denoted by R1 and R2.

For selective shifting of these up to fourteen forward gears and two reverse gears, the shift logic illustrated in FIG. 7 can be used in the transmission GE, which has been explained in detail in connection with FIGS. 4A, 4B and 4C for the exemplary embodiment illustrated in FIG. 1.

Figure 9:
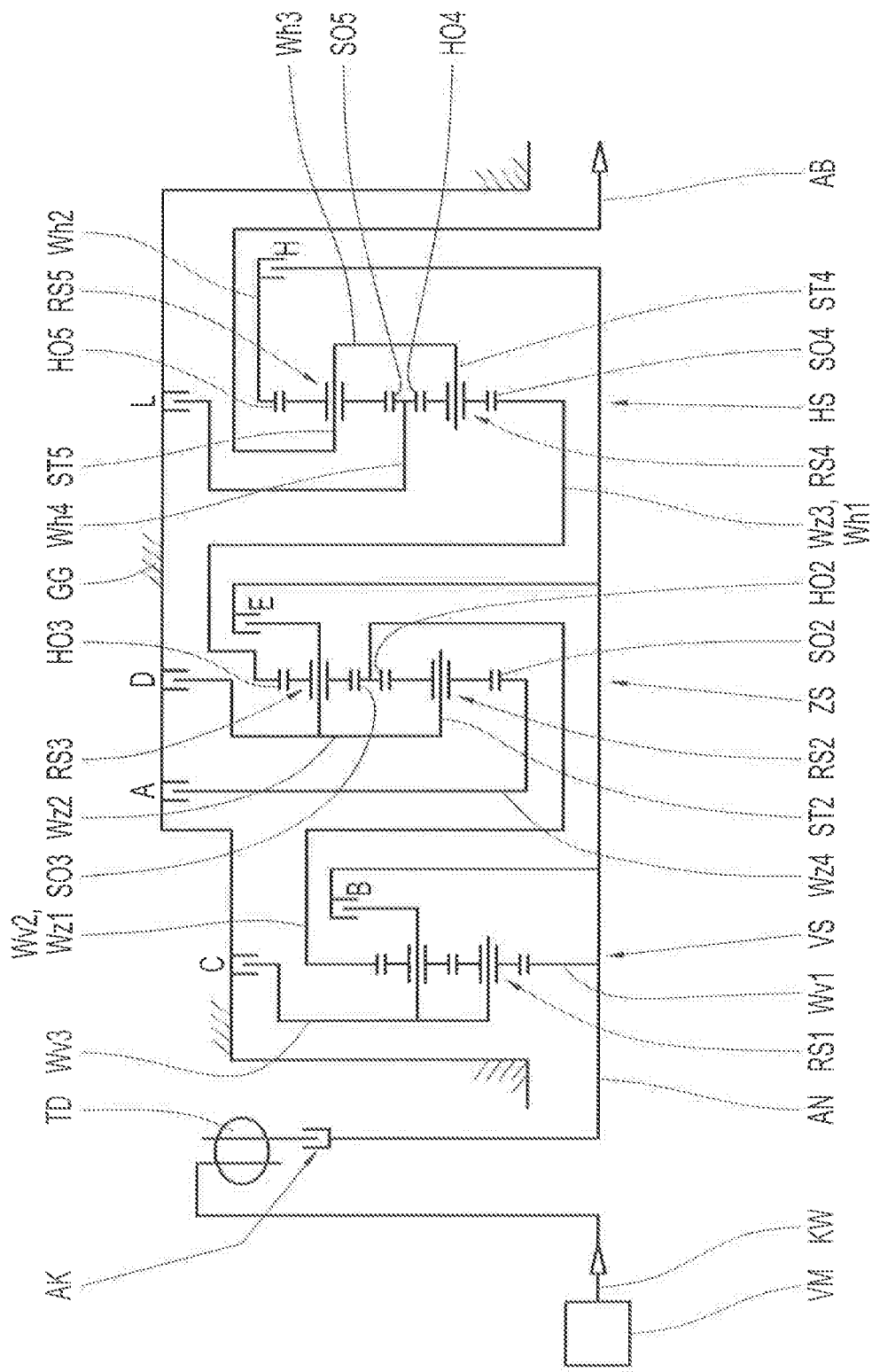
FIG. 9 shows a schematic representation of a fourth exemplary embodiment of an automatic transmission according to the invention.

FIG. 9 shows a schematic representation of a fourth exemplary embodiment of an automatic transmission according to the invention. Again, the transmission GE designed as an automatic transmission has, in addition to the input shaft AN and the output shaft AB, one front-mounted gearset VS. one intermediate gearset ZS, one main gearset HS and seven shift elements A, B, C, D, E, L, H, all arranged in the transmission housing GG. The gearsets VS, ZS and HS are, viewed spatially, arranged, by way of example, axially sequentially, in this case by way of example in the order "VS-ZS-HS", wherein the front-mounted gearset VS faces the drive of the transmission GE by way of example. For driving the transmission GE an internal combustion engine VM is provided by way of example, the crankshaft KW of which is operatively connected to the drive shaft AN of the transmission GE via a torsion damper TD, wherein the output element of this starting clutch AK is permanently connected to the drive shaft AN of the transmission GE.

The front-mounted gearset VS is formed by the first planetary gearset RS1, in the form of a 1-web 3-shaft planetary gearset, comprising the first, second and third front-mounted gearset shafts Wv1, Wv2, Wv3. By design in this case, the first planetary gearset RS1 is exemplified as a simple plus planetary gearset having three elements comprising a sun gear SO1 as a first element forming the first front-mounted gearset shaft Wv1, a ring gear HO1 as a second element forming the second front-mounted gearset shaft Wv2, and a planetary carrier ST1 as the third element forming the third front-mounted gearset shaft Wv3.

The intermediate gearset ZS is formed by the second and third planetary gearsets RS2, RS3, in the form of a 2-web 4-shaft planetary gearset, comprising the first, second, third and fourth intermediate gearset shafts Wz1, Wz2, Wz3, Wz4. By design the second and third planetary gearsets RS2, RS3 jointly form an interlaced planetary gearset, in which both the second planetary gearset RS2 and the third planetary gearset RS3 are formed as minus planetary gearsets having three elements each. The second planetary gearset RS2 includes a sun gear SO2 as a first element, a planetary carrier ST2 as a second element, and a ring gear HO2 as a third element. The third planetary gearset RS3 includes a sun gear SO3 as a first element, a planetary carrier ST3 as a second element, and a ring gear HO3 as a third element. The third element of the second planetary gearset RS2 (in this case the ring gear HO2) and the first element of the third planetary gearset RS3 (in this case the sun gear SO3) are permanently interconnected in the manner of a first coupling shaft of the intermediate gearset ZS and jointly form the first intermediate gearset shaft Wz1. Advantageously, the ring gear HO2 and the sun gear SO3 are designed as integral components. The second element of the second planetary gearset RS2 (in this case the planetary carrier ST2) and the second element of the third planetary gearset RS3 (in this case the planetary carrier ST3) are permanently interconnected in the manner of a second coupling shaft of the intermediate gearset ZS and jointly form the second intermediate gearset shaft Wz2. Advantageously, the planetary carrier ST2 and the planetary carrier ST3 are designed as a joint component.

The third element of the third planetary gearset RS3 (in this case the ring gear HO3) forms the third intermediate gearset shaft Wz3. The first element of the second planetary gearset RS2 (in this case the sun gear SO2) forms the fourth intermediate gearset shaft Wz4.

The main gearset HS is formed by the fourth and fifth planetary gearsets RS4, RS5, in the form of a 2-web 4-shaft planetary gearset, comprising the first, second, third and fourth intermediate gearset shafts Wh1, Wh2, Wh3, Wh4. By design the fourth and fifth planetary gearsets RS4, RS5 jointly form a planetary gearset interlaced in a plane, in which both the fourth planetary gearset RS4 and the fifth planetary gearset RS5 are formed as minus planetary gearsets having three elements each.

The fourth planetary gearset RS4 includes a sun gear SO4 as a first element, a planetary carrier ST4 as a second element, and a ring gear HO4 as a third element. The fifth planetary gearset RS5 includes a sun gear SO5 as a first element, a planetary carrier ST5 as a second element, and a ring gear HO5 as a third element. The first element of the fourth planetary gearset RS4 (in this case the sun gear SO4) forms the first main gearset shaft Wh1. The third element of the fifth planetary gearset RS5 (in this case the ring gear HO5) forms the second main gearset shaft Wh2. The second element of the fourth planetary gearset RS4 (in this case the planetary carrier ST4) and the second element of the fifth planetary gearset RS5 (in this case the planetary carrier ST5) are permanently interconnected in the manner of a first coupling shaft of the main gearset HS and jointly form the third main gearset shaft Wh3. Advantageously, the planetary carrier ST4 and the planetary carrier ST5 are designed as a joint component. The third element of the fourth planetary gearset RS4 (in this case the ring gear HO4) and the first element of the fifth planetary gearset RS5 (in this case the ring gear SO5) are permanently interconnected in the manner of a second coupling shaft of the main gearset HS and jointly form the fourth main gearset shaft Wh4. Advantageously, the ring gear HO4 and the sun gear SO5 are designed as integral components.

With regard to the kinematic connection of the front-mounted gearset VS the following is provided in the exemplary embodiment shown in FIG. 9:

The sun gear SO1 of the first planetary gearset RS1 (as the first front-mounted gearset shaft Wv1 of the front-mounted gearset VS) is permanently connected to the drive shaft AN of the transmission GE.

The ring gear HO1 of the first planetary gearset RS1 (as the second front-mounted gearset shaft Wv2 of the front-mounted gearset VS) is permanently connected to the first intermediate gearset shaft Wz1 of the intermediate gearset ZS.

The planetary carrier ST1 of the first planetary gearset RS1 (as the third front-mounted gearset shaft Wv3 of the front-mounted gearset VS) can be retained at the transmission housing GG via the third shift element C designed as a brake.

For blocking the front-mounted gearset VS, the second shift element B designed as a clutch is arranged in the flow of power by way of example between the first and the third front-mounted gearset shafts Wv1, Wv3. In the closed state, the clutch B thus interconnects the sun gear SO1 and the planetary carrier ST1 of the first planetary gearset RS1, such that then all three elements SO1, ST1, HO1 of the first planetary gearset RS1 rotate at the same speed—i.e. at the rotational speed of the drive shaft AN.

With regard to the kinematic connection of the intermediate gearset ZS the following is provided in the exemplary embodiment shown in FIG. 9:

The coupling shaft ring gear HO2/sun gear SO3 (as the first intermediate gearset shaft Wz1 of the intermediate gearset ZS) is permanently connected to the second front-mounted gearset shaft Wv2 of the front-mounted gearset VS (in this case permanently connected to the ring gear HO1 of the first planetary gearset RS1).

The coupled planetary carrier ST2/ST3 of the second and third planetary gearsets RS2, RS3 (as the second intermediate gearset shaft Wz2 of the intermediate gearset ZS) can on the one hand be retained at the transmission housing GG via the fourth shift element D designed as a brake, and on the other hand can be connected to the drive shaft AN of the transmission GE via the fifth shift element E designed as a clutch.

The ring gear HO3 of the third planetary gearset RS3 (as the third intermediate gearset shaft Wz3 of the intermediate gearset ZS) is permanently connected to the first main gearset shaft Wh1 of the main gearset HS.

The sun gear SO2 of the second planetary gearset RS2 (as the fourth intermediate gearset shaft Wz4 of the intermediate gearset ZS) can be retained at the transmission housing GG via the first shift element A designed as a brake.

With regard to the kinematic connection of the main gearset HS, the following is provided in the exemplary embodiment shown FIG. 9:

The sun gear SO4 of the fourth planetary gearset RS4 (as the first main gearset shaft Wh1 of the main gearset HS) is permanently connected to the third intermediate gearset shaft Wz3 of the intermediate gearset ZS (in this case permanently connected to the ring gear HO3 of the third planetary gearset RS3).

The ring gear HO5 of the fifth planetary gearset RS5 (as the second main gearset shaft Wh2 of the main gearset HS) can be permanently connected to the drive input shaft AN of the transmission GE via the seventh shift element H designed as a clutch.

The coupled planetary carrier ST4/ST5 of the fourth and fifth planetary gearsets RS4, RS5 (as the third main gearset shaft Wh3 of the main gearset HS) is permanently connected to the output shaft AB of the transmission GE.

The coupling shaft ring gear HO4/sun gear SO4 (as the fourth intermediate gearset shaft Wh4 of the main gearset HS) can be retained at the transmission housing GG via the sixth shift element L designed as a brake.

In the exemplary embodiment shown in FIG. 9, the extremely short—in relation to the number of planetary gearsets—design length of the transmission GE has to be emphasized.

While maintaining the given transmission kinematics, the spatial arrangement of the shift elements C, B, A, D, E, L, H within the transmission housing GG is variable within a wide range and is limited only by the dimensions and the outer shape of the transmission housing GG. Thus, in the transmission GE shown in FIG. 9, for instance, in order to reduce the axial length of the transmission, the disk set of the third shift element C and the front-mounted gearset VS being arranged approximately in the same plane, the disk set of the fourth shift element D and the intermediate gearset ZS being arranged approximately in the same plane, and the disk set of the sixth shift element L and the main gearset HS being arranged approximately in the same plane is provided for. The component arrangement shown in FIG. 9, however, shall be expressly understood to show just one of many possible component arrangement variants. In the same way, the embodiment of the shift elements shown in FIG. 9 as multi-plate clutches or disk brakes shall be understood as merely exemplary. In alternative embodiments, for instance, form-locking shiftable claw or cone clutches, frictionally shifting band brakes or positively shiftable claw or cone brakes can be used.

The transmission GE shown in FIG. 9 can also easily be used in a hybrid drive train, i.e. be combined without any difficulty with an additional electric motor drive, for instance, based on the drive concept shown in FIG. 5A or in FIG. 5B. Furthermore, the transmission GE shown in FIG. 9 can also be combined without any difficulty with an additional power take-off, as shown for instance in FIG. 6.

Figure 10:
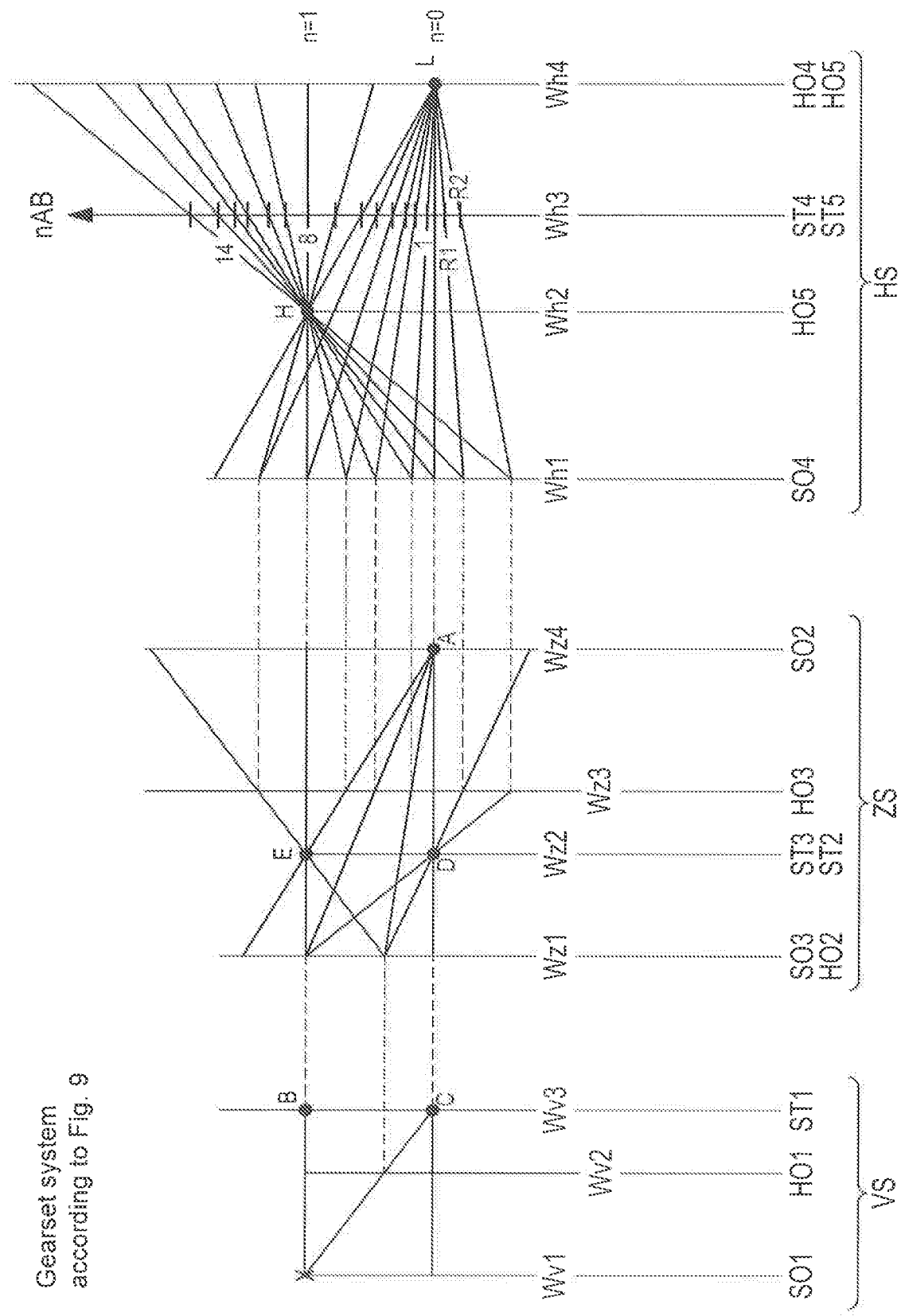
FIG. 10 shows a speed diagram of the automatic transmission of FIG. 9.

To illustrate the kinematics of the transmission GE according to the invention shown in FIG. 9, FIG. 10 shows a complete speed diagram of this transmission GE. The illustration is largely self-explanatory.

Depending on the shift states of the second and third shift elements B, C, the front-mounted gearset VS of the transmission GE according to the invention shown in FIG. 9 can generate two different rotational speeds on the output side (in this case on the ring gear HO1), which are then transmitted to the first intermediate gearset shaft Wz1 (in this case the coupling shaft ring gear HO2/sun gear SO3). If the second shift element B is closed and thus the front-mounted gearset VS is locked, the second front-mounted gearset shaft Wv2 and thus also the first intermediate gearset shaft Wz1 rotate at the rotational speed of the drive shaft AN. If the third shift element C is closed, the second front-mounted gearset shaft Wv2 and thus also the first intermediate gearset shaft Wz1 rotate at a rotational speed smaller than that of the drive shaft AN. The shift elements B and C may not be closed at the same time.

Depending on the shift states of the first, second, third, fourth and fifth shift elements A, B, C, D, E, the intermediate gearset ZS can generate eight different output rotational speeds on the output side (in this case at the ring gear HO3), which are then transmitted to the main gearset HS—specifically to first main gearset shaft Wh1 (here the sun gear SO4).

Depending on the shift states of the sixth and seventh shift elements L, H, the main gearset HS can generate fourteen different positive and two different negative output speeds at the output side (here at the coupled shaft planetary carrier ST4/ST5), which are then transmitted to the output shaft AB of the transmission GE, from these eight output speeds of the intermediate gearset ZS. In FIG. 8, by way of example, the forward gears 1, 8 and 14 of these fourteen different forward gears, are denoted by numbers, whereas the two different reverse gears are denoted by R1 and R2.

For selective shifting of these up to fourteen forward gears and two reverse gears, the shift logic illustrated in FIG. 9 can be used in the transmission GE, which has been explained in detail in connection with FIGS. 4A, 4B and 4C for the exemplary embodiment illustrated in FIG. 1.

Figure 11:
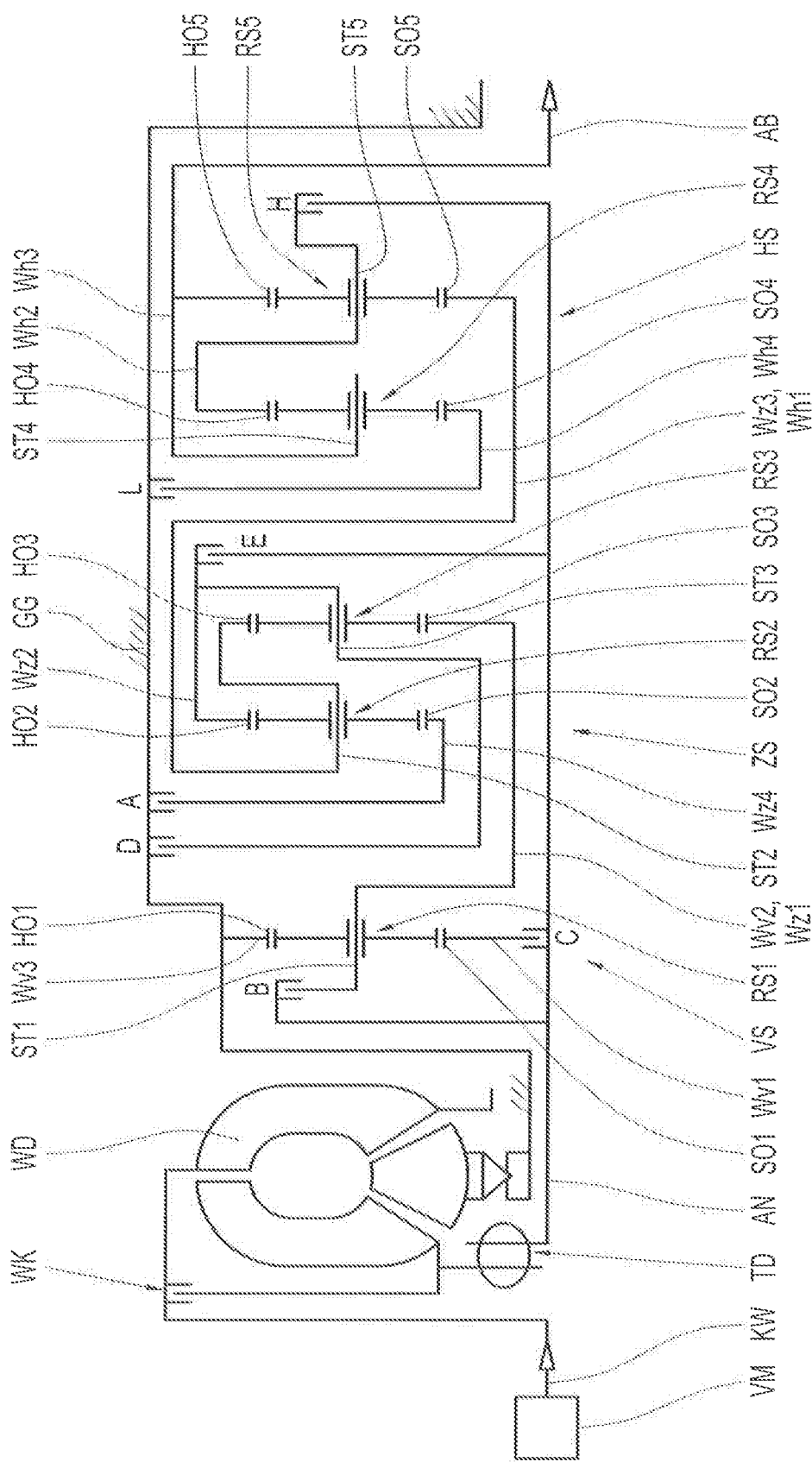
FIG. 11 shows a schematic representation of a fifth exemplary embodiment of an automatic transmission according to the invention.

FIG. 11 shows a schematic representation of a fifth exemplary embodiment of an automatic transmission according to the invention. Again, the transmission GE designed as an automatic transmission has, in addition to the input shaft AN and the output shaft AB, one front-mounted gearset VS, one intermediate gearset ZS, one main gearset HS and seven shift elements A, B, C, D, E, L, H, all arranged in the transmission housing GG. The gearsets VS, ZS and HS are spatially arranged, by way of example axially sequentially, in this case by way of example in the order "VS-ZS-HS". In the exemplary embodiment shown, the front-mounted gearset VS faces the drive of the transmission GE. For driving the transmission GE, an internal combustion engine VM is provided by way of example, the crankshaft KW of which is connected to the drive shaft AN of the transmission GE via a torque converter WD.

The front-mounted gearset VS is formed by the first planetary gearset RS1, in the form of a 1-web 3-shaft planetary gearset, comprising the first, second and third front-mounted gearset shafts Wv1, Wv2, Wv3. By design in this case, the first planetary gearset RS1 is exemplified as a simple minus planetary gearset having three elements comprising a sun gear SO1 as a first element forming the first front-mounted gearset shaft Wv1, a planetary carrier ST1 as a second element forming the second front-mounted gearset shaft Wv2, and a ring gear HO1 as the third element forming the third front-mounted gearset shaft Wv3.

The intermediate gearset ZS is formed by the second and third planetary gearsets RS2, RS3, in the form of a 2-web 4-shaft planetary gearset comprising the first, second, third and fourth intermediate gearset shafts Wz1, Wz2, Wz3, Wz4. By design, both the second planetary gearset RS2 and the third planetary gearset RS3 are designed as minus planetary gearsets having three elements each. The second planetary gearset RS2 includes a sun gear SO2 as a first element forming the fourth intermediate gear shaft Wz4, a planetary carrier ST2 as a second element, and a ring gear HO2 as a third element. The third planetary gearset RS3 includes a sun gear SO3 as a first element forming the first intermediate gear shaft Wz1, a planetary carrier ST3 as a second element, and a ring gear HO3 as a third element. The third element of the second planetary gearset RS2 (in this case the ring gear HO2) and the second element of the third planetary gearset RS3 (in this case the planetary carrier ST3) are permanently interconnected in the manner of a first coupling shaft of the intermediate gearset ZS and jointly form the second intermediate gearset shaft Wz2. The second element of the second planetary gearset RS2 (in this case the planetary carrier ST2) and the third element of the third planetary gearset RS3 (in this case the ring gear HO3) are permanently interconnected in the manner of a second coupling shaft of the intermediate gearset ZS and jointly form the third intermediate gearset shaft Wz3.

The main gearset HS is formed by the fourth and fifth planetary gearsets RS4, RS5 in the form of a 2-web 4-shaft planetary gearset comprising the first, second, third and fourth intermediate gearset shafts Wh1, Wh2, Wh3, Wh4. By design, both the fourth planetary gearset RS4 and the fifth planetary gearset RS5 are designed as minus planetary gearsets having three elements each. The fourth planetary gearset RS4 includes a sun gear SO4 as a first element forming the fourth main gear shaft Wh4, a planetary carrier ST4 as a second element, and a ring gear HO4 as a third element. The fifth planetary gearset RS5 includes a sun gear SO5 as a first element forming the first main gear shaft Wh1, a planetary carrier ST5 as a second element, and a ring gear HO5 as a third element. The third element of the fourth planetary gearset RS4 (in this case the ring gear HO4) and the second element of the fifth planetary gearset RS5 (in this case the planetary carrier ST5) are permanently interconnected in the manner of a first coupling shaft of the main gearset HS and jointly form the second main gearset shaft Wh2. The second element of the fourth planetary gearset RS4 (in this case the planetary carrier ST4) and the third element of the fifth planetary gearset RS5 (in this case the ring gear HO5) are permanently interconnected in the manner of a second coupling shaft of the main gearset HS and jointly form the third main gearset shaft Wh3.

With regard to the kinematic connection of the front-mounted gearset VS, the following is provided in the exemplary embodiment shown in FIG. 11:

The sun gear SO1 of the first planetary gearset RS1 (as the first front-mounted gearset shaft Wv1 of the front-mounted gearset VS) can be permanently connected to the drive input shaft AN of the transmission GE via the third shift element C designed as a clutch.

The planetary carrier ST1 of the first planetary gearset RS1 (as the second front-mounted gearset shaft Wv2 of the front-mounted gearset VS) is permanently connected to the first intermediate gearset shaft Wz1 of the intermediate gearset ZS.

The ring gear HO1 of the first planetary gearset RS1 (as the third front-mounted gearset shaft Wv3 of the front-mounted gearset VS) is permanently retained at the transmission housing GG.

The second shift element B designed as a clutch is arranged in the flow of power between the drive shaft AN and the second intermediate gearset shaft Wz2 of the intermediate gearset ZS. In the closed state, the clutch B thus connects the planetary carrier ST1 of the first planetary gearset RS1 to the drive shaft AN, such that the first intermediate gearset shaft Wz1 then rotates at the rotational speed of the drive shaft AN.

With regard to the kinematic connection of the intermediate gearset VS, the following is provided in the exemplary embodiment shown in FIG. 11:

The sun gear SO3 of the third planetary gearset RS3 (as the first intermediate gearset shaft Wz1 of the intermediate gearset ZS) is permanently connected to the second front-mounted gearset shaft Wv2 of the intermediate gearset VS (in this case permanently connected to the ring gear ST1 of the first planetary gearset RS1).

The coupling shaft (as the second intermediate gearset shaft Wz2 of the intermediate gearset ZS) formed by the ring gear HO2 of the second planetary gearset RS2 and the planetary carrier ST3 of the third planetary gearset RS3 can be retained at the transmission housing GG via the fourth shift element D designed as a brake and can be connected to the drive shaft AN of the transmission GE via the fifth shift element E designed as a clutch.

The coupling shaft (as the third intermediate gearset shaft Wz3 of the intermediate gearset ZS) formed by the planetary carrier ST2 of the second planetary gearset RS2 and the ring gear HO3 of the third planetary gearset RS3 is permanently connected to the first main gearset shaft Wh1 of the main gearset HS.

The sun gear SO2 of the second planetary gearset RS2 (as the fourth intermediate gearset shaft Wz4 of the intermediate gearset ZS) can be retained at the transmission housing GG via the first shift element A designed as a brake.

With regard to the kinematic connection of the main gearset HS the following is provided in the exemplary embodiment shown FIG. 11:

The sun gear SO5 of the fifth planetary gearset RS5 (as the first main gearset shaft Wh1 of the main gearset HS) is permanently connected to the third intermediate gearset shaft Wz3 of the intermediate gearset ZS (in this case permanently connected to the coupling shaft planetary carrier ST2/ring gear HO3).

The coupling shaft (as the second main gearset shaft Wh2 of the main gearset HS) formed by the ring gear HO4 of the fourth planetary gearset RS4 and the planetary carrier ST5 of the fifth planetary gearset RS5 can be permanently connected to the drive input shaft AN of the transmission GE via the seventh shift element H designed as a clutch.

The coupling shaft (as the third main gearset shaft Wh3 of the main gearset HS) formed by the planetary carrier ST4 of the fourth planetary gearset RS4 and the ring gear HO5 of the fifth planetary gearset RS5 is permanently connected to the output shaft AB of the transmission GE.

The sun gear SO4 of the fourth planetary gearset RS4 (as the fourth intermediate gearset shaft Wh4 of the main gearset HS) can be retained at the transmission housing GG via the sixth shift element L designed as a brake.

Due to the planetary carrier-ring gear couplings of the intermediate gearset ZS and the main gearset HS, the exemplary embodiment shown in FIG. 11 is characterized by a compact and inexpensive design.

While maintaining the given transmission kinematics, the spatial arrangement of the shift elements B, C, D, A, E, L, H within the transmission housing GG is variable within a wide range and is limited only by the dimensions and the outer shape of the transmission housing GG. Accordingly, the component arrangement shown in FIG. 11 shall be expressly understood to show just one of many possible component arrangement variants. In the same way, the embodiment of the shift elements shown in FIG. 11 as multi-plate clutches or disk brakes shall be understood as merely exemplary.

In alternative embodiments, for instance, form-locking shiftable claw or cone clutches, frictionally shifting band brakes or positively shiftable claw or cone brakes can be used. Thus, it is provided by way of example as a design feature in FIG. 11 that the third shift element C is arranged spatially directly in the vicinity of the sun gear SO1, a particularly favorable and space-saving arrangement, when the third shift element C is designed as a dog clutch. With regard to further advantages and alternatives to the component arrangement, reference is made in addition to the statements made above in the context of the other exemplary embodiments of a transmission according to the invention, which can also be applied mutatis mutandis to the fifth exemplary embodiment shown in FIG. 11 for a transmission according to the invention.

The transmission GE shown in FIG. 11 can also easily be used in a hybrid drive train, i.e. be combined without any difficulty with an additional electric motor drive, for instance, based on the drive concept shown in FIG. 5A or in FIG. 5B. Furthermore, the transmission GE shown in FIG. 11 can also be combined without any difficulty with an additional power take-off, as shown for instance in FIG. 6.

Figure 12:
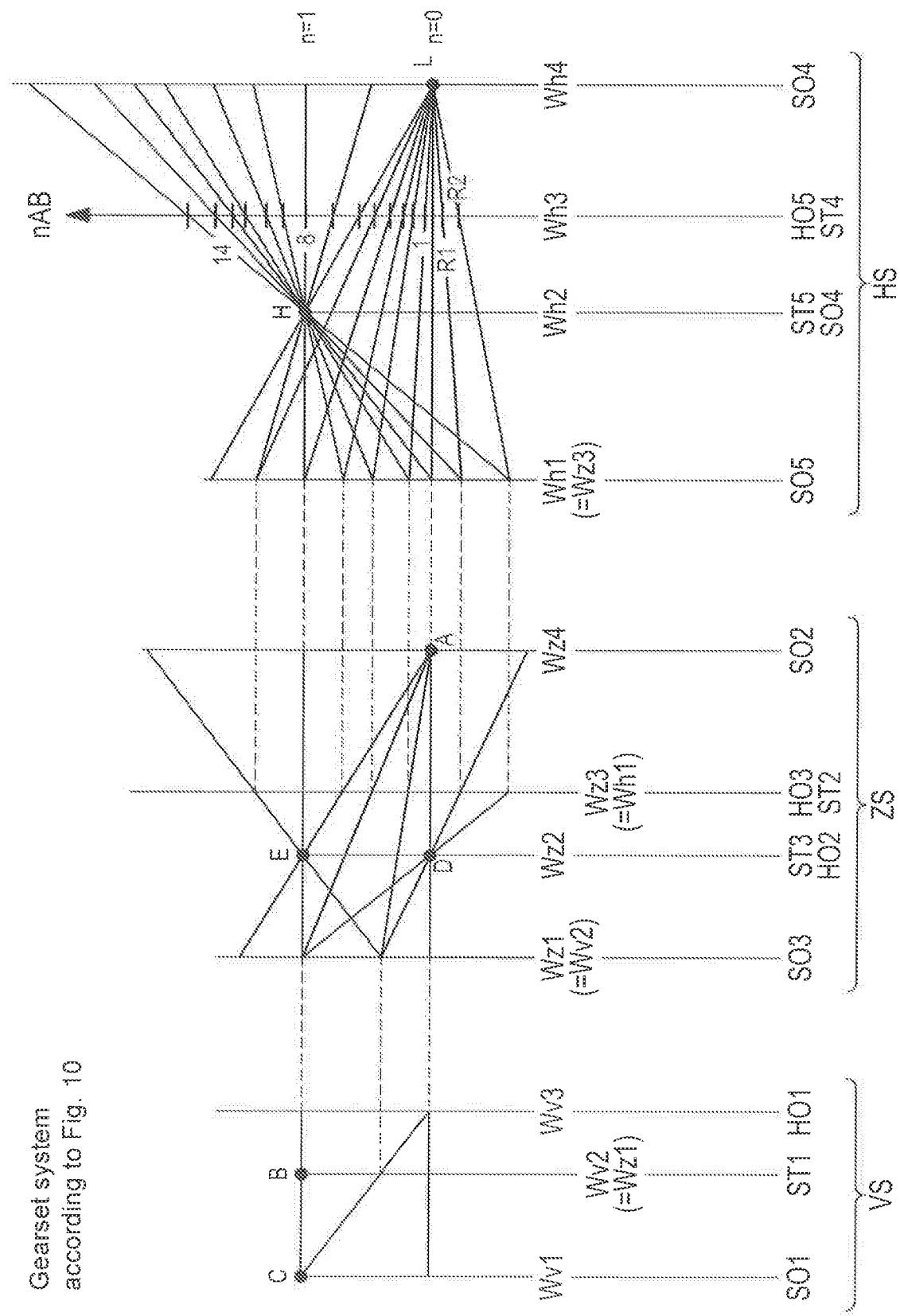
FIG. 12 shows a speed diagram of the automatic transmission shown in FIG. 11.

To illustrate the kinematics of the transmission GE according to the invention shown in FIG. 11, FIG. 12 shows a complete speed diagram of this transmission GE. The illustration is largely self-explanatory.

Depending on the shift states of the second and third shift elements B, C, the front-mounted gearset VS of the transmission GE according to the invention shown in FIG. 11 can generate two different rotational speeds on the output side (in this case at the planetary carrier ST1), which are then transmitted to the first intermediate gearset shaft Wz1 (in this case the sun gear SO3). When the second shift element B is closed, the second front-mounted gearset shaft Wv2 and thus also the first intermediate gearset shaft Wz1 rotate at the rotational speed of the drive shaft AN. If the third shift element C is closed, the second front-mounted gearset shaft Wv2 and thus also the first intermediate gearset shaft Wz1 rotate at a rotational speed lower than that of the drive shaft AN. The shift elements B and C may not be closed at the same time.

Depending on the shift states of the first, second, third, fourth and fifth shift elements A, B, C, D, E, the intermediate gearset ZS can generate eight different output rotational speeds on the output side (in this case at the coupled ring gear ST2/HO3), which are then transmitted to the main gearset HS—specifically to first main gearset shaft Wh1 (here the sun gear SO5).

Depending on the shift states of the sixth and seventh shift elements L, H, the main gearset HS can generate fourteen different positive and two different negative output speeds at the output side (here at the coupling shaft planetary carrier ST4/ring gear HO5), which are then transmitted to the output shaft AB of the transmission GE from these eight output speeds of the intermediate gearset ZS. In FIG. 12, by way of example, the forward gears 1, 8 and 14 of these fourteen different forward gears, are denoted by numbers, whereas the two different reverse gears are denoted by R1 and R2.

For selective shifting of these up to fourteen forward gears and two reverse gears, the shift logic illustrated in FIG. 11 can be used in the transmission GE, which has been explained in detail in connection with FIGS. 4A, 4B and 4C for the exemplary embodiment illustrated in FIG. 1.

Figure 13:
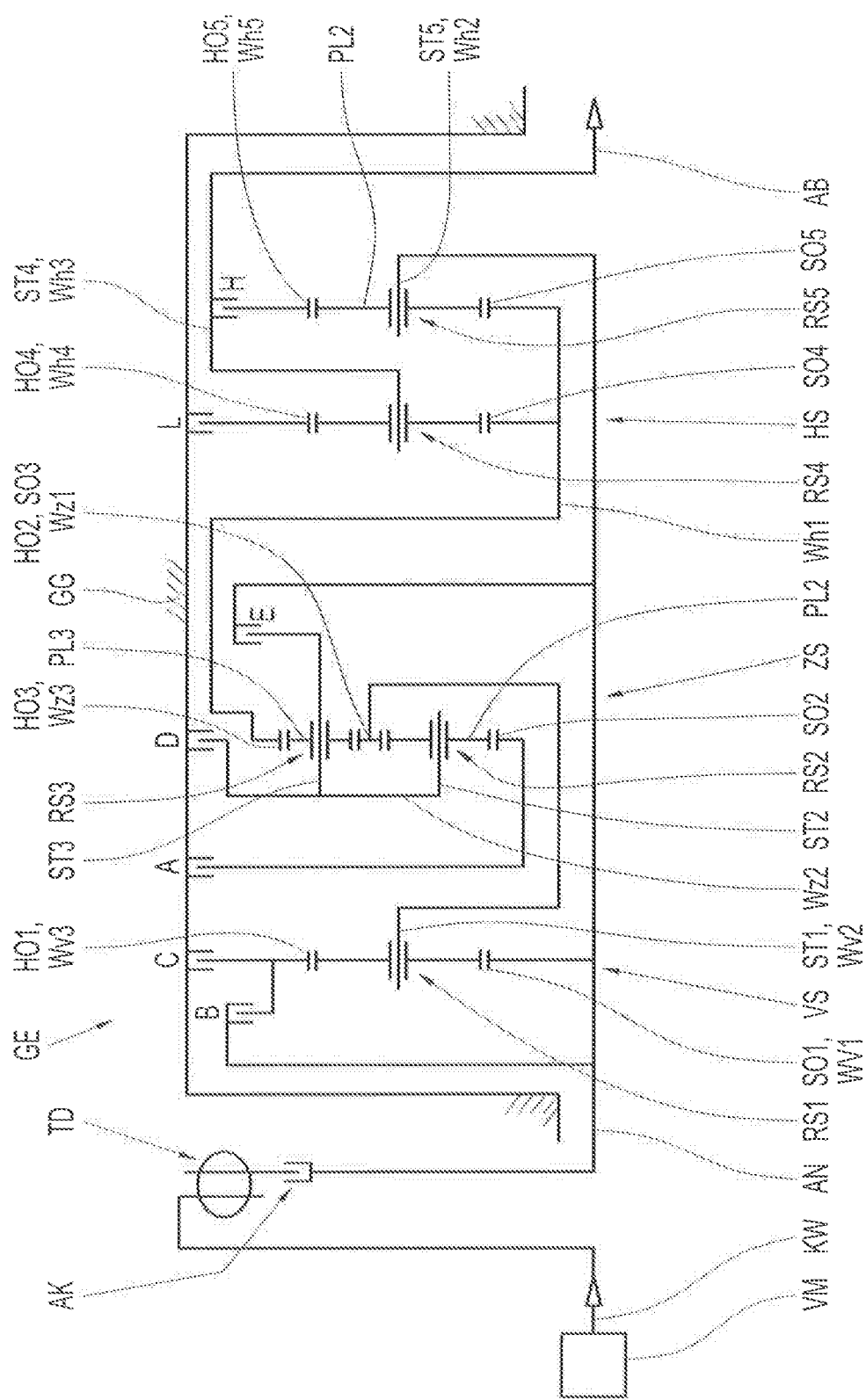
FIG. 13 shows a schematic representation of a sixth exemplary embodiment of an automatic transmission according to the invention.

FIG. 13 shows a schematic representation of a sixth exemplary embodiment of an automatic transmission according to the invention. Again, the transmission GE designed as an automatic transmission has, in addition to the input shaft AN and the output shaft AB, one front-mounted gearset VS. one intermediate gearset ZS, one main gearset HS and seven shift elements A, B, C, D, E, L, H, all arranged in the transmission housing GG. The gearsets VS, ZS and HS are arranged axially sequentially, in this case by way of example in the order "VS-ZS-HS", wherein the front-mounted gearset VS faces the drive of the transmission GE. For driving the transmission GE an internal combustion engine VM is provided by way of example, the crankshaft KW of which is operatively connected to the drive shaft AN of the transmission GE via a torsion damper TD, wherein the output element of this starting clutch AK is permanently connected to the drive shaft AN of the transmission GE.

The structural design of the front-mounted gearset VS used in FIG. 13 is taken from FIG. 6. Accordingly, the front-mounted gearset VS is formed by the first planetary gearset RS1 in the design of a simple minus planetary gearset having three elements and three front-mounted gearset shafts, comprising a sun gear SO1 as the first element and first front-mounted gearset shaft Wv1, a planetary carrier ST1 as the second element and the second front-mounted gearset shaft Wv2, and a ring gear HO1 as a third element and the third front-mounted gearset shaft Wv3. Here, the sun gear SO1 is continuously connected to the drive input shaft AN of the transmission GE, whereas the ring gear HO1 can be retained at the transmission housing GG via the third shift element C designed as a brake. The planetary carrier ST1 forms the output element of the front-mounted gearset VS and is permanently connected to the first intermediate gearset shaft Wz1 of the intermediate gearset ZS. For blocking the front-mounted gearset VS, the second shift element B designed as a clutch is arranged in the flow of power by way of example between the first and the third front-mounted gearset shaft Wv1, Wv3, such that the clutch B in the closed state interconnects sun gear SO1 and ring gear HO1, and all three elements SO1, ST1, HO1 of the first planetary gearset RS1 rotate at the speed of the drive shaft AN.

The structural design of the intermediate gearset ZS used in FIG. 13 is taken from FIG. 9. Accordingly, the intermediate gearset ZS is formed in the form of a 2-web 4-shaft planetary transmission including its intermediate gearset shafts Wz1, Wz2, Wz3, Wz4 by the second and third planetary gearset RS2, RS3, wherein the second and third planetary gearsets RS2, RS3 jointly form a planetary gearset in an interlaced plane, in which both planetary gearsets RS2, RS3 are formed as minus planetary gearsets having three elements each. The second planetary gearset RS2 includes a sun gear SO2 as a first element, a planetary carrier ST2 as a second element, and a ring gear HO2 as a third element. The third planetary gearset RS3 includes a sun gear SO3 as a first element, a planetary carrier ST3 as a second element, and a ring gear HO3 as a third element. As a first coupling shaft and first intermediate gearset shaft Wz1 of the intermediate gearset ZS, the ring gear HO2 of the second planetary gearset RS2 and the sun gear SO3 of the third planetary gearset RS3 are permanently interconnected and permanently connected to the second front-mounted gearset shaft Wv2 of the front-mounted gearsets VS (i.e. to the planetary carrier ST1 of the first planetary gearset RS1). Advantageously, the ring gear HO2 and the sun gear SO3 are designed as integral components. As a second coupling shaft and second intermediate gearset shaft Wz2 of the intermediate gearset ZS, the planetary carrier ST2 of the second planetary gearset RS2 and the planetary carrier ST3 of the third planetary gearset RS3 are permanently interconnected, can be retained at the transmission housing GG via the fourth shift element D designed as a brake and can be connected to the drive shaft AN of the transmission GE via the fifth shift element E designed as a clutch. Advantageously, the planetary carrier ST2 and the planetary carrier ST3 are designed as a joint component. As the third intermediate gearset shaft Wz3 of the intermediate gearset ZS, the ring gear HO3 of the third planetary gearset RS3 is permanently connected to the first main gearset shaft Wh1 of the main gearset HS. As the fourth main gearset shaft Wz4 of the main gearset HS, the ring gear SO2 of the second planetary gearset RS2 can be retained at the transmission housing GG via the first shift element A designed as a brake.

The structural design of the main gearset HS used in FIG. 13 is taken from FIG. 5A. Correspondingly, the main gearset HS in the design of a 2-web 5-shaft planetary transmission including its five main gearset shafts Wh1, Wh2, Wh3, Wh4, Wh5 is formed by the fourth and fifth planetary gearsets RS4, RS5, which are formed as minus planetary gearsets having three elements each. The fourth planetary gearset RS4 includes a sun gear SO4 as a first element, a planetary carrier ST4 as a second element, and a ring gear HO4 as a third element. The fifth planetary gearset RS5 includes a sun gear SO5 as a first element, a planetary carrier ST5 as a second element, and a ring gear HO5 as a third element. As the only coupling shaft and first main gearset shaft Wh1 of the main gearset HS, the ring gear SO4 of the fourth planetary gearset RS4 and the sun gear SO5 of the fifth planetary gearset RS5 are permanently interconnected and permanently connected to the third intermediate gearset shaft Wz3 of the intermediate gearsets ZS (i.e. to the planetary carrier HO3 of the first planetary gearset RS3). Advantageously, the two sun gears SO4, SO5 are designed as integral components. As the second main gearset shaft Wh2 of the main set HS of the planetary carrier ST5, the fifth planetary gearset RS5 is permanently connected to the drive shaft. As third main gearset shaft Wh3 and output shaft of the main gearset HS, the planetary carrier ST4 of the fourth planetary gearset RS4 is permanently connected to the output shaft AB. As the fourth main gearset shaft Wh4 of the main gearset HS, the ring gear HO4 of the fourth planetary gearset RS4 can be retained at the transmission housing GG via the sixth shift element L designed as a brake. As the fifth main gearset shaft Wh5 of the main gearset HS, the ring gear HO5 of the fifth planetary gearset RS5 can be connected to the planetary carrier ST4 and the output shaft AB via the seventh shift element H designed as a clutch.

Figure 14A:
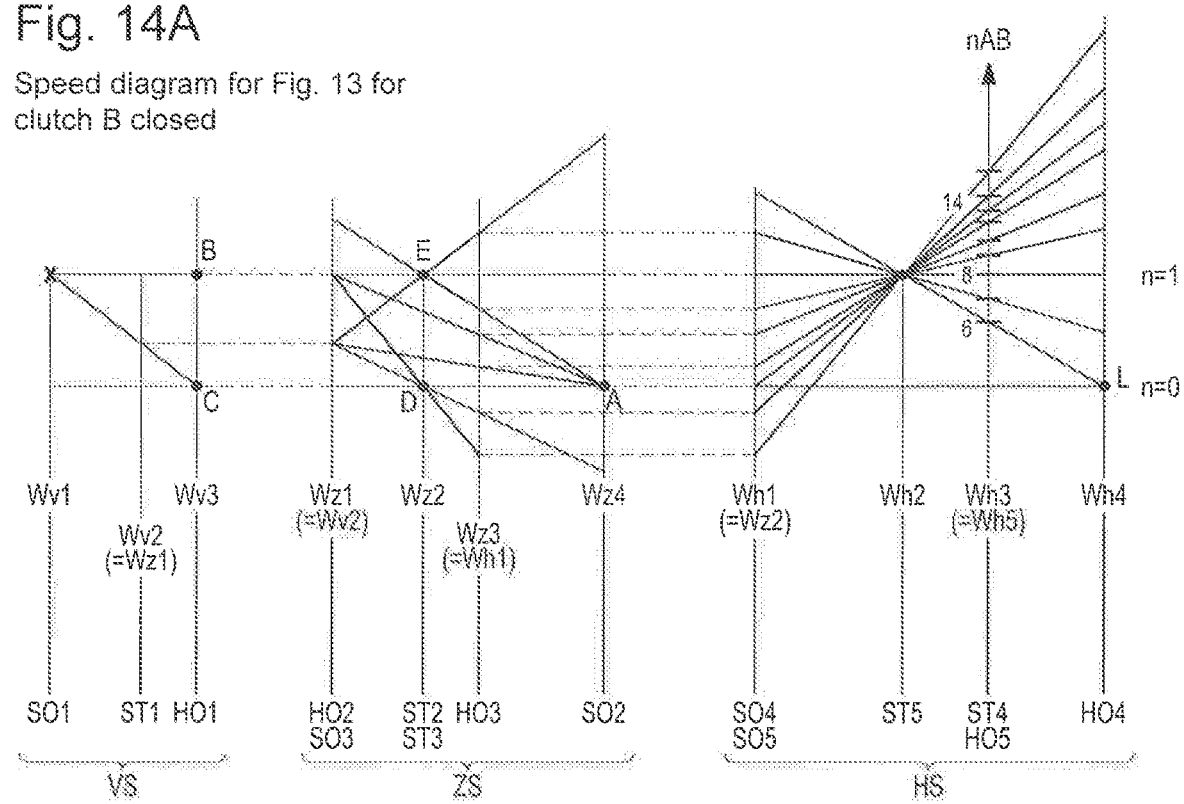
FIGS. 14A, 14B show speed diagrams of the automatic transmission shown in FIG. 13.
Figure 14B:
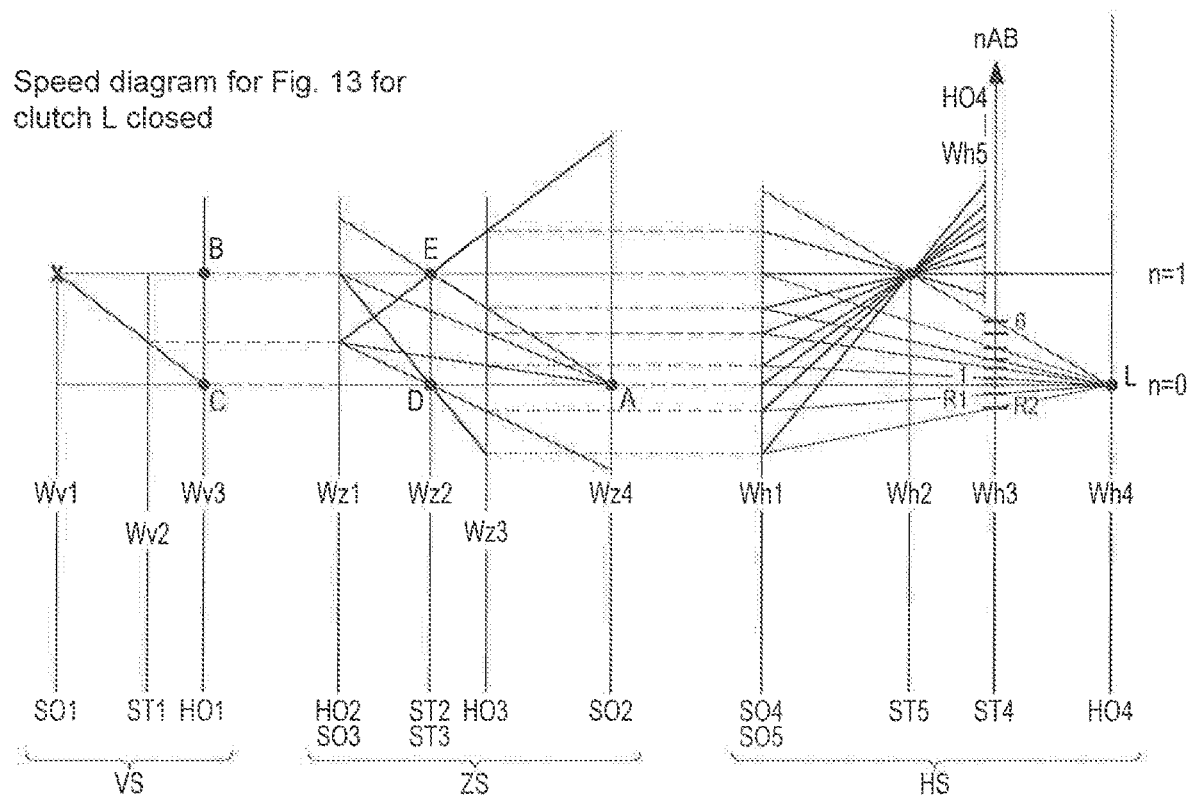

To illustrate the kinematics of the transmission GE according to the invention shown in FIG. 13, FIGS. 14A and 14B show a complete speed diagram of this transmission GE. The essentially self-explanatory presentation is subdivided into two parts. Whereas in FIG. 14A, the speed diagram resulting for a closed clutch H is shown, in FIG. 14B the speed diagram resulting for a closed brake L is shown.

Depending on the shift states of the second and third shift elements B, C, the front-mounted gearset VS of the transmission GE according to the invention shown in FIG. 13 can generate two different rotational speeds on the output side (in this case on the ring gear ST1), which are then transmitted to the first intermediate gearset shaft Wz1 (in this case the coupling shaft ring gear HO2/sun gear SO3). When the second shift element B is closed, the second front-mounted gearset shaft Wv2 and thus also the first intermediate gearset shaft Wz1 rotate at the rotational speed of the drive shaft AN. If the third shift element C is closed, the second front-mounted gearset shaft Wv2 and thus also the first intermediate gearset shaft Wz1 rotate at a rotational speed smaller than that of the drive shaft AN. The shift elements B and C may not be closed at the same time.

Depending on the shift states of the first, second, third, fourth and fifth shift elements A, B, C, D, E, the intermediate gearset ZS can generate eight different output rotational speeds on the output side (in this case at the ring gear HO3), which are then transmitted to the main gearset HS—specifically to first main gearset shaft Wh1 (here the sun gear SO5).

Depending on the shift states of the sixth and seventh shift elements L, H, the main gearset HS can generate fourteen different positive and two different negative output speeds at the output side (i.e. In this case at the planetary carrier ST4), which are then transmitted to the output shaft AB of the transmission GE, from these eight output speeds of the intermediate gearset ZS. In FIG. 14, by way of example, the forward gears 1, 6, 8 and 14 of these fourteen different forward gears, are denoted by numbers, whereas the two different reverse gears are denoted by R1 and R2.

For selective shifting of these up to fourteen forward gears and two reverse gears, the shift logic illustrated in FIG. 13 can be used in the transmission GE, which has been explained in detail in connection with FIGS. 4A, 4B and 4C for the exemplary embodiment illustrated in FIG. 1.

Figure 15:
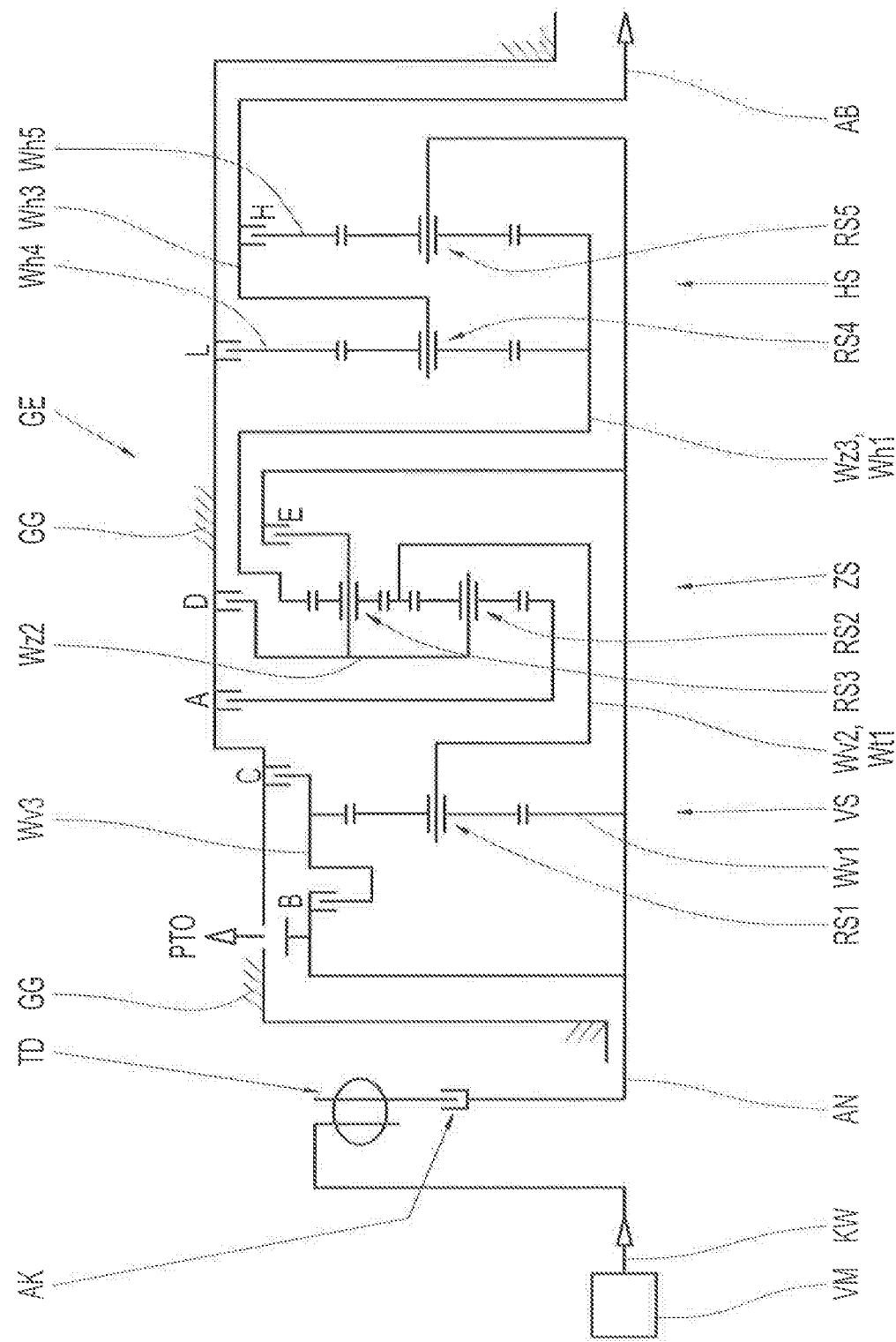
FIG. 15 shows a schematic representation of an application example including the automatic transmission shown in FIG. 13.

On the basis of the transmission GE shown in FIG. 13, FIG. 15 shows an application example having an additional power take-off PTO via which the drive shaft AN is or can be connected to a unit located outside the transmission GE. The principle of such speed tapping is used in particular in agricultural machinery and commercial vehicles.

Figure 16:
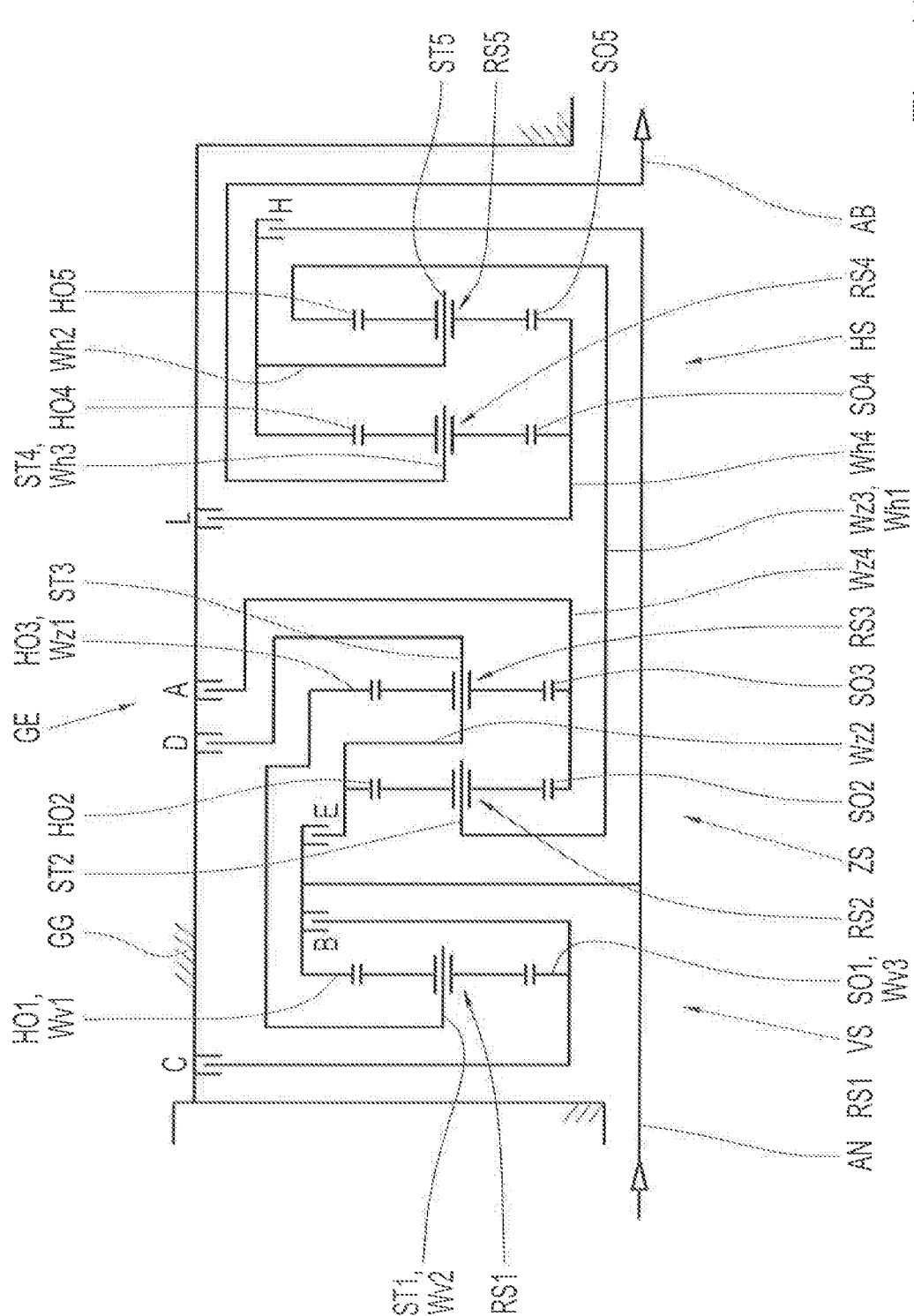
FIG. 16 shows a schematic representation of a seventh exemplary embodiment of an automatic transmission according to the invention.

FIG. 16 shows a schematic representation of a seventh exemplary embodiment of an automatic transmission according to the invention. Again, the transmission GE designed as an automatic transmission has, in addition to the input shaft AN and the output shaft AB, one front-mounted gearset VS. one intermediate gearset ZS, one main gearset HS and seven shift elements A, B, C, D, E, L, H, all arranged in the transmission housing GG. A drive of the transmission GE is not shown in any detail. The gearsets VS, ZS and HS are spatially arranged, by way of example axially sequentially, in this case by way of example in the order "VS-ZS-HS", wherein there the front-mounted gearset VS faces the drive of the transmission GE by way of example.

The front-mounted gearset VS is formed by the first planetary gearset RS1, in the form of a 1-web 3-shaft planetary gearset, comprising the first, second and third front-mounted gearset shafts Wv1, Wv2, Wv3. By design in this case, the first planetary gearset RS1 is formed as a simple minus planetary gearset having three elements by way of example comprising a sun gear SO1 as a first element, a planetary carrier ST1 as a second element, and a ring gear HO1 as the third element. In contrast to the previous exemplary embodiments, the ring gear HO1 forms the first front-mounted gearset shaft Wv1, whereas the sun gear SO1 forms the third front-mounted gearset shaft Wv3. Accordingly, the planetary carrier ST1 forms the second front-mounted gearset shaft Wv2. Here, the first front-mounted gearset shaft Wv1 (i.e., the ring gear HO1) is permanently connected to the drive input shaft AN of the transmission GE, whereas the third front-mounted gearset shaft Wv3 (i.e. the sun gear SO1) can be retained at the transmission housing GG via the third shift element C designed as a brake. As the output shaft of the front-mounted gearset VS, the second front-mounted gearset shaft Wv2 (i.e. the planetary carrier ST1) is permanently connected to the intermediate gearset ZS. For blocking the front-mounted gearset VS, the second shift element B designed as a clutch is arranged in the flow of power between the first front-mounted gearset shaft Wv1 and the third front-mounted gearset shaft Wv3, in such a way that the second shift element B in the closed state interconnects the ring gear HO1 and the sun gear SO1, and all three elements SO1, ST1, HO1 of the first planetary gearset RS1 rotate at the speed of the drive shaft AN.

The structural design of the intermediate gearset ZS used in FIG. 16 is taken from FIG. 1. Correspondingly, the intermediate gearset ZS in the design of a 2-web 5-shaft planetary transmission including its five main gearset shafts Wh1, Wz1, Wz2, Wz3, Wz4 is formed by the second and third planetary gearsets RS2, RS3, which are formed as minus planetary gearsets having three elements each. The second planetary gearset RS2 includes a sun gear SO2 as a first element, a planetary carrier ST2 as a second element, and a ring gear HO2 as a third element. The third planetary gearset RS3 includes a sun gear SO3 as a first element, a planetary carrier ST3 as a second element, and a ring gear HO3 as a third element. As the first intermediate gearset shaft Wz1 of the intermediate gearset ZS, the ring gear HO3 of the third planetary gearset is permanently connected to the second front-mounted gearset shaft Wv2 of the front-mounted gearset VS (i.e. permanently to the planetary carrier ST1). As a first coupling shaft and second intermediate gearset shaft Wz2 of the intermediate gearset ZS, the ring gear HO2 of the second planetary gearset RS2 and the planetary carrier ST3 of the third planetary gearset RS3 are permanently interconnected, are retained at the transmission housing GG via the fourth shift element D designed as a brake, and can be connected to the drive shaft AN via the fifth shift element E designed as a clutch. As the output shaft and third intermediate gearset shaft Wh3 of the intermediate gearset ZS, the planetary carrier ST2 of the second planetary gearset RS2 is permanently connected to the main gearset HS. As a second coupling shaft and fourth intermediate gearset shaft Wz4 of the intermediate gearset ZS, the sun gear SO2 of the second planetary gearset RS2 and the sun gear SO3 of the third planetary gearset RS3 are permanently interconnected and can be retained at the transmission housing GG via the first shift element A designed as a brake.

The structural design of the main gearset HS used in FIG. 16 differs from the previous exemplary embodiments. This main gearset HS is formed by the fourth and fifth planetary gearsets RS4, RS5, in the design of a 2-web 4-shaft planetary transmission, comprising the first, second, third and fourth main gearset shafts Wh1, Wh2, Wh3, Wh4, wherein both planetary gearsets RS4, RS5 are designed as minus planetary gearsets having three elements each. The fourth planetary gearset RS4 includes a sun gear SO4 as a first element, a planetary carrier ST4 as a second element, and a ring gear HO4 as a third element. The fifth planetary gearset RS5 includes a sun gear SO5 as a first element, a planetary carrier ST5 as a second element, and a ring gear HO5 as a third element. The sun gear HO5 of the fifth planetary gearset RS5 forms the first main gearset shaft Wh1 of the main gearset HS and is permanently connected to the third intermediate gearset shaft Wz3 (i.e. in this case connected to the ring gear ST2 of the second planetary gearset RS2). The ring gear HO4 of the fourth planetary gearset RS4 and the planetary carrier ST5 of the fifth planetary gearset RS5 are permanently interconnected as the coupling shaft of the main gearset HS, jointly form the second main gearset shaft Wh2 of the main gearset HS and can be connected to the drive input shaft AN of the transmission GE via the seventh shift element H designed as a clutch. The planetary carrier ST4 of the fourth planetary gearset RS4 forms the third main gearset shaft Wh3 of the main gearset HS and is permanently connected to the output shaft AB of the transmission GE as the output shaft of the main gearset HS. The sun gear SO4 of the fourth planetary gearset RS4 and the sun gear SO5 of the fifth planetary gearset RS5 are permanently interconnected as the second coupling shaft of the main gearset HS, jointly form the fourth main gearset shaft Wh4 of the main gearset HS and can be retained at the transmission housing GG via the sixth shift element designed as a brake.

Figure 17:
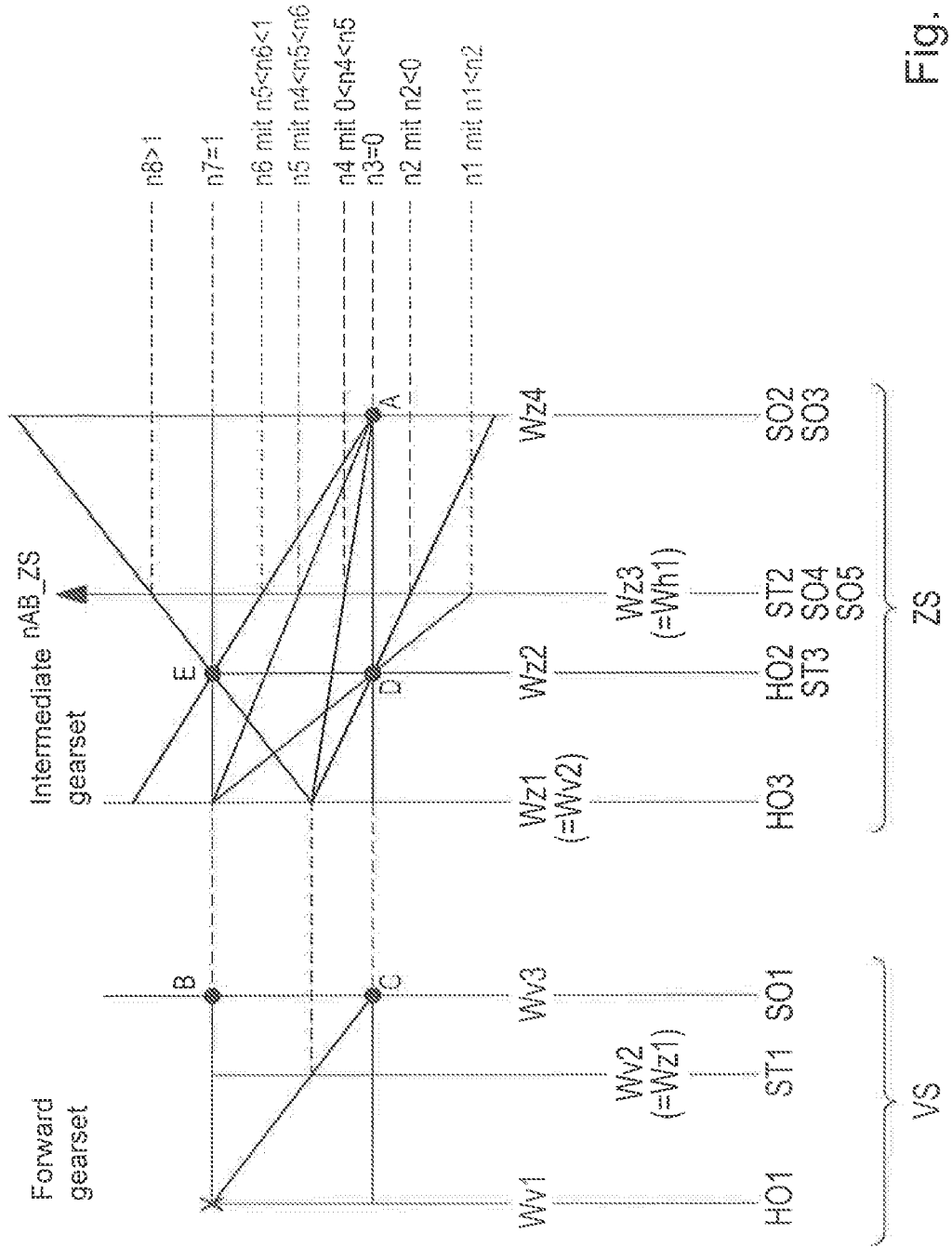
FIG. 17 shows a speed diagram for the description of the generation of the eight speeds at the output of the intermediate gearset of the automatic transmission shown in FIG. 16.

To illustrate the kinematics of the transmission GE according to the invention shown in FIG. 16, FIG. 17 shows an excerpt from a speed diagram of this transmission GE, from which the generation of the eight speeds at the output of the intermediate gearset ZS of the automatic transmission according to FIG. 16 can be taken. The illustration is largely self-explanatory.

Depending on the shift states of the second and third shift elements B, C, the front-mounted gearset VS of the transmission GE according to the invention shown in FIG. 16 can generate two different rotational speeds on the output side (in this case on the planetary carrier ST1), which are then transmitted to the first intermediate gearset shaft Wz1 (in this case the ring gear HO3). When the second shift element B is closed, the second front-mounted gearset shaft Wv2 and thus also the first intermediate gearset shaft Wz1 rotate at the rotational speed of the drive shaft AN. If the third shift element C is closed, the second front-mounted gearset shaft Wv2 and thus also the first intermediate gearset shaft Wz11 rotate at a rotational speed lower than that of the drive shaft AN. The shift elements B and C may not be closed at the same time.

Depending on the shift states of the first, second, third, fourth and fifth shift elements A, B, C, D, E, the intermediate gearset ZS can generate eight different output rotational speeds on the output side (in this case at the planetary carrier ST2), which are then transmitted to the main gearset HS— specifically to first main gearset shaft Wh1 (here the ring gear HO5).

Depending on the shift states of the sixth and seventh shift elements L, H, the main gearset HS can generate fourteen different positive and two different negative output speeds at the output side (i.e. In this case at the planetary carrier ST4), which are then transmitted to the output shaft AB of the transmission GE, from these eight output speeds of the intermediate gearset ZS.

For selective shifting of these up to fourteen forward gears and two reverse gears, the shift logic illustrated in FIG. 18 can be used in the transmission GE shown in FIG. 16. In each gear, three shift elements are closed, which is marked by "o" in the columns of FIG. 18, which are assigned to the individual shift elements A, B, C, D, E, L, H. Alternative optional gears are shown in parentheses, their shift element combinations are thus marked "(o)".

In order to implement fourteen forward gears and two reverse gears using the seven shift elements A, B, C, D, E, L, H, the following shift logic is proposed:

In first forward gear "1", the first, third and sixth shift elements A, C, L are closed or at least transmit torque.

In second forward gear "2", the first, second and sixth shift elements A, B, L are closed or at least transmit torque.

In third forward gear "3", the first, fifth and sixth shift elements A, E, L are closed or at least transmit torque.

In fourth forward gear "4", the second, fifth and sixth shift elements B, E, L are closed or at least transmit torque.

In fifth forward gear "5", the third, fifth and sixth shift elements C, E, L are closed or at least transmit torque.

In sixth forward gear "6", the third, sixth and seventh shift elements C, E, L are closed or at least transmit torque.

In seventh forward gear "7", the third, fifth and seventh shift elements C, E, H are closed or at least transmit torque.

In eighth forward gear "8", the second, fifth and seventh shift elements B, E, H are closed or at least transmit torque.

In ninth forward gear "9", the first, fifth and seventh shift elements A, E, H are closed or at least transmit torque.

In tenth forward gear "10", the first, second and seventh shift elements A, B, H are closed or at least transmit torque.

In tenth forward gear "11", the first, second and seventh shift elements A, C, H are closed or at least transmit torque.

In twelfth forward gear "12", the first, second and seventh shift elements A, D, H are closed or at least transmit torque.

In thirteenth forward gear "13", the third, fourth and seventh shift elements C, D, H are closed or at least transmit torque.

In fourteenth forward gear "14", the first, second and seventh shift elements B, D, H are closed or at least transmit torque.

In first reverse gear "R1", the third, fourth and sixth shift elements C, D, L are closed or at least transmit torque.

In second reverse gear "R2", the second, fourth and sixth shift elements B, D, L are closed or at least transmit torque.

This shift logic permits both individual planetary gearsets RS4, RS5 of the main gearset HS to transmit torque only in sixth forward gear, whereas in all other gears always only one of the two individual planetary gearsets RS4, RS5 of the main gearset HS transmits torque, which positively affects the efficiency of the transmission GE. In addition, according to this shift logic, group shifting is avoided in sequential shifting mode—i.e. when shifting up or down by one gear—as two gear stages adjacent in the shift logic always conjointly use two shift elements.

Incidentally, the shift logic shown in FIG. 18 is identical to the shift logic described with reference to FIG. 4A, but due to the independent kinematics of the transmission according to FIG. 16, provides different ratios than the ratios listed in FIG. 4A. However, the considerations made with reference to FIGS. 4A, 4B and 4C for gear selection can also be applied to the shift diagram of FIG. 18 in an analog manner.

Returning to FIG. 16, the application example shown there shows, with respect to the spatial arrangement of the five planetary gearsets RS1, RS2, RS3, RS4, RS5 within the transmission housing GG, a coaxial arrangement in the axial sequence "RS1-RS2-RS3-RS4-RS5" is proposed, wherein the first planetary gearset RS1 faces the drive of the transmission GE not shown in any detail in FIG. 16, which is favorable in connection with the coaxial arrangement of the drive shaft AN and the output shaft AB. The spatial arrangement of the seven shift elements C, B, E, D, A, L, H within the transmission housing GG proposed in FIG. 16 is as explained below:

The brake C—in particular the disk set of the brake C—is arranged on a large diameter in the area of the cylindrical outer wall of the transmission housing GG, on that side of the first planetary gearset RS1, which faces away from the second planetary gearset RS2. A servo device for actuating the brake C can be integrated without problems in the transmission housing GG or in a housing cover connected to the transmission housing GG. To reduce the transmission length, the disk set of the brake C can alternatively also be arranged, viewed in the axial direction, in an area radially above the first planetary gearset RS1.

The clutch B is axially directly adjacent to the first planetary gearset RS1, on that side of the first planetary gearset RS1, which faces the second planetary gearset RS2. A servo device for actuating the clutch B can be easily integrated in the disk support of the clutch B permanently connected to the drive shaft AN and be supplied with pressure media and lubricant by the drive shaft AN in a structurally simple manner with minimum leakage.

The clutch E is axially directly adjacent to the second planetary gearset RS2, on that side of the first planetary gearset RS2, which faces the first planetary gearset RS1. A servo device for actuating the clutch E can be easily integrated in the disk support of the clutch E permanently connected to the drive shaft AN and be supplied with pressure media and lubricant by the drive shaft AN in a structurally simple manner with minimum leakage. To reduce transmission length, the disk set of the clutch E can alternatively also be arranged, viewed in the axial direction, in an area radially above the second planetary gearset RS2. Also, the clutches E and B can jointly form a coupling assembly preassembled in a production-oriented manner in the design of a double clutch, comprising a joint disk support permanently connected to the drive shaft AN for holding both disk sets and both servo devices, wherein, depending on the application, the disk sets are arranged axially side by side or radially one above the other.

The brake D and the brake A—in particular the disk set of the brake D and the disk set of the brake A—are arranged on a large diameter in the area of the cylindrical outer wall of the transmission housing GG, viewed in the axial direction, in an area radially above the intermediate gear ZS. A servo device for actuating the brake D can be easily integrated in the transmission housing GG, also a servo device for actuating the brake A.

The brake L—in particular the disk set of the brake L—is arranged on a large diameter in the area of the cylindrical outer wall of the transmission housing GG, viewed in the axial direction, in an area between the third planetary gearset RS3 and the fourth planetary gearset RS4. A servo device for actuating the brake L can also be easily integrated in the transmission housing GG. To reduce transmission length, the disk set of the brake L can alternatively also be arranged, viewed in the axial direction, in an area radially above the main gearset HS.

The clutch H is arranged axially directly adjacent to the fifth planetary gearset RS5, on that side of the first planetary gearset RS5, which faces away from the fourth planetary gearset RS4. A servo device for actuating the clutch H can be easily integrated in the exterior disk support of the clutch H permanently connected to the drive shaft AN and are supplied with pressure media and lubricant by the drive shaft AN in a structurally simple manner with minimum leakage.

In an alternative arrangement, the clutch H can also form a clutch assembly in conjunction with the clutches B and E, which is then preferably arranged in an area axially between the front-mounted gearset VS and the intermediate gearset ZS.

While maintaining the given transmission kinematics, the spatial arrangement of the seven elements A, B, C, D, E, L, H within the transmission housing GG is variable within a wide range and is limited only by the dimensions and the outer shape of the transmission housing GG. Accordingly, the component arrangement shown in FIG. 16 shall be expressly understood to show just one of many possible component arrangement variants. In the same way, the embodiment of the shift elements shown in FIG. 16 as multi-plate clutches or disk brakes shall be understood as merely exemplary. In alternative embodiments, for instance, form-locking shiftable claw or cone clutches, frictionally shifting band brakes or positively shiftable claw or cone brakes can be used. With regard to further advantages and alternatives to the component arrangement, reference is made in addition to the statements made above in the context of the other exemplary embodiments of a transmission according to the invention, which can also be applied mutatis mutandis to the fifth exemplary embodiment shown in FIG. 16 for a transmission according to the invention.

The transmission GE shown in FIG. 16 can also easily be used in a hybrid drive train, i.e. be combined without any difficulty with an additional electric motor drive, for instance, based on the drive concept shown in FIG. 5A or in FIG. 5B. Furthermore, the transmission GE shown in FIG. 16 can also be combined without any difficulty with an additional power take-off, as shown for instance in FIG. 6.

From FIG. 16, in which the drive shaft AN and output shaft AB are arranged coaxially to each other, it can easily be seen that, especially in conjunction with an axially parallel arrangement of transmission drive and transmission output, it can also be beneficial if instead of the first planetary gearset RS1, the fifth planetary gearset RS5 faces the transmission drive, such that the drive shaft AN does not have to concentrically extend through the first planetary gearset RS1, this consideration is incidentally also applicable to the previous exemplary embodiments mutatis mutandis.

It may also be favorable, in particular in conjunction with an axially parallel arrangement of gear drive and gear output, to arrange the five planetary gearsets RS1, RS2, RS3, RS4, RS5 in a different order within the transmission housing GG. For instance FIG. 19 shows an arrangement variant created by way of example using the identical gear kinematics of the exemplary embodiment illustrated in FIG. 16.

Figure 19:
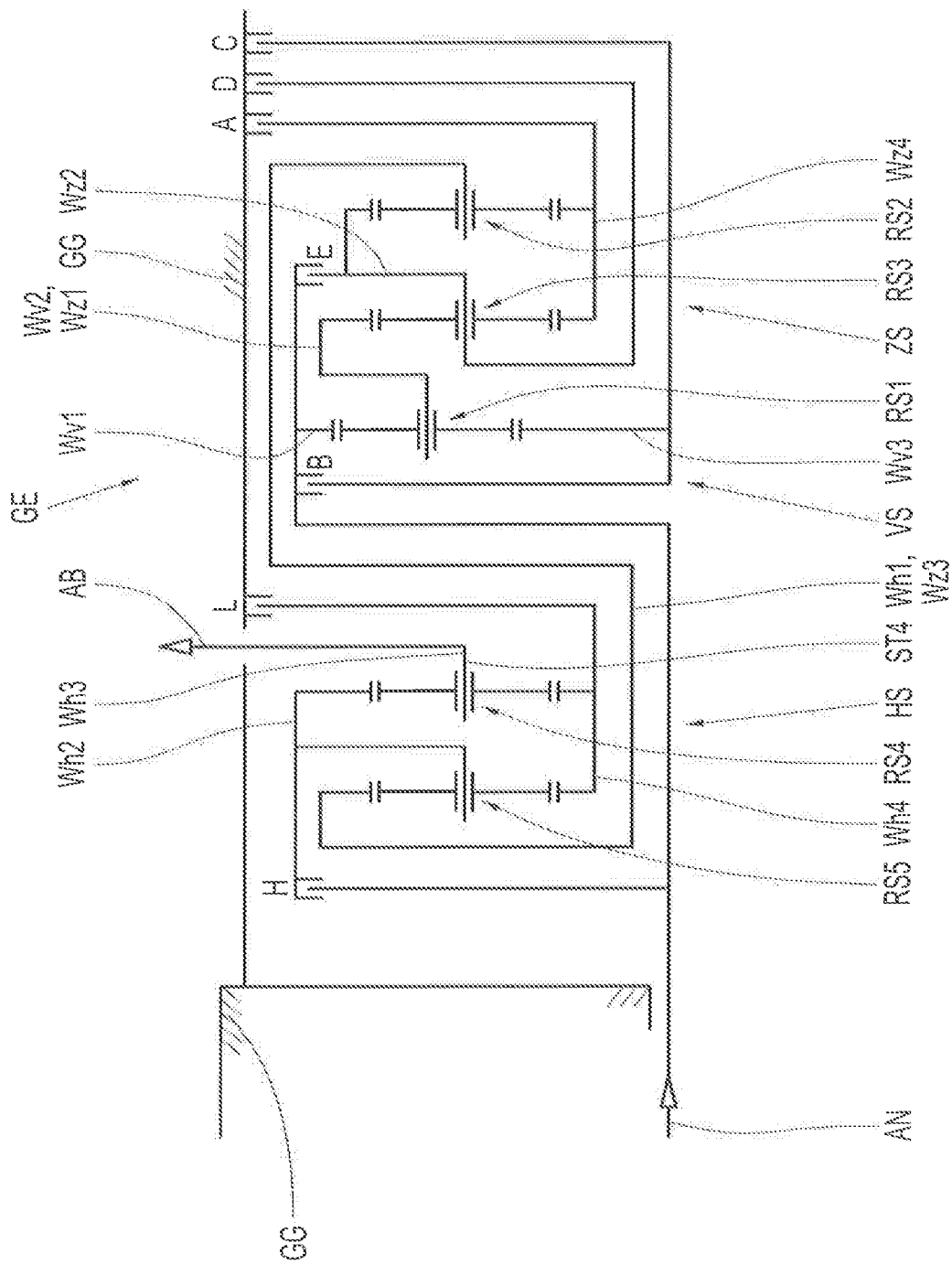
FIG. 19 shows a schematic representation of an arrangement variant for the automatic transmission shown in FIG. 16.

As visible in FIG. 19, the transmission GE designed as an automatic transmission comprises without any changes a rotary drive shaft AN, a rotary output shaft AB, five planetary gearsets RS1, RS2, RS3, RS4 and RS5 and seven shift elements A, B, C, D, E, L and H, which are all arranged in a transmission housing GG of the transmission. Viewed spatially, the five planetary gearsets RS1 to RS5 are arranged coaxially and axially sequentially, in this case in the order "RS5-RS4-RS1-RS3-RS2", wherein the fifth planetary gearset RS5 faces the drive of the transmission GE. For reasons of simplicity, the drive itself is not shown in detail in FIG. 19. The transmission drive and the transmission output are now no longer coaxial to each other, but preferably parallel to the axis or at an angle to each other.

In conjunction with this planetary gearset sequence "RS5-RS4-RS1-RS3-RS2" another useful spatial arrangement of the seven shift elements A, B, C, D, E, L, H relative to each other and relative to the individual planetary gearsets results.

The clutch H is arranged adjacent to the fifth planetary gearset RS5, at the side of the fifth planetary gearset RS5 facing away from the fourth planetary gearset RS4, but now facing the transmission drive. A servo device for actuating the clutch H is preferably supplied with pressure media and lubricant from the drive shaft AN and is preferably integrated in the disk support of the clutch H permanently connected to the drive shaft AN. To reduce axial transmission length, the clutch H—in particular the disk set of the clutch H—, viewed in the axial direction, can be arranged in an area radially above the main gearset HS, i.e. in an area radially above the fifth and/or fourth planetary gearset(s) RS5, RS4.

The output shaft AB permanently connected to the planetary carrier ST4 of the fourth planetary gearset RS4, now has to the form of a spur gear, which, viewed in the axial direction, is arranged next to the fourth planetary gearset RS4, on that side of the fourth planetary gearset RS4, which faces away from the fifth planetary gearset RS5.

In the transmission housing GG viewed further in the axial direction, the brake L is adjacent to the side of the spur gear forming the output shaft AB, which faces away from the fourth planetary gearset RS4. The brake L—in particular the disk set of the brake L—is arranged on a large diameter in the area of the cylindrical outer wall of the transmission housing GG, wherein a servo device for actuating the brake L is preferably integrated in the transmission housing GG.

Viewed further in the axial direction, the clutch B provided for blocking the first planetary gearset RS1 follows in the transmission housing GG on the side of the brake L facing away from the main gearset HS. The clutch B is axially directly adjacent to the first planetary gearset RS1, viewed spatially, on that side of the first planetary gearset RS1, which faces the main gearset HS. Thus, also the clutch B is arranged in an area axially between the main gearset HS and the front-mounted gearset VS. A servo device for actuating the clutch B is preferably supplied with pressure media and lubricant from the drive shaft AN, is preferably integrated in the disk support of the clutch B permanently connected to the drive shaft AN and arranged on the side of the first planetary gearset RS1 facing away from the disk set of the clutch B.

The intermediate gearset ZS including its planetary gearsets RS2 and RS3 is arranged on that side of the front-mounted gearset VS, which faces away from the main gearset HS, wherein the third planetary gearset RS3 is arranged closer to the front-mounted gearset VS or the first planetary gearset RS1 than the second planetary gearset RS2.

To reduce installation length, the clutch E including its disk set is, viewed in the axial direction, arranged in an area radially above the intermediate gear ZS, wherein a servo device for actuating the clutch E preferably supplied with pressure media and lubricant from the drive shaft AN and is preferably integrated in the disk support of clutch E permanently connected to the drive shaft. According to this configuration, arranging the servo device of the clutch E adjacent to the servo device of the clutch B is favorable.

The three brakes A, D and C are arranged on the side of the intermediate gearset ZS facing away from the front-mounted gearset VS. In the illustrated embodiment, all of these three brakes A, D, C—in particular their disk sets—are arranged on large and at least approximately same-sized diameters in the area of the cylindrical outer wall of the transmission housing GG, for instance, to be able to use identical parts. Accordingly, the disk sets of the three brakes A, D, C are arranged axially one behind the other, wherein the disk set of the brake D is arranged axially between the disk set of the brake A and the disk set of the brake C and the disk set of the brake A is arranged closer to the intermediate gearset ZS than the disk set of the brake C. The servo devices of the three brakes A, D, C are preferably integrated in the transmission housing. To save axial transmission length, alternatively arranging at least the brake A in an area radially above the intermediate gearset ZS may also be provided for. If necessary, the brakes A and D or even all three brakes A, D and C, viewed in the axial direction, can be arranged radially above the gearset group comprising the planetary gearsets RS1, RS3, RS2. In another alternative for an arrangement reducing the design length of the transmission, the three brakes A, D, C, viewed in the axial direction, can be arranged in the same plane—i.e. radially superimposed, wherein the disk set of the brake D is then advantageously arranged radially above the disk set of the brake C, whereas the disk set of the brake A is arranged radially above the disk set of the brake D, and wherein the servo devices of the three brakes A, D, C are integrated in a housing cover connected to the transmission housing GG.

Incidentally, a person skilled in the art will apply the methodology and the pertaining considerations that have resulted in the redesign from the seventh exemplary embodiment disclosed in FIG. 16 of a transmission according to the invention to the transmission disclosed in FIG. 18 including its alternatives, if necessary, mutatis mutandis to the other six previously explained exemplary embodiments for a transmission according to the invention.

REFERENCE NUMERALS

EM electric machine
ER rotor of the electric machine
ES stator of the electric machine
VM internal combustion engine
KW crankshaft of an internal combustion engine
PTO power take-Off
AK clutch (driveaway clutch or standard clutch)
TD torsional damper
WD torque converter
WK converter lockup clutch
GE transmission
GG transmission housing
AB output shaft of the transmission
AN drive shaft of the transmission
VS front-mounted gearset of the transmission
Wv1 first front-mounted gearset shaft
Wv2 second front-mounted gearset shaft
Wv3 third front-mounted gearset shaft
ZS intermediate gearset of the transmission
Wz1 first intermediate gearset shaft
Wz2 second intermediate gearset shaft
Wz3 third intermediate gearset shaft
Wz4 fourth intermediate gearset shaft
HS main gearset of the transmission
Wh1 first main gearset shaft
Wh2 second main gearset shaft
Wh 3 third main gearset shaft
Wh4 fourth main gearset shaft
Wh5 fifth main gearset shaft
A first shift element of the transmission
B second shift element of the transmission
C third shift element of the transmission
D fourth shift element of the transmission
E fifth shift element of the transmission
L sixth shift element of the transmission
H seventh shift element of the transmission
RS1 first planetary gearset of the transmission
SO1 sun gear of the first planetary gearset
ST1 planetary carrier of the first planetary gearset
PL1 planetary gears of the first planetary gearset
HO1 ring gear of the first planetary gearset
RS2 second planetary gearset of the transmission
SO2 sun gear of the second planetary gearset
ST2 planetary carrier of the second planetary gearset
PL2 planetary gears of the second planetary gearset
HO2 ring gear of the second planetary gearset
RS3 third planetary gearset of the transmission
SO3 sun gear of the third planetary gearset
ST3 planetary carrier of the third planetary gearset
PL3 planetary gears of the third planetary gearset
HO3 ring gear of the third planetary gearset
RS4 fourth planetary gearset of the transmission
SO4 sun gear of the fourth planetary gearset
ST4 planetary carrier of the fourth planetary gearset
PL4 planetary gears of the fourth planetary gearset
HO4 ring gear of the fourth planetary gearset
RS5 fifth planetary gearset of the transmission
SO5 sun gear of the fifth planetary gearset
ST5 planetary carrier of the fifth planetary gearset
PL5 planetary gears of the fifth planetary gearset
HO5 ring gear of the fifth planetary gearset
n speed
nAb output speed
nAb_ZS output speed of the intermediate gearset
n1 to n8 output speeds of the respective intermediate gearsets

The invention claimed is:

1. An automatic transmission for a motor vehicle, the automatic transmission comprising:
a transmission housing, a rotary drive shaft and a rotary output shaft;
first, second, third, fourth and fifth planetary gearsets being designed as either a minus or a plus planetary gearset;
first, second, third, fourth, fifth, sixth and seventh shift elements for achieving a plurality of ratios between the rotary drive shaft and the rotary output shaft;
each of the first, the second, the third, the fourth and the fifth planetary gearsets having a first element designed as a sun gear;
each of the first, the second, the third, the fourth and the fifth planetary gearsets, designed as a minus planetary gearset, having a second element designed as a planetary carrier and a third element designed as a ring gear;
each of the first, the second, the third, the fourth and the fifth planetary gearsets, designed as a plus planetary gearset, having a second element designed as a ring gear and a third element designed as a planetary carrier;
the first planetary gearset forming a front-mounted gearset comprising first, second and third front-mounted gearset shafts, the second and the third planetary gearsets forming an intermediate gearset comprising first, second, third and fourth intermediate gearset shafts and the fourth and the fifth planetary gearsets forming a main gearset comprising at least first, second, third and fourth main gearset shafts;
the first front-mounted gearset shaft being permanently connected to the rotary drive shaft and the third front-mounted gearset shaft being connectable to the transmission housing by engaging the third shift element, the second front-mounted gearset shaft being an output shaft of the front-mounted gearset which is permanently connected to the first intermediate gearset shaft and, when the second shift element is engaged, rotates at a rotational speed of the rotary drive shaft such that the front-mounted gearset, depending on shift states of the second and the third shift elements, can generate two different speeds on an output side, and the two different speeds being transmitted from the second front-mounted gearset shaft to the intermediate gearset;

the second intermediate gearset shaft being connectable to the transmission housing, by engaging the fourth shift element, and being connectable to the rotary drive shaft, by engaging the fifth shift element, and the fourth intermediate gearset shaft being connectable to the transmission housing, by engaging the first shift element, the third intermediate gearset shaft is an output shaft of the intermediate gearset which is permanently connected to the first main gearset shaft such that the intermediate gearset, depending on shift states of the first, the second, the third, the fourth and the fifth shift elements can generate eight different speeds on an output side, and the eight different speeds being transmitted to the main gearset via the third intermediate gearset shaft; and the second main gearset shaft being permanently connected to the rotary drive shaft or connectable to the rotary drive shaft by engaging the seventh shift element, the fourth main gearset shaft being connectable to the transmission housing, by engaging the sixth shift element, and the third main gearset shaft is an output shaft of the main gearset which is permanently connected to the rotary output shaft.

2. An automatic transmission for a motor vehicle, the automatic transmission comprising:

a transmission housing, a rotary drive shaft and a rotary output shaft;

first, second, third, fourth and fifth planetary gearsets;

first, second, third, fourth, fifth, sixth and seventh shift elements for achieving different transmission ratios between the rotary drive shaft and the rotary output shaft, each of the first, the second, the third, the fourth and the fifth planetary gearsets having a first element configured as a sun gear;

each of the first, the second, the third, the fourth and the fifth planetary gearsets, which are designed as a minus planetary gearset, having a second element designed as a planetary carrier and a third element designed as a ring gear;

each of the first, the second, the third, the fourth and the fifth planetary gearsets, which are designed as a plus planetary gearset, having a second element designed as a ring gear and a third element designed as a planetary carrier;

the first planetary gearset forming a front-mounted gearset comprising first, second and third front-mounted gearset shafts, the second and the third planetary gearsets forming an intermediate gearset comprising first, second, third and fourth intermediate gearset shafts, and the fourth and the fifth planetary gearsets forming a main gearset comprising at least first, second, third and fourth main gearset shafts;

the first front-mounted gearset shaft being connectable to the rotary drive shaft, by engaging the third shift element, and the third front-mounted gearset shaft being permanently connected to the transmission housing, the second front-mounted gearset shaft is an output shaft of the front-mounted gearset which is permanently connected to the first intermediate gearset shaft, and, when the second shift element is engaged, the second front-mounted gearset shaft rotates at a rotational speed of the rotary drive shaft such that the front-mounted gearset, depending on shift states of the second and the third shift elements, can generate two different speeds on an output side, and the two different speeds being transmitted from the second front-mounted gearset shaft to the intermediate gearset;

the second intermediate gearset shaft being connectable to the transmission housing, by engaging the fourth shift element, and being connectable to the rotary drive shaft, by engaging the fifth shift element, the fourth intermediate gearset shaft being connectable to the transmission housing, by engaging the first shift element, and the third intermediate gearset shaft is an output shaft of the intermediate gearset which is permanently connected to the first main gearset shaft such that the intermediate gearset, depending on the shift state of the first, the second, the third, the fourth and the fifth shift elements, can generate eight different speeds on an output side, and the eight different speeds being transmitted to the main gearset, via the third intermediate gearset shaft; and the second main gearset shaft being permanently connected to the rotary drive shaft or being connectable to the rotary drive shaft, by engaging the seventh shift element, the fourth main gearset shaft being connectable to the transmission housing, by engaging the sixth shift element, and the third main gearset shaft is an output shaft of the main gearset which is permanently connected to the rotary output shaft.

3. The automatic transmission according to claim 1, wherein the main gearset has exactly the first, the second, the third and the fourth main gearset shafts, and the second main gearset shaft is connectable to the rotary drive shaft by engaging the seventh shift element.

4. The automatic transmission according to claim 3, wherein the first element of the fourth planetary gearset and the first element of the fifth planetary gearset are permanently interconnected and form the first main gearset shaft, and the second element of the fifth planetary gearset forms the second main gearset shaft;

the second element of the fourth planetary gearset and the third element of the fifth planetary gearset are permanently interconnected and form the third main gearset shaft, and the third element of the fourth planetary gearset forms the fourth main gearset shaft.

5. The automatic transmission according to claim 3, wherein the first element of the fifth planetary gearset forms the first main gearset shaft;

the third element of the fourth planetary gearset and the second element of the fifth planetary gearset are either permanently interconnected or formed as a joint element and form the second main gearset shaft;

the second element of the fourth planetary gearset and the third element of the fifth planetary gearset are either permanently interconnected or formed as a joint element and form the third main gearset shaft; and the first element of the fourth planetary gearset forms the fourth main gearset shaft.

6. The automatic transmission according to claim 3, wherein the first element of the fourth planetary gearset forms the first main gearset shaft;

the third element of the fifth planetary gearset forms the second main gearset shaft;

the second element of the fourth planetary gearset and the second element of the fifth planetary gearset are either permanently interconnected or formed as a joint element and form the third main gearset shaft; and the third element of the fourth planetary gearset and the first element of the fifth planetary gearset are permanently interconnected and form the fourth main gearset shaft.

7. The automatic transmission according to claim 3, wherein the first element of the fifth planetary gearset forms the first main gearset shaft;

the third element of the fourth planetary gearset and the second element of the fifth planetary gearset are permanently interconnected and form the second main gearset shaft, and the second element of the fourth planetary gearset and the third element of the fifth planetary gearset are permanently connected to one another and form the third main gearset shaft; and the first element of the fourth planetary gearset forms the fourth main gearset shaft.

8. The automatic transmission according to claim 3, wherein the third element of the fifth planetary gearset forms the first main gearset shaft;

the third element of the fourth planetary gearset and the second element of the fifth planetary gearset are permanently interconnected and form the second main gearset shaft, and the second element of the fourth planetary gearset forms the third main gearset shaft; and the first element of the fourth planetary gearset and the first element of the fifth planetary gearset are permanently interconnected and form the fourth main gearset shaft.

9. The automatic transmission according to claim 1, wherein the main gearset has a fifth main gearset shaft, the second main gearset shaft is permanently connected to the rotary drive shaft, and the seventh shift element is arranged in a flow of power between the third and the fifth main gearset shafts.

10. The automatic transmission according to claim 9, wherein the first element of the fourth planetary gearset and the first element of the fifth planetary gearset are permanently interconnected and form the first main gearset shaft, and the second element of the fifth planetary gearset forms the second main gearset shaft; and the second element of the fourth planetary gearset forms the third main gearset shaft, and the third element of the fourth planetary gearset forms the fourth main gearset shaft.

11. The automatic transmission according to claim 1, wherein the third element of the third planetary gearset forms the first intermediate gearset shaft;

the third element of the second planetary gearset and the second element of the third planetary gearset are permanently interconnected and form the second intermediate gearset shaft, and the second element of the second planetary gearset forms the third intermediate gearset shaft; and the first element of the second planetary gearset and the first element of the third planetary gearset are either permanently interconnected or formed as a joint element and form the third intermediate gearset shaft.

12. The automatic transmission according to claim 1, wherein the first element of the third planetary gearset forms the first intermediate gearset shaft;

the third element of the second planetary gearset and the second element of the third planetary gearset are either permanently interconnected or formed as a joint element and form the second intermediate gearset shaft;

the second element of the fourth planetary gearset and the third element of the third planetary gearset are either permanently interconnected or formed as a joint element and form the third intermediate gearset shaft; and the first element of the second planetary gearset forms the fourth intermediate gearset shaft.

13. The automatic transmission according to claim 1, wherein the third element of the second planetary gearset and the first element of the third planetary gearset are permanently interconnected and form the first intermediate gearset shaft;

the second element of the second planetary gearset and the second element of the third planetary gearset are either permanently interconnected or formed as a joint element and form the second intermediate gearset shaft;

the third element of the third planetary gearset forms the third intermediate gearset shaft; and the first element of the second planetary gearset forms the fourth intermediate gearset shaft.

14. The automatic transmission according to claim 1, wherein the first element of the third planetary gearset forms the first intermediate gearset shaft;

the third element of the second planetary gearset and the second element of the third planetary gearset are permanently interconnected and form the second intermediate gearset shaft, the second element of the second planetary gearset and the third element of the third planetary gearset are permanently interconnected and form the third intermediate gearset shaft, and the first element of the second planetary gearset forms the fourth intermediate gearset shaft.

15. The automatic transmission according to claim 1, wherein the first element of the front-mounted gearset forms the first front-mounted gearset shaft; and the second element of the front-mounted gearset forms the second front-mounted shaft, and the third element of the front-mounted gearset forms the third main gearset shaft.

16. The automatic transmission according to claim 1, wherein the third element of the front-mounted gearset forms the first front-mounted gearset shaft;

the second element of the front-mounted gearset forms the second front-mounted gearset shaft; and the first element of the front-mounted gearset forms the third front-mounted gearset shaft.

17. The automatic transmission according to claim 15, wherein the second shift element is arranged in a flow of power between the first element of the first planetary gearset and the second element of the first planetary gearset.

18. The automatic transmission according to claim 15, wherein the second shift element is arranged in a flow of power between the first element of the first planetary gearset and the third element of the first planetary gearset.

19. The automatic transmission according to claim 1, wherein three of the first, the second; the third, the fourth, the fifth, the sixth and the seventh shift elements shift elements are engaged for every gear, and when changing from one gear to a next higher or a next lower gear, only one of the previously engaged shift elements is disengaged and only one of the previously disengaged shift elements is engaged.

20. The automatic transmission according to claim 19, wherein fourteen forward gears and two reverse gear can be achieved,
   in a first forward gear, the first, the third and the sixth shift elements transmit torque;
   in a second forward gear, the first, the second and the sixth shift elements transmit torque;
   in a third forward gear, the first, the fifth and the sixth shift elements transmit torque;
   in a fourth forward gear, the second; the fifth and the sixth shift elements transmit torque;
   in a fifth forward gear, the third, the fifth and the sixth shift elements transmit torque;
   in a sixth forward gear, either:
      the third, the sixth and the seventh shift elements transmit torque;
      the fifth, the sixth and the seventh shift elements transmit torque;
      the second, the sixth and the seventh shift elements transmit torque; or
      the fourth, the sixth and the seventh shift elements transmit torque;
   in a seventh forward gear, the third, the fifth and the seventh shift elements transmit torque;
   in an eighth forward gear, the second, the fifth and the seventh shift elements transmit torque;
   in a ninth forward gear, the first, the fifth and the seventh shift elements transmit torque;
   in a tenth forward gear, the first, the second and the seventh shift elements transmit torque;
   in an eleventh forward gear, the first, the third and the seventh shift elements transmit torque;
   in a twelfth forward gear, the first, the fourth and the seventh shift elements transmit torque;
   in a thirteenth forward gear, the third, the fourth and the seventh shift elements transmit torque;
   in a fourteenth forward gear, the second, the fourth and the seventh shift elements transmit torque;
   in a first reverse gear, the third, the fourth and the sixth shift elements transmit torque; and
   in a second reverse gear, the second, the fourth and the sixth shift elements transmit torque.

21. The automatic transmission according to claim 19, wherein at least eleven forward gears and at least one reverse gear can be achieved,
   in a first forward gear, the first, the second and the sixth shift elements transmit torque;
   in a second forward gear, the first, the fifth and the sixth shift elements transmit torque;
   in a third forward gear, the second, the fifth and the sixth shift elements transmit torque;
   in a fourth forward gear, the third, the fifth and the sixth shift elements transmit torque;
   in a fifth forward gear, either:
      the third, the sixth and the seventh shift elements transmit torque;
      the fifth, the sixth and the seventh shift elements transmit torque;
      the second, the sixth and the seventh shift elements transmit torque; or
      the fourth, the sixth and the seventh shift elements transmit torque;
   in a sixth forward gear, the third, the fifth and the seventh shift elements transmit torque;
   in a seventh forward gear, the second, the fifth and the seventh shift elements transmit torque;
   in an eighth forward gear, the first, the fifth and the seventh shift elements transmit torque;
   in a ninth forward gear, the first, the second and the seventh shift elements transmit torque;
   in a tenth forward gear, the first, the fourth and the seventh shift elements transmit torque;
   in an eleventh forward gear, the second, the fourth and the seventh shift elements transmit torque; and
   in a reverse gear, the second, the fourth and the sixth shift elements transmit torque.

22. The automatic transmission according to claim 19, wherein at least ten forward gears and at least one reverse gear can be achieved,
   in a first forward gear, the first, the second and the sixth shift elements transmit torque,
   in a second forward gear, the first, the fifth and the sixth shift elements transmit torque,
   in a third forward gear, the second, the fifth and the sixth shift elements transmit torque,
   in a fourth forward gear, the third, the fifth and the sixth shift elements transmit torque,
   in a fifth forward gear, either:
      the third, the sixth and the seventh shift elements transmit torque,
      the fifth, the sixth and the seventh shift elements transmit torque,
      the second, the sixth and the seventh shift elements transmit torque, or
      the fourth, the sixth and the seventh shift elements transmit torque,
   in a sixth forward gear, the third, the fifth and the seventh shift elements transmit torque,
   in a seventh forward gear, the second, the fifth and the seventh shift elements transmit torque,
   in an eighth forward gear, the first, the second and the seventh shift elements transmit torque,
   in a ninth forward gear, the first, the fourth and the seventh shift elements transmit torque,
   in a tenth forward gear, the second, the fourth and the seventh shift elements transmit torque, and
   in a reverse gear, the second, the fourth and the sixth shift elements transmit torque.

23. The automatic transmission according to claim 21, wherein a forward creeper gear is provided, in the forward creeper gear, the first, the third and the sixth shift elements transmit torque, and a reverse creeper gear is provided, in the reverse creeper, the third, the fourth and the sixth shift elements transmit torque.

24. The automatic transmission according to claim 1, wherein the first, the second, the third, the fourth and the fifth planetary gearsets are arranged coaxially to one another and sequentially in an axial direction in an order of: the first planetary gearset, the second planetary gearset, the third planetary gearset, the fourth planetary gearset, and the fifth planetary gearset.

25. The automatic transmission according to claim 1, wherein the first, the second, the third, the fourth and the fifth planetary gearsets are arranged coaxially to one another and sequentially in an axial direction in an order of: the fifth planetary gearset, the fourth planetary gearset, the first planetary gearset, the third planetary gearset, and the second planetary gearset.

26. The automatic transmission according to claim 1, wherein the front-mounted gearset, the intermediate gearset and the main gearset are arranged sequentially in an axial direction in an order of: the front-mounted gearset, the intermediate gearset, and the main gearset; and the intermediate gearset is designed as an assembly, in which the second and the third planetary gearsets are spatially arranged in a plane, the third planetary gearset is arranged radially about the second planetary gearset, when viewed in the axial direction, and the main gearset (HS) is designed as another assembly in which the fourth and the fifth planetary gearsets are arranged axially adjacent to one another, viewed spatially, such that the fourth planetary gearset is arranged closer to the intermediate gear than the fifth planetary gearset.

27. The automatic transmission according to claim 1, wherein the front-mounted gearset, the intermediate gearset and the main gearset are arranged sequentially in an axial direction in an order of: the front-mounted gearset, the intermediate gearset; and the main gearset; and the intermediate gearset is designed as an assembly, in which the second and the third planetary gearsets are spatially arranged in a plane, the third planetary gearset is arranged radially about the second planetary gearset, when viewed in the axial direction, and the main gearset is designed as another assembly in which the fourth and the fifth planetary gearsets are arranged in another plane, viewed spatially, such that the fifth planetary gearset is arranged about the fourth planetary gearset.

28. The automatic transmission according to claim 1, wherein the rotary drive shaft is permanently connected to a rotary rotor of an electric machine.

29. The automatic transmission according to claim 1, wherein the third intermediate gearset shaft and the first main gearset shaft are permanently connected to a rotary rotor of an electric machine.

30. The automatic transmission according to claim 29, wherein the electric machine, when viewed spatially, is at least partially arranged in an area radially about the intermediate gear.

* * * * *